(12) United States Patent
Dayton et al.

(10) Patent No.: US 7,913,345 B2
(45) Date of Patent: Mar. 29, 2011

(54) SYSTEMS AND METHODS OF A POWER TOOL SYSTEM WITH INTERCHANGEABLE FUNCTIONAL ATTACHMENTS

(75) Inventors: Douglas C. Dayton, Harvard, MA (US); Sung Park, Newton, MA (US); Mark R Florence, Newton, MA (US)

(73) Assignee: Umagination Labs, L.P., Newton, MA (US)

( * ) Notice: Subject to any disclaimer, the term of this patent is extended or adjusted under 35 U.S.C. 154(b) by 615 days.

(21) Appl. No.: 11/972,663

(22) Filed: Jan. 11, 2008

(65) Prior Publication Data
US 2008/0189870 A1 Aug. 14, 2008

Related U.S. Application Data

(63) Continuation-in-part of application No. 11/838,697, filed on Aug. 14, 2007, and a continuation-in-part of application No. 11/935,296, filed on Nov. 5, 2007, now abandoned.

(60) Provisional application No. 60/952,938, filed on Jul. 31, 2007, provisional application No. 60/985,573, filed on Nov. 5, 2007, provisional application No. 60/837,993, filed on Aug. 15, 2006.

(51) Int. Cl.
*A46B 13/02* (2006.01)
(52) U.S. Cl. .................................. 15/28; 15/23; 15/97.1
(58) Field of Classification Search .............. 15/23, 28, 15/49.1, 97.1, 98
See application file for complete search history.

(56) References Cited

U.S. PATENT DOCUMENTS

| | | | |
|---|---|---|---|
| 1,875,529 | A | 9/1932 | Vandervoort |
| 2,539,003 | A | 1/1951 | Agustoni |
| 3,751,749 | A | 8/1973 | Wilson |
| 3,952,239 | A | 4/1976 | Owings et al. |
| 3,973,179 | A | 8/1976 | Weber et al. |
| 4,050,003 | A | 9/1977 | Owings et al. |
| 4,114,938 | A | 9/1978 | Strader et al. |
| 4,121,320 | A | 10/1978 | Feiner |
| 4,202,068 | A | 5/1980 | Lester et al. |
| 4,204,292 | A | 5/1980 | Lester et al. |
| 4,549,611 | A | 10/1985 | Mills |
| 4,757,786 | A | 7/1988 | Ellegard |
| 4,810,855 | A | 3/1989 | Dassi et al. |

(Continued)

FOREIGN PATENT DOCUMENTS

CA 1242852 10/1988

(Continued)

OTHER PUBLICATIONS

"U.S. Appl. No. 11/838,697 Non-Final Office Action mailed Jan. 27, 2010", , 17.

(Continued)

*Primary Examiner* — Mark Spisich
(74) *Attorney, Agent, or Firm* — Strategic Patents, P.C.

(57) ABSTRACT

In embodiments of the present invention, a method and system of a light bulb changing tool may comprise a gripper having a gripping side and an attaching side, the gripper having a flexible shape; an attachment point disposed on the attaching side; and a polymer disposed on the gripping side. In embodiments, a method and system of a vehicle cleaning tool may comprise a rotational arbor; and a gear head adapted to rotate the rotational arbor, wherein the gear head is adapted to couple to a power head having a quick-release connection point.

5 Claims, 29 Drawing Sheets

U.S. PATENT DOCUMENTS

| | | | |
|---|---|---|---|
| 4,848,818 A | 7/1989 | Smith | |
| 4,989,323 A | 2/1991 | Casper et al. | |
| 5,149,230 A | 9/1992 | Nett | |
| 5,265,341 A | 11/1993 | Kikuchi et al. | |
| 5,289,605 A * | 3/1994 | Armbruster | 15/97.1 |
| 5,379,846 A | 1/1995 | Wagster et al. | |
| 5,544,417 A | 8/1996 | Atos et al. | |
| 5,615,970 A | 4/1997 | Reekie et al. | |
| 5,626,377 A | 5/1997 | Carroll, Jr. et al. | |
| 5,692,417 A | 12/1997 | Irpino | |
| 5,709,136 A | 1/1998 | Frenkel | |
| 5,718,014 A | 2/1998 | deBlois et al. | |
| 5,797,157 A * | 8/1998 | Gregg | 15/49.1 |
| 5,802,724 A | 9/1998 | Rickard et al. | |
| 5,809,653 A | 9/1998 | Everts et al. | |
| 5,855,067 A | 1/1999 | Taomo et al. | |
| 5,926,961 A | 7/1999 | Uhl | |
| 6,089,331 A | 7/2000 | Christ | |
| 6,153,838 A | 11/2000 | Wadge | |
| 6,170,579 B1 | 1/2001 | Wadge | |
| 6,176,322 B1 | 1/2001 | Wadge | |
| 6,181,032 B1 | 1/2001 | Marshall et al. | |
| 6,206,107 B1 | 3/2001 | Wadge | |
| 6,263,979 B1 | 7/2001 | Dyke et al. | |
| 6,263,980 B1 | 7/2001 | Wadge | |
| 6,264,211 B1 | 7/2001 | Granado | |
| D447,035 S | 8/2001 | Netzler | |
| D447,037 S | 8/2001 | Netzler | |
| D447,038 S | 8/2001 | Netzler | |
| 6,286,611 B1 | 9/2001 | Bone | |
| 6,301,788 B1 | 10/2001 | Webster | |
| 6,352,127 B1 | 3/2002 | Yorde | |
| 6,374,447 B1 | 4/2002 | Armbruster et al. | |
| 6,463,824 B1 | 10/2002 | Prell et al. | |
| 6,488,511 B1 | 12/2002 | Stewart | |
| 6,553,642 B2 | 4/2003 | Driessen | |
| 6,634,439 B2 | 10/2003 | Driessen | |
| 6,640,667 B1 | 11/2003 | Pomerantz et al. | |
| 6,641,439 B2 | 11/2003 | Kim | |
| 6,651,347 B2 | 11/2003 | Uhl | |
| 6,755,597 B2 | 6/2004 | Bergner et al. | |
| 6,832,531 B1 | 12/2004 | Marquardt | |
| 6,923,094 B1 | 8/2005 | Marquardt | |
| 7,014,546 B1 | 3/2006 | Birk | |
| 7,021,399 B2 | 4/2006 | Driessen | |
| 7,114,824 B2 | 10/2006 | Picone | |
| 7,121,598 B2 | 10/2006 | Pourtier et al. | |
| 7,152,328 B2 | 12/2006 | Champlin | |
| 7,234,743 B2 | 6/2007 | Robinson | |
| 7,255,024 B2 | 8/2007 | Johnson et al. | |
| 7,331,077 B1 * | 2/2008 | Henry | 15/23 |
| 7,334,503 B1 | 2/2008 | Newman | |
| 7,354,408 B2 | 4/2008 | Muchisky | |
| 7,363,673 B2 | 4/2008 | Schonewille et al. | |
| 7,484,300 B2 | 2/2009 | King et al. | |
| 7,743,683 B2 | 6/2010 | Dayton et al. | |
| 2004/0003503 A1 | 1/2004 | McDonald | |
| 2004/0074025 A1 | 4/2004 | Blaustein et al. | |
| 2005/0183222 A1* | 8/2005 | Grohe | 15/49.1 |
| 2005/0243553 A1 | 11/2005 | Picone | |
| 2006/0248666 A1* | 11/2006 | Lies | 15/23 |
| 2007/0000138 A1 | 1/2007 | Baskar et al. | |
| 2007/0050991 A1 | 3/2007 | Mooney et al. | |
| 2007/0240892 A1 | 10/2007 | Brotto et al. | |
| 2008/0060149 A1* | 3/2008 | Wu et al. | 15/29 |
| 2008/0092311 A1 | 4/2008 | Munn et al. | |
| 2008/0104780 A1 | 5/2008 | Dayton et al. | |
| 2008/0155769 A1 | 7/2008 | Schonewille et al. | |
| 2008/0173138 A1 | 7/2008 | Dayton et al. | |
| 2008/0250570 A1 | 10/2008 | Dayton et al. | |

FOREIGN PATENT DOCUMENTS

| | | |
|---|---|---|
| DE | 10124885 * | 12/2002 |
| WO | WO-2009/061749 A2 | 5/2009 |
| WO | WO-2009/061749 A3 | 5/2009 |

OTHER PUBLICATIONS

"U.S. Appl. No. 12/027,204, Notice of Allowance mailed Apr. 21, 2010", , 6.

"The Stihl Kombisystem and Yard Boss Website", http://www.stihlusa.com/multitask/.

"U.S. Appl. No. 11/935,296 Non-Final Office Action mailed Sep. 19, 2008", OARN,10 Pgs.

"U.S. Appl. No. 12/783,694, Non-Final Office Action mailed Sep. 22, 2010", , 2 pgs.

"U.S. Appl. No. 11/838,697, Final Office Action mailed Aug. 5, 2010", , 11.

"U.S. Appl. No. 12/027,204, Non-Final Office Action mailed Dec. 23, 2008", 11 pgs.

ISR, "International Search Report and Written Opinion", For US Patent Application No. PCT/US08/82383, mailed on Apr. 27, 2009.

"U.S. Appl. No. 12/027,204, Non-Final Office Action mailed Sep. 1, 2009", 8.

"U.S. Appl. No. 11/838,697, Notice of Allowance mailed Dec. 14, 2010", , 7.

* cited by examiner

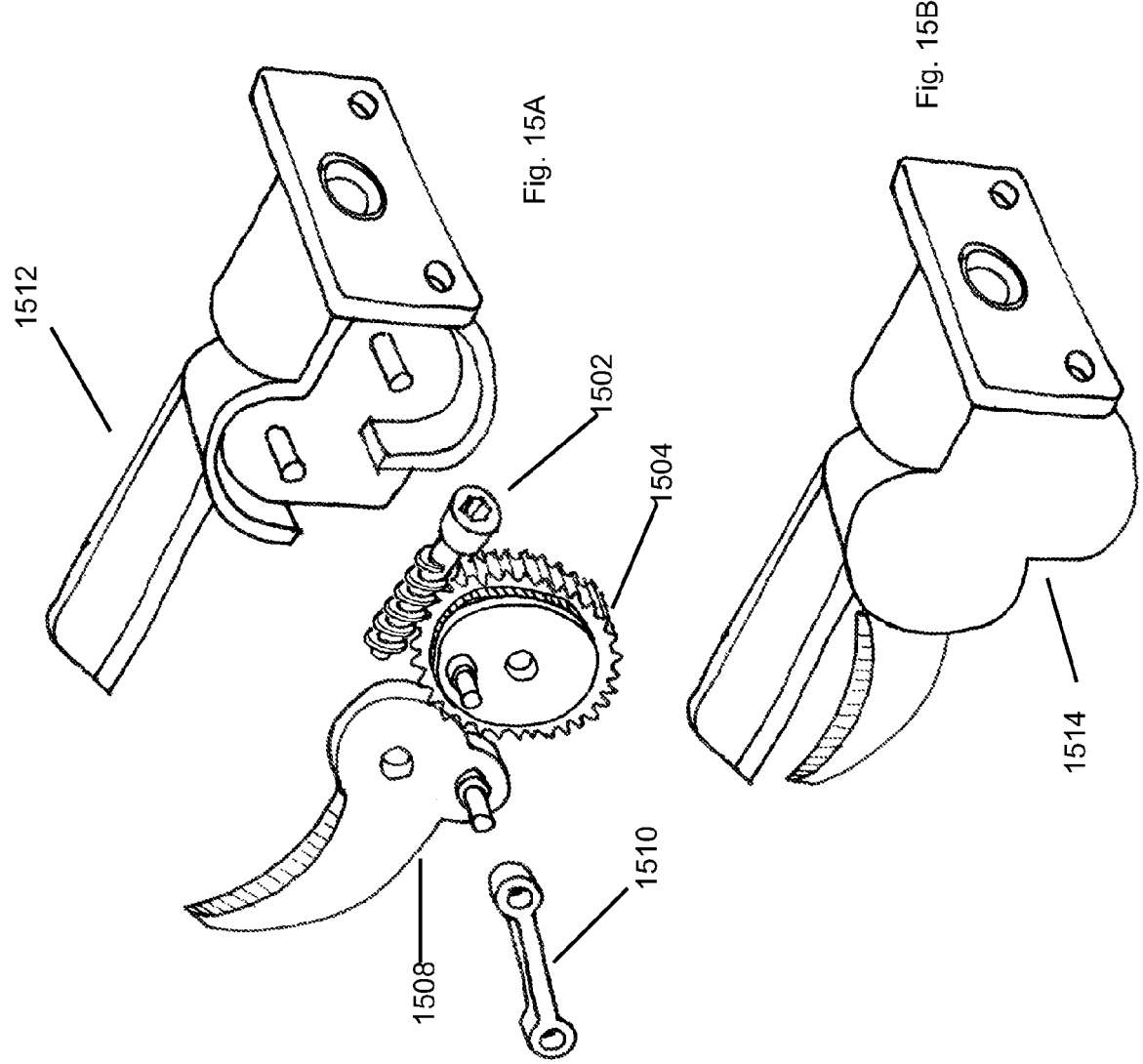

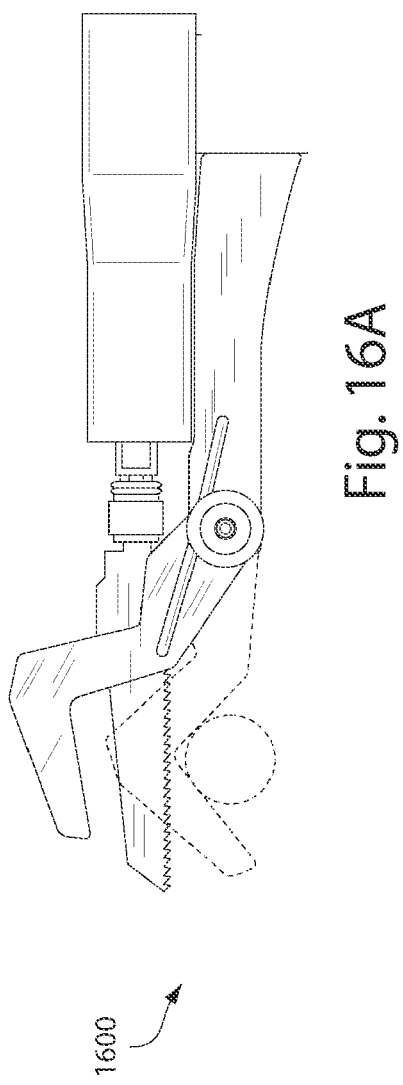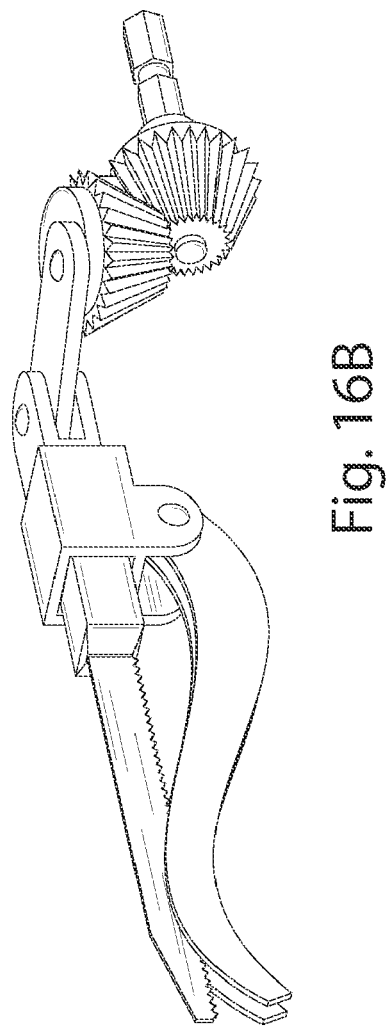
Fig. 16A
Fig. 16B

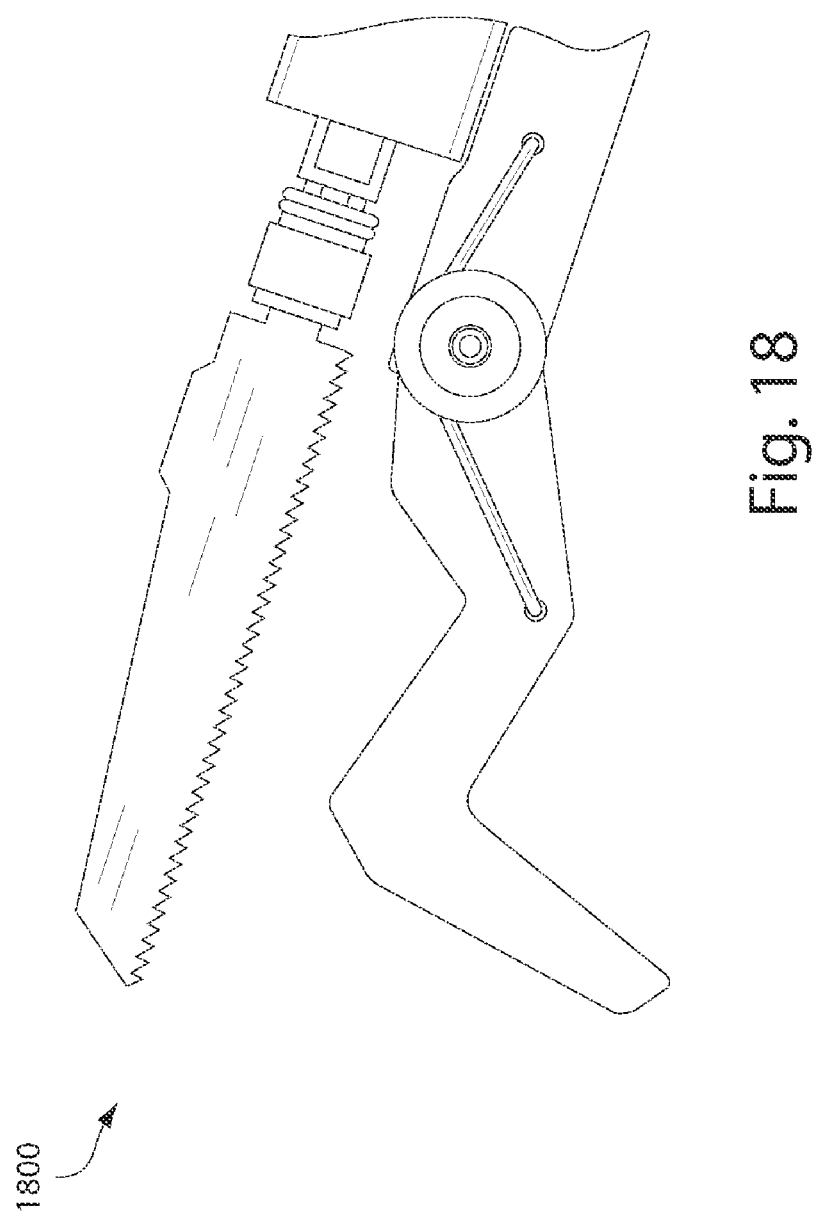

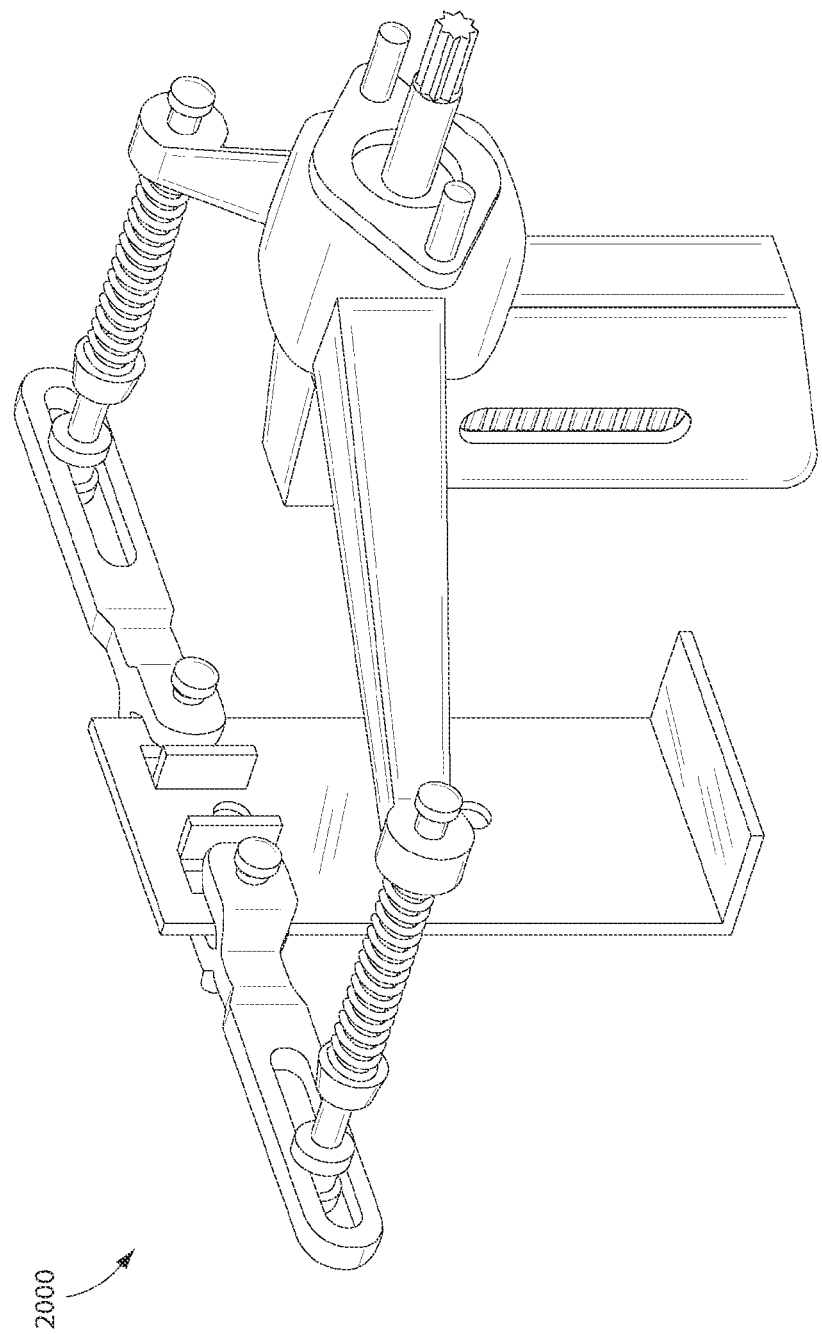

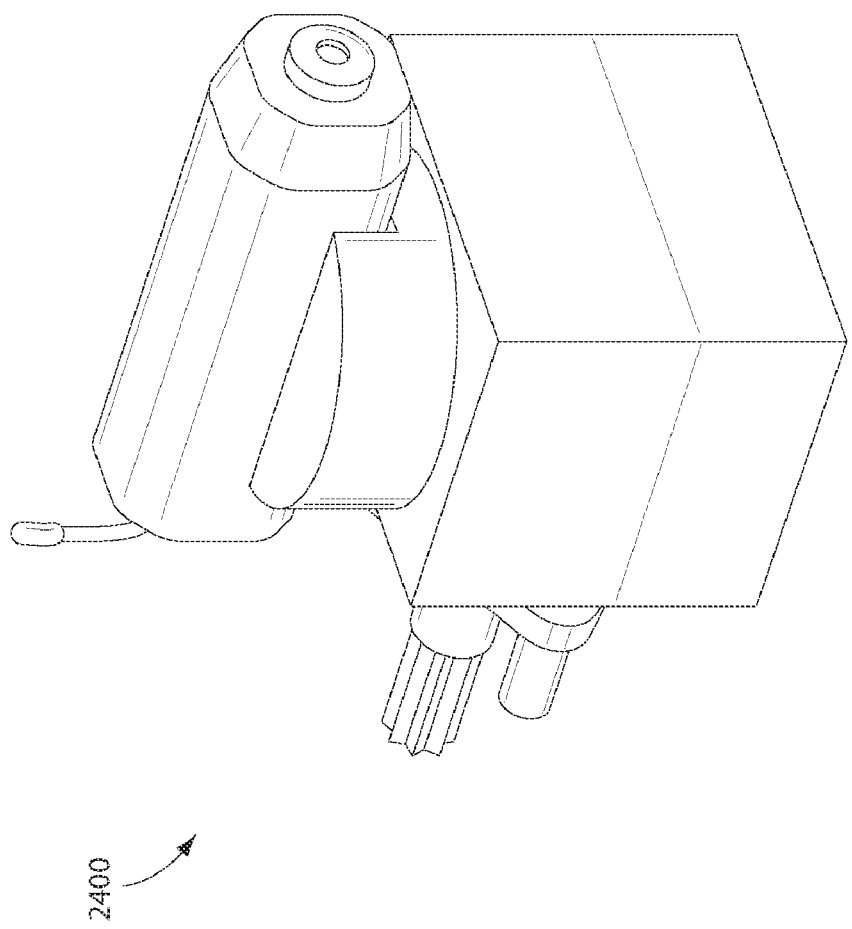

SYSTEMS AND METHODS OF A POWER TOOL SYSTEM WITH INTERCHANGEABLE FUNCTIONAL ATTACHMENTS

CROSS-REFERENCE TO RELATED APPLICATIONS

This application claims the benefit of the following provisional applications, each of which is hereby incorporated by reference in its entirety:

U.S. Provisional Application No. 60/952,938, filed Jul. 31, 2007, "Systems And Methods Of A Power Tool With Interchangeable Functional Modules"; and U.S. Provisional Application No. 60/985,573, filed Nov. 5, 2007, "Systems And Methods Of A Power Tool System With Interchangeable Functional Attachments".

This application is a continuation-in-part of the following U.S. patent applications, each of which is incorporated by reference in its entirety: U.S. application Ser. No. 11/838,697, filed Aug. 14, 2007, "Systems And Methods Of A Gutter Cleaning System", which claims the benefit of the U.S. Provisional Application No. 60/837,993, filed Aug. 15, 2006, "Drainage Channel (Gutter) Cleaning System"; and is a continuation-in-part of the U.S. application Ser. No. 11/935,296 now abandoned, filed Nov. 5, 2007, "Systems And Methods Of A Power Tool System With Interchangeable Functional Attachments".

BACKGROUND

1. Field

The present invention generally relates to systems and methods for a multi-functional power tool system, and in particular, a gutter cleaning system.

2. Description of the Related Art

Tools are often designed to carry out a single function, and thus, an individual may need to purchase and maintain multiple tools, such as a tool for each task they may want to complete, where a tool may facilitate completion of the task. Further, some tasks are prohibitively dangerous for a user wishing to complete the task by themselves, such as gutter cleaning from the top of a ladder. A need exists for a tool that is capable of carrying out a single function, such as gutter cleaning, or multiple functions and may be operated at a distance from the user.

SUMMARY

Provided herein is a gutter cleaning system operable at a distance from a user. Also provided herein is a multi-functional tool which may comprise a power base and an interchangeable head. The tool may enable use of a single base piece that may provide power, handling, and the like, to which modules with different functions may be attached.

In an aspect of the invention, a method and system of a reciprocating tree saw power tool may comprise a power base for powering a reciprocating tree saw attachment, the power base configured to power various other functional modules; a mounting plate of the power base for associating the reciprocating tree saw attachment with the power base; and a control module disposed in the power base for controlling the reciprocating tree saw attachment. In the method and system, a power head may be associated with the power base, the power head may comprise a motor operably connected to a power take-off coupling to provide a power input from the motor to the reciprocating tree saw attachment. In the method and system, the control module may comprise at least one of an energy storage facility, a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The method and system may further comprise a pole disposed between a power head and a control module of the power base, wherein the pole is at least one of telescoping, coaxially segmented, and off-the-shelf.

In an aspect of the invention, a clamping nailer/stapler power tool system may comprise a power base for powering a clamping nailer/stapler attachment, the power base configured to power various other functional modules; a mounting plate of the power base for associating the clamping nailer/stapler attachment with the power base; and a control module disposed in the power base for controlling the clamping nailer/stapler attachment. In the method and system, a power head may be associated with the power base, the power head may comprise a motor operably connected to a power take-off coupling to provide a power input from the motor to the clamping nailer/stapler attachment. In the method and system, the control module may comprise at least one of an energy storage facility, a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The method and system may further comprise a pole disposed between a power head and a control module of the power base, wherein the pole is at least one of telescoping, coaxially segmented, and off-the-shelf.

In an aspect of the invention, a bulb planting auger power tool system may comprise a power base for powering a bulb planting auger attachment, the power base configured to power various other functional modules; a mounting plate of the power base for associating the bulb planting auger attachment with the power base; and a control module disposed in the power base for controlling the bulb planting auger attachment. In the method and system, a power head may be associated with the power base, the power head may comprise a motor operably connected to a power take-off coupling to provide a power input from the motor to the bulb planting auger attachment. In the method and system, the control module may comprise at least one of an energy storage facility, a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The method and system may further comprise a pole disposed between a power head and a control module of the power base, wherein the pole is at least one of telescoping, coaxially segmented, and off-the-shelf.

In an aspect of the invention, a sickle bar hedge trimmer power tool system may comprise a power base for powering a sickle bar hedge trimmer attachment, the power base configured to power various other functional modules; a mounting plate of the power base for associating the sickle bar hedge trimmer attachment with the power base; and a control module disposed in the power base for controlling the sickle bar hedge trimmer attachment. In the method and system, a power head may be associated with the power base, the power head may comprise a motor operably connected to a power take-off coupling to provide a power input from the motor to the sickle bar hedge trimmer attachment. In the method and system, the control module may comprise at least one of an energy storage facility, a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The method and system may further comprise a pole disposed between a power head and a control module of the power base, wherein the pole is at least one of telescoping, coaxially segmented, and off-the-shelf.

In an aspect of the invention, an inspection camera power tool system may comprise a power base for powering an inspection camera attachment, the power base configured to power various other functional modules; a mounting plate of the power base for associating the inspection camera attachment with the power base; and a control module disposed in the power base for controlling the inspection camera attachment. In the method and system, a power head may be associated with the power base, the power head may comprise a motor operably connected to a power take-off coupling to provide a power input from the motor to the inspection camera attachment. In the method and system, the control module may comprise at least one of an energy storage facility, a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The method and system may further comprise a pole disposed between a power head and a control module of the power base, wherein the pole is at least one of telescoping, coaxially segmented, and off-the-shelf.

In an aspect of the invention, a vacuum cup bulb changer power tool system may comprise a power base for powering a vacuum cup bulb changer attachment, the power base configured to power various other functional modules; a mounting plate of the power base for associating the vacuum cup bulb changer attachment with the power base; and a control module disposed in the power base for controlling the vacuum cup bulb changer attachment. In the method and system, a power head may be associated with the power base, the power head may comprise a motor operably connected to a power take-off coupling to provide a power input from the motor to the vacuum cup bulb changer attachment. In the method and system, the control module may comprise at least one of an energy storage facility, a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The method and system may further comprise a pole disposed between a power head and a control module of the power base, wherein the pole is at least one of telescoping, coaxially segmented, and off-the-shelf.

In an aspect of the invention, a method of a gutter cleaning system may comprise providing a housing configured to fit into a gutter; disposing at least one impeller at an end of the housing; driving the impeller with an impeller drive facility, the impeller drive facility being disposed within the housing; and attaching the housing to a placement facility for guiding the housing along the gutter. In the method, the impeller may be removably connected, may be rotating, or may be configured to remove debris from a gutter. In the method, the impeller drive facility includes a transmission. In the method, the housing may include an energy storage facility. In the method, the method may further comprise providing a control facility associated with the gutter cleaning system, wherein the control facility provides control of the gutter-cleaning system. The control facility may be at least one of a remote control facility, a manual control disposed on the housing, and a manual control disposed on the placement facility. The remote control facility may include a wireless communication facility. In the method, the method may further comprise providing an impeller chute for housing a portion of the impeller, wherein debris may be rotated against the chute by the impeller prior to ejection from the gutter. In the method, the method may further comprise disposing debris tines at one or both ends of the housing to loosen and lift matted debris from the bottom and sides of the gutter into the impeller. The debris tines may be formed from at least one of metal, wood, plastic, and molded elastomer. The debris tines may be coated with a solid debris removal solvent. In the method, the impeller may be formed from at least one of a molded elastomer, neoprene, rubber, plastic, and an electrostatic cloth, or may be at least one of a helical-bristled brush, a flexible paddle, a full stiff bristle brush, a spiral stiff bristle brush, a wire brush, a dethatching brush, an alternating paddle brush, a flexible bucket, a multiply-vaned impeller, a counter-rotating brush, and an alternating flexible blade. In the method, the method may further comprise attaching a support guide to the housing to support the housing in the gutter. In the method, the method may further comprise disposing a vision system on at least one of the housing, an impeller, and a placement facility for facilitating a visualization of the gutter. The vision system may comprise a solid state camera, a camera lens, and a video signal electronics module. The vision system may comprise a mirror. In the method, the method may further comprise disposing a moisture sensor on the housing for detecting prohibitive levels of moisture in a gutter. In the method, the method may further comprise providing at least one of an on-board tool or attachment, a downspout cleaning tool, an air hose attachment, a water hose attachment, a vacuum facility, and a weed whacker attachment. The vacuum facility may provide a vacuum through at least one of the impellers, the impeller vane attachment point, the housing, and a vacuum hose attachment. In the method, the impeller drive facility may be at least one of a reversing gear motor, an electric motor, a gasoline-or biofuel-powered internal combustion engine, and a solar-powered motor. In the method, the housing may be formed from at least one of metal, plastic, molded elastomer, weather-resistant materials, water-resistant materials, solvent-resistant materials, temperature-resistant materials, shock-resistant materials, and breakage-resistant materials. In the method, the method may further comprise connecting an energy storage facility to the impeller drive facility for providing power. The energy storage facility may be at least one of a battery, a gasoline fuel or biofuel tank, a power cord, and a solar panel. The battery may be at least one of rechargeable, disposable, lead-acid, gel, nickel cadmium, nickel metal hydride, lithium ion, zinc carbon, zinc chloride, alkaline, silver oxide, lithium ion disulphide, lithium thionyl chloride, mercury, zinc air, thermal, water activated, and nickel oxyhydroxide. In the method, the method may further comprise disposing on the housing at least one of a timer, a digital clock, a thermometer, a radio, an MP3 player, a weather station, a light, a fan, and a storage area. In the method, the method may further comprise disposing on the placement facility at least one of a timer, a digital clock, a thermometer, a radio, an MP3 player, a weather station, a light, a fan, and a storage area. In the method, attaching may be facilitated by at least one of a nut and bolt, a screw, a nail, a rivet, a magnet, an adhesive, a hook-and-loop, an interference locking system, a threaded connection, a sliding attachment, a hinge, a clamp, a tab, a spring-loaded attachment, a sleeve attachment, a snap-fit connection, a ball closure, discrete interlocks, a clasp, a clip, a zipper, a snap, a gasket, an O-ring type closure, a hook-and-eye, and a spring-locking hinge.

In another aspect of the invention, a gutter cleaning system may comprise a housing configured to fit into a gutter; at least one impeller disposed at an end of the housing; an impeller drive facility for driving the impeller, the impeller drive facility being disposed within the housing; and a placement facility attached to the housing for guiding the housing along the gutter. In the system, the impeller may be removably connected, a rotating impeller, or configured to remove debris from a gutter. In the system, the impeller drive facility may include a transmission and the housing may include an energy storage facility. In the system, the system may further comprise a control facility associated with the gutter cleaning system, wherein the control facility provides control of the gutter-cleaning system. The control facility may be at least one of a remote control facility, a manual control disposed on the housing, and a manual control disposed on the placement facility. The remote control facility may include a wireless communication facility. In the system, the system may further comprise an impeller chute for housing a portion of the impeller, wherein debris may be rotated against the chute by the impeller prior to ejection from the gutter. In the system, the system may further comprise debris tines disposed at one or both ends of the housing to loosen and lift matted debris from the bottom and sides of the gutter into the impeller. The debris tines may be formed from at least one of metal, wood, plastic, and molded elastomer. The debris tines may be coated with a solid debris removal solvent. In the system, the impeller may be formed from at least one of a molded elastomer, neoprene, rubber, plastic, and an electrostatic cloth, or may be at least one of a helical-bristled brush, a flexible paddle, a full stiff bristle brush, a spiral stiff bristle brush, a wire brush, a dethatching brush, an alternating paddle brush, a flexible bucket, a multiply-vaned impeller, a counter-rotating brush, and an alternating flexible blade. In the system, the system may further comprise a support guide attached to the housing to support the housing in the gutter. The system may further comprise a vision system disposed on at least one of the housing, an impeller, and a placement facility for facilitating a visualization of the gutter. The vision system may comprise a solid state camera, a camera lens, and a video signal electronics module. The vision system may comprise a mirror. The system may further comprise a moisture sensor disposed on the housing for detecting prohibitive levels of moisture in a gutter. The system may further comprise at least one of an on-board tool or attachment, a downspout cleaning tool, an air hose attachment, a water hose attachment, a vacuum facility, and a weed whacker attachment associated with the housing. The vacuum facility may provide a vacuum through at least one of the impellers, the impeller vane attachment point, the housing, and a vacuum hose attachment. In the system, the impeller drive facility may be at least one of a reversing gear motor, an electric motor, a gasoline-or biofuel-powered internal combustion engine, and a solar-powered motor. In the system, the housing may be formed from at least one of metal, plastic, molded elastomer, weather-resistant materials, water-resistant materials, solvent-resistant materials, temperature-resistant materials, shock-resistant materials, and breakage-resistant materials. The system may further comprise an energy storage facility connected to the impeller drive facility for providing power. The energy storage facility may be at least one of a battery, a gasoline fuel or biofuel tank, a power cord, and a solar panel. The battery may be at least one of rechargeable, disposable, lead-acid, gel, nickel cadmium, nickel metal hydride, lithium ion, zinc carbon, zinc chloride, alkaline, silver oxide, lithium ion disulphide, lithium thionyl chloride, mercury, zinc air, thermal, water activated, and nickel oxyhydroxide. The system may further comprise disposing on the housing at least one of a timer, a digital clock, a thermometer, a radio, an MP3 player, a weather station, a light, a fan, and a storage area. The system may further comprise disposing on the placement facility at least one of a timer, a digital clock, a thermometer, a radio, an MP3 player, a weather station, a light, a fan, and a storage area. In the system, attaching may be facilitated by at least one of a nut and bolt, a screw, a nail, a rivet, a magnet, an adhesive, a hook-and-loop, an interference locking system, a threaded connection, a sliding attachment, a hinge, a clamp, a tab, a spring-loaded attachment, a sleeve attachment, a snap-fit connection, a ball closure, discrete interlocks, a clasp, a clip, a zipper, a snap, a gasket, an O-ring type closure, a hook-and-eye, and a spring-locking hinge.

In another aspect of the invention, a method of a gutter cleaning system may comprise providing a housing configured to fit into a gutter; disposing at least one impeller at an end of the housing; driving the impeller with an impeller drive facility, the impeller drive facility being disposed within a power base; and attaching the housing to the power base for guiding the housing along the gutter. In the method, the power base may comprise a power head and a control module. The power head may comprise at least one of a motor, a gearbox, a gearset, a ring bevel gear, a pivot axis, a power take-off coupling for providing power from the motor to the functional module, the mounting plate, a pin mount, a pin lock mechanism for engagement of the module connection, a connection point with detent release, an articulated extensible pin actuator driven by an electrical solenoid to effect on/off selection of module functions, an axial push/pull solenoid body, an articulated sliding pin actuator driven by an electrical slide solenoid to effect analog mechanical input for module functions, a slide solenoid body, an electrical connector for data inputs to module functions, and a switch adaptable to different functional requirements of the various modules. The motor may be operably connected to a power take-off coupling to provide a power input from the motor to a functional module. The control module may comprise at least one of an energy storage facility, a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The battery may be rechargeable. The control switch may be at least one of a power switch, a module trigger, a module modulation switch, a speed control, a telescoping pole control, and a pivot control. The method may further comprise disposing a pole between the power head and the control module. The pole may be at least one of telescoping, segmented, collapsible, and off-the-shelf. The segmented pole may comprise coaxial connectors on either end of the pole segment to provide power from the control module to the power base. The pole may be threaded on each end to connect to corresponding threads on the power base and the control module. The connection between the pole segments, the pole and the power head, the pole and the control module, or the power head and the control module may be at least one of a threaded connection, a snap-fit connection, a magnetic attachment, an interference locking system, a tab, a ball closure, discrete interlocks, a clasp, a clip, a zipper, a snap, a gasket, an O-ring type closure, a hook-and-loop, a hook-and-eye, and a spring-locking hinge. A wire connecting the control module to the power head may be disposed through, around, or along the pole. The energy storage facility may be at least one of a battery, a solar panel, a gasoline- or biofuel-powered internal combustion engine, and an electrical cord. The mounting plate may utilize a quick release connection. The method may further comprise attaching a support guide to the housing to support the housing in a gutter. The method may further comprise disposing on the housing at least one of a timer, a digital clock, a thermometer, a radio, an MP3 player, a weather station, a light, a fan, and a storage area. The method may further comprise disposing on the power base at least one of a timer, a digital clock, a thermometer, a radio, an MP3 player, a weather station, a light, a fan, and a storage area. In the method, attaching may be facilitated by at least one of a nut and bolt, a screw, a nail, a rivet, a magnet, an adhesive, a hook-and-loop, an interference locking system, a threaded connection, a sliding attachment, a hinge, a clamp, a tab, a spring-loaded attachment, a sleeve attachment, a snap-fit connection, a ball closure, discrete interlocks, a clasp, a clip, a zipper, a snap, a gasket, an O-ring type closure, a hook-and-eye, and a spring-locking hinge. In the method, the impeller may be removably connected, a rotating impeller, or configured to remove debris from a gutter. In the method, the impeller drive facility may include a transmission. In the method, the housing may include an energy storage facility. The method may further comprise providing a control facility associated with the gutter cleaning system, wherein the control facility provides control of the gutter-cleaning system. The control facility may be at least one of a remote control facility, a manual control disposed on the housing, and a manual control disposed on the power base. The method may further comprise providing an impeller chute for housing a portion of the impeller, wherein debris may be rotated against the chute by the impeller prior to ejection from the gutter. The method may further comprise debris tines disposed at one or both ends of the housing to loosen and lift matted debris from the bottom and sides of the gutter into the impeller. The debris tines may be formed from at least one of metal, wood, plastic, and molded elastomer, or may be coated with a solid debris removal solvent. The impeller may be formed from at least one of a molded elastomer, neoprene, rubber, plastic, and an electrostatic cloth, or may be at least one of a helical-bristled brush, a flexible paddle, a full stiff bristle brush, a spiral stiff bristle brush, a wire brush, a dethatching brush, an alternating paddle brush, a flexible bucket, a multiply-vaned impeller, a counter-rotating brush, and an alternating flexible blade. The method may further comprise disposing a vision system on at least one of the housing, an impeller, and a placement facility for facilitating a visualization of the gutter. The vision system may comprise a solid state camera, a camera lens, and a video signal electronics module, or may comprise a mirror. The method may further comprise disposing a moisture sensor on the housing for detecting prohibitive levels of moisture in a gutter. The method may further comprise providing at least one of an on-board tool or attachment, a downspout cleaning tool, an air hose attachment, a water hose attachment, a vacuum facility, and a weed whacker attachment. The vacuum facility may provide a vacuum through at least one of the impellers, the impeller vane attachment point, the housing, and a vacuum hose attachment. In the method, the impeller drive facility may be at least one of a reversing gear motor, an electric motor, a gasoline-or biofuel-powered internal combustion engine, and a solar-powered motor. In the method, the housing may be formed from at least one of metal, plastic, molded elastomer, weather-resistant materials, water-resistant materials, solvent-resistant materials, temperature-resistant materials, shock-resistant materials, and breakage-resistant materials. The battery may be at least one of rechargeable, disposable, lead-acid, gel, nickel cadmium, nickel metal hydride, lithium ion, zinc carbon, zinc chloride, alkaline, silver oxide, lithium ion disulphide, lithium thionyl chloride, mercury, zinc air, thermal, water activated, and nickel oxyhydroxide.

In another aspect of the invention, a gutter cleaning system may comprise a housing configured to fit into a gutter; at least one impeller disposed at an end of the housing; an impeller drive facility for driving the impeller, the impeller drive facility being disposed within a power base; and a power base attached to a housing for providing power to the impeller drive facility. In the system, the power base may comprise a power head and a control module. The power head may comprise at least one of a motor, a gearbox, a gearset, a ring bevel gear, a pivot axis, a power take-off coupling for providing power from the motor to the functional module, the mounting plate, a pin mount, a pin lock mechanism for engagement of the module connection, a connection point with detent release, an articulated extensible pin actuator driven by an electrical solenoid to effect on/off selection of module functions, an axial push/pull solenoid body, an articulated sliding pin actuator driven by an electrical slide solenoid to effect analog mechanical input for module functions, a slide solenoid body, an electrical connector for data inputs to module functions, and a switch adaptable to different functional requirements of the various modules. The motor may be operably connected to a power take-off coupling to provide a power input from the motor to a functional module. The control module may comprise at least one of an energy storage facility, a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The battery may be rechargeable. The control switch may be at least one of a power switch, a module trigger, a module modulation switch, a speed control, a telescoping pole control, and a pivot control. The system may further comprise a pole disposed between the power head and the control module. The pole may be at least one of telescoping, segmented, collapsible, and off-the-shelf. The segmented pole may comprise coaxial connectors on either end of the pole segment to provide power from the control module to the power base, or may be threaded on each end to connect to corresponding threads on the power base and the control module. The connection between the pole segments, the pole and the power head, the pole and the control module, or the power head and the control module may be at least one of a threaded connection, a snap-fit connection, a magnetic attachment, an interference locking system, a tab, a ball closure, discrete interlocks, a clasp, a clip, a zipper, a snap, a gasket, an O-ring type closure, a hook-and-loop, a hook-and-eye, and a spring-locking hinge. A wire connecting the control module to the power head may be disposed through, around, or along the pole. The energy storage facility may be at least one of a battery, a solar panel, a gasoline- or biofuel-powered internal combustion engine, and an electrical cord. The mounting plate may utilize a quick release connection. The system may further comprise attaching a support guide to the housing to support the housing in a gutter. The system may further comprise disposing on the housing at least one of a timer, a digital clock, a thermometer, a radio, an MP3 player, a weather station, a light, a fan, and a storage area, or disposing on the power base at least one of a timer, a digital clock, a thermometer, a radio, an MP3 player, a weather station, a light, a fan, and a storage area. In the system, attaching may be facilitated by at least one of a nut and bolt, a screw, a nail, a rivet, a magnet, an adhesive, a hook-and-loop, an interference locking system, a threaded connection, a sliding attachment, a hinge, a clamp, a tab, a spring-loaded attachment, a sleeve attachment, a snap-fit connection, a ball closure, discrete interlocks, a clasp, a clip, a zipper, a snap, a gasket, an O-ring type closure, a hook-and-eye, and a spring-locking hinge. In the system, the impeller may be removably connected, a rotating impeller, or configured to remove debris from a gutter. In the system, the impeller drive facility may include a transmission. In the system, the housing may include an energy storage facility. The system may further comprise a control facility associated with the gutter cleaning system, wherein the control facility provides control of the gutter-cleaning system. The control facility may be at least one of a remote control facility, a manual control disposed on the housing, and a manual control disposed on the power base. The system may further comprise an impeller chute for housing a portion of the impeller, wherein debris may be rotated against the chute by the impeller prior to ejection from the gutter. The system may further comprise debris tines disposed at one or both ends of the housing to loosen and lift matted debris from the bottom and sides of the gutter into the impeller. The debris tines may be formed from at least one of metal, wood, plastic, and molded elastomer, or may be coated with a solid debris removal solvent. In the system, the impeller may be formed from at least one of a molded elastomer, neoprene, rubber, plastic, and an electrostatic cloth, or at least one of a helical-bristled brush, a flexible paddle, a full stiff bristle brush, a spiral stiff bristle brush, a wire brush, a dethatching brush, an alternating paddle brush, a flexible bucket, a multiply-vaned impeller, a counter-rotating brush, and an alternating flexible blade. The system may further comprise a vision system disposed on at least one of the housing, an impeller, and a placement facility for facilitating a visualization of the gutter. The vision system may comprise a solid state camera, a camera lens, a video signal electronics module, a mirror, and the like. The system may further comprise a moisture sensor disposed on the housing for detecting prohibitive levels of moisture in a gutter. The system may further comprise at least one of an on-board tool or attachment, a downspout cleaning tool, an air hose attachment, a water hose attachment, a vacuum facility, and a weed whacker attachment associated with the housing. The vacuum facility may provide a vacuum through at least one of the impellers, the impeller vane attachment point, the housing, and a vacuum hose attachment. In the system, the impeller drive facility may be at least one of a reversing gear motor, an electric motor, a gasoline-or biofuel-powered internal combustion engine, and a solar-powered motor. The housing may be formed from at least one of metal, plastic, molded elastomer, weather-resistant materials, water-resistant materials, solvent-resistant materials, temperature-resistant materials, shock-resistant materials, and breakage-resistant materials. In the system, the battery may be at least one of rechargeable, disposable, lead-acid, gel, nickel cadmium, nickel metal hydride, lithium ion, zinc carbon, zinc chloride, alkaline, silver oxide, lithium ion disulphide, lithium thionyl chloride, mercury, zinc air, thermal, water activated, and nickel oxyhydroxide.

In another aspect of the invention, a method of a multi-functional power tool system may comprise providing a power base for mounting and powering a functional module, the power base configured to mount various functional modules; assembling the multi-functional power tool system by mounting the functional module to a mounting plate of the power base; and controlling the multi-functional power tool system using a control disposed in the power base. In the method, the functional module may be at least one of a cleaning module, a gutter cleaning module, a holding and fastening module, a finishing and painting module, an inspection module, and a landscape/garden module. The cleaning module may be at least one of a microvacuum module, a vacuum head, a brush, a crevice nozzle, a rotating feather duster, a turbine dusting blower, a power window cleaner with fluid dispensing head powered roller with squeegee, a sweeper, a scrub brush, a liquid pump, a degreaser pump, a shoe shiner, a module suitable for cleaning all or part of a vehicle, and so on. The gutter cleaning module may be at least one of a gutter-cleaning device with impellers, a counter-rotating brush gutter cleaner, a downspout cleaning brush, a vibratory micro-needle for ice removal, an auger brush, an auger tool with impellers, and an auger tool with teeth. The holding and fastening module may be at least one of a dual suction cup flat panel gripper with remote actuate and release, a light bulb changer with rotary head, a drill/driver with remote interchangeable bits, a power nailer/stapler, a wire/cord stapler, two-arm gripper, a gripper suitable for grabbing a variety of household objects, and so on. The finishing and painting module may be at least one of a powered paint roller with remote paint supply, a paint sprayer with paint cup, a paint can sprayer, a two-drum wall sander, and an orbital ¼ sheet sander. The inspection module may be at least one of a digital wireless video/still camera with remote viewing screen, a remote viewing screen, an infrared thermal imager, a moisture detector, a mold detector, and a radon detector. The landscape/garden module may be at least one of a pruning shear, an aerosol spray can actuator, a remote actuated hose nozzle, a remote actuated watering can, a fruit picker, a weed whacker, an edger, a broadcast spreader, a leaf blower, a snow remover, a mulcher, a composter, a trimmer, an aerator, a reel mower, a reciprocating scythe, a rake, and a rotary blade mower. In the method, the power base may comprise a power head and a control module. The power head may comprise at least one of a motor, a gearbox, a gearset, a ring bevel gear, a pivot axis, a power take-off coupling for providing power from the motor to the functional module, the mounting plate, a pin mount, a pin lock mechanism for engagement of the module connection, a connection point with detent release, an articulated extensible pin actuator driven by an electrical solenoid to effect on/off selection of module functions, an axial push/pull solenoid body, an articulated sliding pin actuator driven by an electrical slide solenoid to effect analog mechanical input for module functions, a slide solenoid body, an electrical connector for data inputs to module functions, and a switch adaptable to different functional requirements of the various modules. The motor may be operably connected to a power take-off coupling to provide a power input from the motor to a functional module. The control module may comprise at least one of a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The battery may be rechargeable. The control switch may be at least one of a power switch, a module trigger, a module modulation switch, and a speed control. The method may further comprise disposing a pole between the power head and the control module. The pole may be at least one of telescoping, segmented, and off-the-shelf. The segmented pole may comprise coaxial connectors on either end of the pole segment to provide power from the control module to the power base. The pole may be threaded on each end to connect to corresponding threads on the power base and the control module. The connection between the pole segments, the pole and the power head, the pole and the control module, or the power head and the control module may be at least one of a threaded connection, a snap-fit connection, a magnetic attachment, an interference locking system, a tab, a ball closure, discrete interlocks, a clasp, a clip, a zipper, a snap, a gasket, an O-ring type closure, a hook-and-loop, a hook-and-eye, and a spring-locking hinge. A wire connecting the control module to the power head may be disposed through, around, or along the pole. Power may be provided to the power tool by at least one of a battery, a solar panel, an internal combustion engine, and an electrical cord. In the method, the mounting plate may utilize a quick release connection. The method may further comprise a support guide disposed on the housing for supporting the housing in a gutter. The method may further comprise disposing on the housing at least one of a timer, a digital clock, a thermometer, a radio, an MP3 player, a weather station, a light, a fan, and a storage area. The method may further comprise disposing on the power base at least one of a timer, a digital clock, a thermometer, a radio, an MP3 player, a weather station, a light, a fan, and a storage area. In the method, mounting may be facilitated by at least one of a nut and bolt, a screw, a nail, a rivet, a magnet, an adhesive, a hook-and-loop, an interference locking system, a threaded connection, a sliding attachment, a hinge, a clamp, a tab, a spring-loaded attachment, a sleeve attachment, a snap-fit connection, a ball closure, discrete interlocks, a clasp, a clip, a zipper, a snap, a gasket, an O-ring type closure, a hook-and-eye, and a spring-locking hinge. In the method, the function of the functional module may be adjusted by at least one of a user's manual adjustment and a control facility.

In another aspect of the invention, a multi-functional power tool system may comprise a power base for mounting and powering a functional module, the power base configured to mount various functional modules; a functional module mounted to a mounting plate of the power base; and a control disposed in the power base for controlling the functional module. In the system, the functional module may be at least one of a cleaning module, a gutter cleaning module, a holding and fastening module, a finishing and painting module, an inspection module, and a landscape/garden module. The cleaning module may be at least one of a microvacuum module, a vacuum head, a brush, a crevice nozzle, a rotating feather duster, a turbine dusting blower, a power window cleaner with fluid dispensing head powered roller with squeegee, a sweeper, a scrub brush, a liquid pump, a degreaser pump, and a shoe shiner. The gutter cleaning module may be at least one of a gutter-cleaning device with impellers, a counter-rotating brush gutter cleaner, a downspout cleaning brush, a vibratory (ultrasonic) micro-needle for ice removal, an auger brush, an auger tool with impellers, and an auger tool with teeth. The holding and fastening module may be at least one of a dual suction cup flat panel gripper with remote actuate and release, a light bulb changer with rotary head, a drill/driver with remote interchangeable bits, a power nailer/stapler, a wire/cord stapler, and a two-arm gripper. The finishing and painting module may be at least one of a powered paint roller with remote paint supply, a paint sprayer with paint cup, a paint can sprayer, a two-drum wall sander, and an orbital ¼ sheet sander. The inspection module may be at least one of a digital wireless video/still camera with remote viewing screen, a remote viewing screen, an infrared thermal imager, a moisture detector, a mold detector, and a radon detector. The landscape/garden module may be at least one of a pruning shear, an aerosol spray can actuator, a remote actuated hose nozzle, a remote actuated watering can, a fruit picker, a weed whacker, an edger, a broadcast spreader, a leaf blower, a snow remover, a mulcher, a composter, a trimmer, an aerator, a reel mower, a reciprocating scythe, a rake, and a rotary blade mower. In the system, the power base may comprise a power head and a control module. In the system, the power head may comprise at least one of a motor, a gearbox, a gearset, a ring bevel gear, a pivot axis, a power take-off coupling for providing power from the motor to the functional module, the mounting plate, a pin mount, a pin lock mechanism for engagement of the module connection, a connection point with detent release, an articulated extensible pin actuator driven by an electrical solenoid to effect on/off selection of module functions, an axial push/pull solenoid body, an articulated sliding pin actuator driven by an electrical slide solenoid to effect analog mechanical input for module functions, a slide solenoid body, an electrical connector for data inputs to module functions, and a switch adaptable to different functional requirements of the various modules. In the system, the motor may be operably connected to a power take-off coupling to provide a power input from the motor to a functional module. In the system, the control module may comprise at least one of an energy storage facility, a battery, a battery connection base, a latch for securing and removing the battery, a handle, a control switch, a toggle switch to control analog modulation of the link to the module, an on/off actuation switch to control digital functions in a module, and an I/O connector to facilitate computer programming of onboard power base or module functions. The battery may be rechargeable. The control switch may be at least one of a power switch, a module trigger, a module modulation switch, and a speed control. The system may further comprise a pole disposed between the power head and the control module. The pole may be at least one of telescoping, segmented, and off-the-shelf. The segmented pole may comprise coaxial connectors on either end of the pole segment to provide power from the control module to the power base. The pole may be threaded on each end to connect to corresponding threads on the power base and the control module. The connection between the pole segments, the pole and the power head, the pole and the control module, or the power head and the control module may be at least one of a threaded connection, a snap-fit connection, a magnetic attachment, an interference locking system, a tab, a ball closure, discrete interlocks, a clasp, a clip, a zipper, a snap, a gasket, an O-ring type closure, a hook-and-loop, a hook-and-eye, and a spring-locking hinge. A wire connecting the control module to the power head may be disposed through, around, or along the pole. Power may be provided to the system by at least one of a battery, a solar panel, an internal combustion engine, and an electrical cord. The mounting plate may utilize a quick release connection. The system may further comprise a support guide disposed on the housing for supporting the housing in a gutter. The system may further comprise at least one of a timer, a digital clock, a thermometer, a radio, an MP3 player, a weather station, a light, a fan, and a storage area disposed on the housing. The system may further comprise at least one of a timer, a digital clock, a thermometer, a radio, an MP3 player, a weather station, a light, a fan, and a storage area disposed on the power base. In the system, the functional module may be mounted with at least one of a nut and bolt, a screw, a nail, a rivet, a magnet, an adhesive, a hook-and-loop, an interference locking system, a threaded connection, a sliding attachment, a hinge, a clamp, a tab, a spring-loaded attachment, a sleeve attachment, a snap-fit connection, a ball closure, discrete interlocks, a clasp, a clip, a zipper, a snap, a gasket, an O-ring type closure, a hook-and-eye, and a spring-locking hinge. In the system, the function of the functional module is adjusted by at least one of a user's manual adjustment and a control facility.

In another aspect of the invention, a cleaning power tool system may comprise a power base for mounting and powering a functional module, the power base configured to mount various functional modules; a cleaning module mounted to a mounting plate of the power base; and a control disposed in the power base for controlling the cleaning module. The cleaning module may be at least one of a microvacuum module, a vacuum head, a brush, a crevice nozzle, a rotating feather duster, a turbine dusting blower, a power window cleaner with fluid dispensing head powered roller with squeegee, a sweeper, a scrub brush, a liquid pump, a degreaser pump, and a shoe shiner.

In another aspect of the invention, a gutter cleaning power tool system may comprise a power base for mounting and powering a functional module, the power base configured to mount various functional modules; a gutter cleaning module mounted to a mounting plate of the power base; and a control disposed in the power base for controlling the gutter cleaning module. In the system, the gutter cleaning module may be at least one of a gutter-cleaning device with impellers, a counter-rotating brush gutter cleaner, a downspout cleaning brush, a vibratory micro-needle for ice removal, an auger brush, an auger tool with impellers, and an auger tool with teeth.

In another aspect of the invention, a holding and fastening power tool system may comprise a power base for mounting and powering a functional module, the power base configured to mount various functional modules; a holding and fastening module mounted to a mounting plate of the power base; and a control disposed in the power base for controlling the holding and fastening module. In the system, the holding and fastening module may be at least one of a dual suction cup flat panel gripper with remote actuate and release, a light bulb changer with rotary head, a drill/driver with remote interchangeable bits, a power nailer/stapler, a wire/cord stapler, and a two-arm gripper.

In another aspect of the invention, a finishing and painting power tool system may comprise a power base for mounting and powering a functional module, the power base configured to mount various functional modules; a finishing and painting module mounted to a mounting plate of the power base; and a control disposed in the power base for controlling the finishing and painting module. In the system, the finishing and painting module may be at least one of a powered paint roller with remote paint supply, a paint sprayer with paint cup, a paint can sprayer, a two-drum wall sander, a floor sander, and an orbital ¼ sheet sander.

In another aspect of the invention, an inspection power tool system may comprise a power base for mounting and powering a functional module, the power base configured to mount various functional modules; an inspection module mounted to a mounting plate of the power base; and a control disposed in the power base for controlling the inspection module. In the system, the inspection module may be at least one of a digital wireless video/still camera with remote viewing screen, a remote viewing screen, an infrared thermal imager, a moisture detector, a mold detector, and a radon detector.

In another aspect of the invention, a landscape/garden power tool system may comprise a power base for mounting and powering a functional module, the power base configured to mount various functional modules; a landscape/garden module mounted to a mounting plate of the power base; and a control disposed in the power base for controlling the landscape/garden module. In the system, the landscape/garden module may be at least one of a pruning shear, an aerosol spray can actuator, a remote actuated hose nozzle, a remote actuated watering can, a fruit picker, a weed whacker, an edger, a broadcast spreader, a leaf blower, a snow remover, a mulcher, a composter, a trimmer, an aerator, a reel mower, a reciprocating scythe, a rake, and a rotary blade mower.

In one aspect, a light bulb changing tool that is disclosed herein includes a gripper having a gripping side and an attaching side, the gripper having a flexible shape; an attachment point disposed on the attaching side; and a polymer disposed on the gripping side. The attachment point may be adapted to attach to a gear head. The polymer may be a low viscosity viscoelastic polymer. The flexible shape may be formed by a plurality of fingers, the fingers being compliant. The attachment point may include a gear head, the gear head being adapted to receive an input torque at a first speed and to rotate the gripper with an output torque at a second speed, the first speed being greater than the second speed. The gear head may further include a torque-limiting clutch that is adapted to limit the output torque. The torque-limiting clutch may be an adjustable friction clutch. The attachment point may include an electric motor gear head adapted to rotate the gripper; a pole having a first end and a second end, the electric motor gear head being disposed on the first end, the second end being adapted to attach to a remote power base; and a wire having a first end and a second end, the first end of the wire being connected to the electric motor gear head, and the second end of the wire being adapted to connect to an electrical connector of the remote power base. The pole may be a segmented pole. The pole may be a telescoping pole. The electric motor gear head may include a torque-limiting clutch that is adapted to limit a torque of the electric motor gear head. The torque-limiting clutch may be an adjustable friction clutch.

In one aspect, a vehicle cleaning tool that is disclosed herein includes a rotational arbor; and a gear head adapted to rotate the rotational arbor, wherein the gear head is adapted to couple to a power head having a quick-release connection point. The vehicle cleaning tool may include the power head having the quick-release connection point; a pole having a first end and a second end, the power head being disposed on the first end, the second end being adapted to attach to a remote power base; and a wire having a first end and a second end, the first end of the wire being connected to the power head, and the second end of the wire being adapted to connect to an electrical connector of the remote power base. The pole may be a segmented pole. The pole may be a telescoping pole. The gear head may include a torque-limiting clutch. The torque-limiting clutch may be an adjustable friction clutch.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 15A depicts an exploded view of a pruning shear.

FIG. 15B depicts a perspective view of a pruning shear.

FIGS. 16A and 16B depicts a reciprocating tree saw attachment.

FIG. 18 depicts a reciprocating tree saw attachment with the grip guard closed.

FIG. 20 depicts a clamping nailer/stapler attachment.

FIG. 24 depicts a front view of an inspection camera.

DETAILED DESCRIPTION

Figure 1:
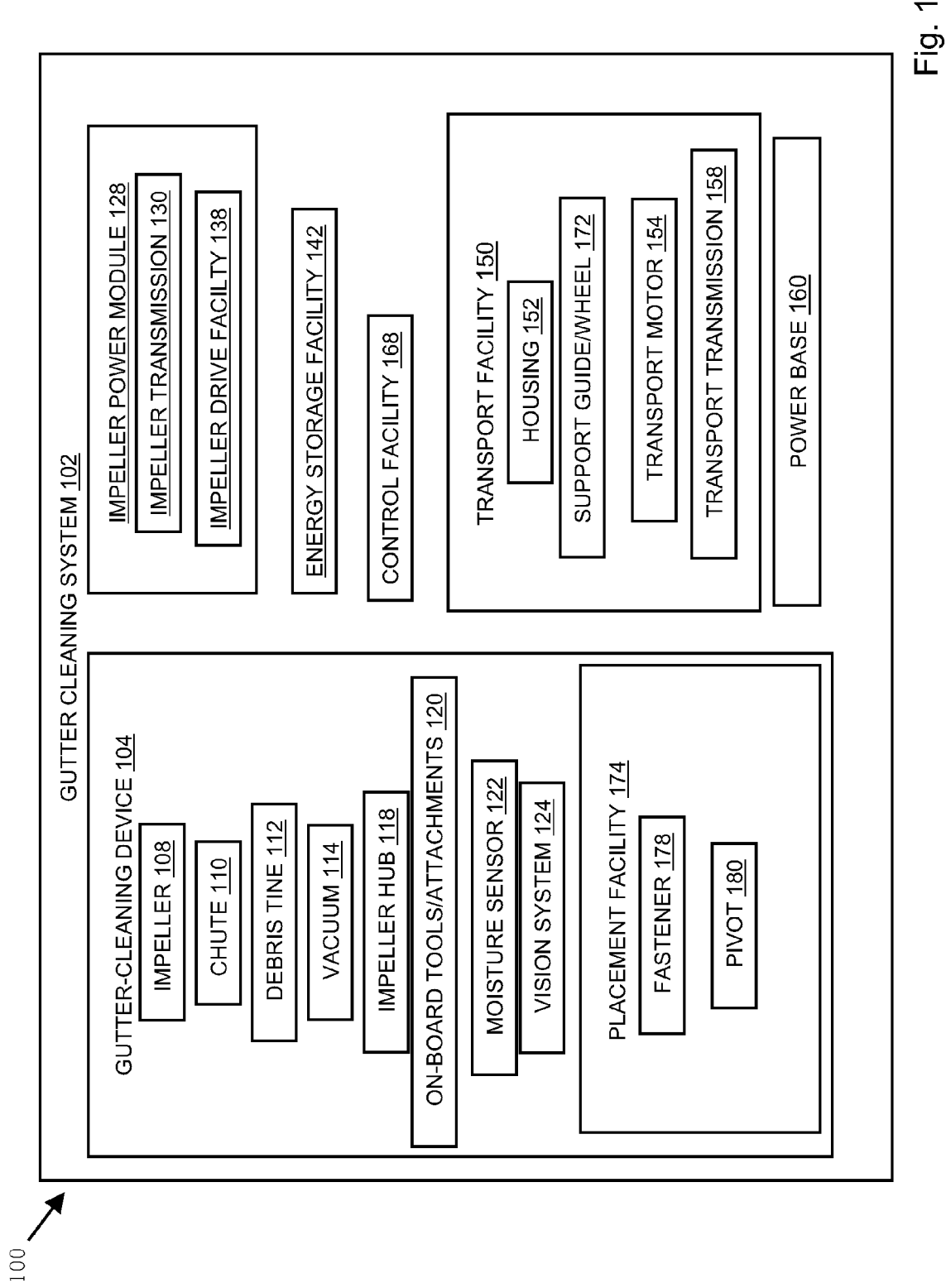
FIG. 1 depicts a gutter cleaning system.

A gutter cleaning system may comprise a gutter-cleaning device and a placement facility, wherein the functional elements of the gutter-cleaning device may be disposed within the gutter-cleaning device, or wherein at least a portion of the functional elements of the gutter-cleaning device are disposed within the power base. The power base may provide the ability to use a single base piece that provides power, handling, and the like, to which modules with different functions may be attached. Thus, the power base may eliminate the need to purchase, store, and maintain multiple power tools for each function that may be accomplished by a particular module. A user may deploy the gutter cleaning system by lifting or lowering a gutter-cleaning device attached to an end of a placement facility or power base into a gutter. A user may maneuver the gutter-cleaning device along the gutter while it disposes of gutter debris using rotating impellers on at least one end of the gutter-cleaning device.

The following description also sets out a holding and fastening system. This system may comprise a gripper suitable for grabbing a variety of household objects and a detachable power base. In embodiments, the gripper may be adapted to grasp and twist a light bulb, allowing a user to install and remove the light bulb from a socket. Such an adaptation may be applied to install and remove a light bulb that is beyond arm's reach; that requires more force to install and remove than the user can comfortably, manually provide; that is damaged in a way that would make manual installation and removal hazardous to the user; and so on. It will be understood that many adaptations of the gripper are possible, that some of these adaptations will be more or less specific to a particular type of household item, and that the principles of the holding and fastening system have broad application. Furthermore, it will be understood that a variety of modules may, from time to time, be individually attached to the power base and that the gripper may be one such module.

The following description also sets out a cleaning system. This system may comprise a module suitable for cleaning all or part of a vehicle and a detachable power base. In embodiments, the module may include a cleaning head that employs a rotary motion to clean all or part of the vehicle. In embodiments, the module may include a vacuum component that generates suction for cleaning all or part of the vehicle. It will be understood that the principles of the cleaning system have broad application, and may be employed in numerous other context where a cleaning system is useful. All such contexts and applications are intended to fall within the scope of this disclosure. Furthermore, it will be understood that a variety of modules may, from time to time, be individually attached to the power base and that the module suitable for cleaning all or part of a vehicle may be one such module.

Generally, the power base may provide power, handing, and user controls features to a powered tool consisting of the power base and a module that is attached to the power base. When a module is attached to the power base, the power base may provide electrical and/or mechanical power to the module. The power may move and/or light an aspect of the module in a way that is useful in applications. For example, the motion may rotate an element that clears a gutter; grip, twist, and/or release a light bulb; rotate a cleaning head that cleans all or part of a vehicle; and so on. It will be understood that the principles of the present invention have broad application, and may be applied in a wide variety of contexts where a powered tool provides a use to a user. All such variations, contexts, and applications are intended to fall within the scope of this disclosure.

Throughout this disclosure the phrase "such as" means "such as and without limitation." Throughout this disclosure the phrase "for example" means "for example and without limitation." Throughout this disclosure the phrase "in an example" means "in an example and without limitation." Throughout this disclosure the phrase "in another example" means "in another example and without limitation." Generally, any and all examples may be provided for the purpose of illustration and not limitation.

Referring to FIG. 1, a gutter cleaning system 102 may comprise a gutter-cleaning device 104, an impeller power module 128, an energy storage facility 142, a transport facility 150, and, optionally, a power base 160. The gutter-cleaning device 104 may comprise an impeller 108, a chute 110, a debris tine 112, a vacuum 114, an impeller hub 118, on-board tools or attachments 120, a moisture sensor 122, a vision system 124, a placement facility 174, and the like. An impeller power module 128 may comprise an impeller transmission 130, an impeller drive facility 138, and the like. A transport facility 150 may comprise a housing 152, a wheel 172, and the like. A power base 160 may comprise a control facility 168, an energy storage facility 142, and the like. The cleaning system may comprise a user operated device for cleaning drainage channels, or "gutters" and methods thereof. Gutter cleaning may involve removing debris, such as leaves, bark, twigs, nut shells, nuts, airborne matter, bird's nests, ice, water, foreign objects, and any other matter that may accumulate in a gutter. A user of the gutter cleaning system may deploy a gutter-cleaning device 104 into a gutter with the use of a placement facility 174, such as a guide pole, or a power base 160 and initiate operation of the device 104 using a control facility 168 mounted on the device 104, the placement facility 174, the power base 160, or by a remote control.

Continuing to refer to FIG. 1, the impellers 108 of the device 104 may be configured and disposed to capture debris for removal from the gutter. The impellers 108 may be connected to one or both ends of the gutter-cleaning device 104. In embodiments, the gutter-cleaning device 104 is operable with a single impeller 108 or multiple impellers 108. In some embodiments, an impeller 108 may be attached to the device 104 by an impeller hub 118. The impeller hub 118 may be connected to an impeller drive shaft. In an alternative embodiment, the impeller 108 may connect to an impeller drive shaft or impeller axle directly.

In an embodiment, an impeller chute 110 may be connected to the device 104 and may substantially surround a portion of the impeller 108 to direct debris discharged from the impeller 108 out of the gutter. A battery pack or an energy storage facility 142 may be operably connected to an impeller drive facility 138 to provide power to rotate the impeller 108, impeller hub 118, or impeller drive shaft. As the impeller 108 rotates, the impeller 108 may capture accumulated debris either between impeller vanes, fins, paddles, and the like or against an impeller chute 110 disposed around a portion of the impeller 108. The rotational torque of the impeller 108 may move the captured debris against the surface of the chute 110 or the gutter wall. At the top end of the chute 110 or the gutter, the gutter debris may be discharged at a high enough velocity such that the debris may clear the outside wall of the gutter. Once clear of the gutter, the debris may fall to the ground, may be captured in a disposal bag attached to the gutter, may be captured in a disposal bag attached to the gutter-cleaning device 104, or the like.

Figure 2:
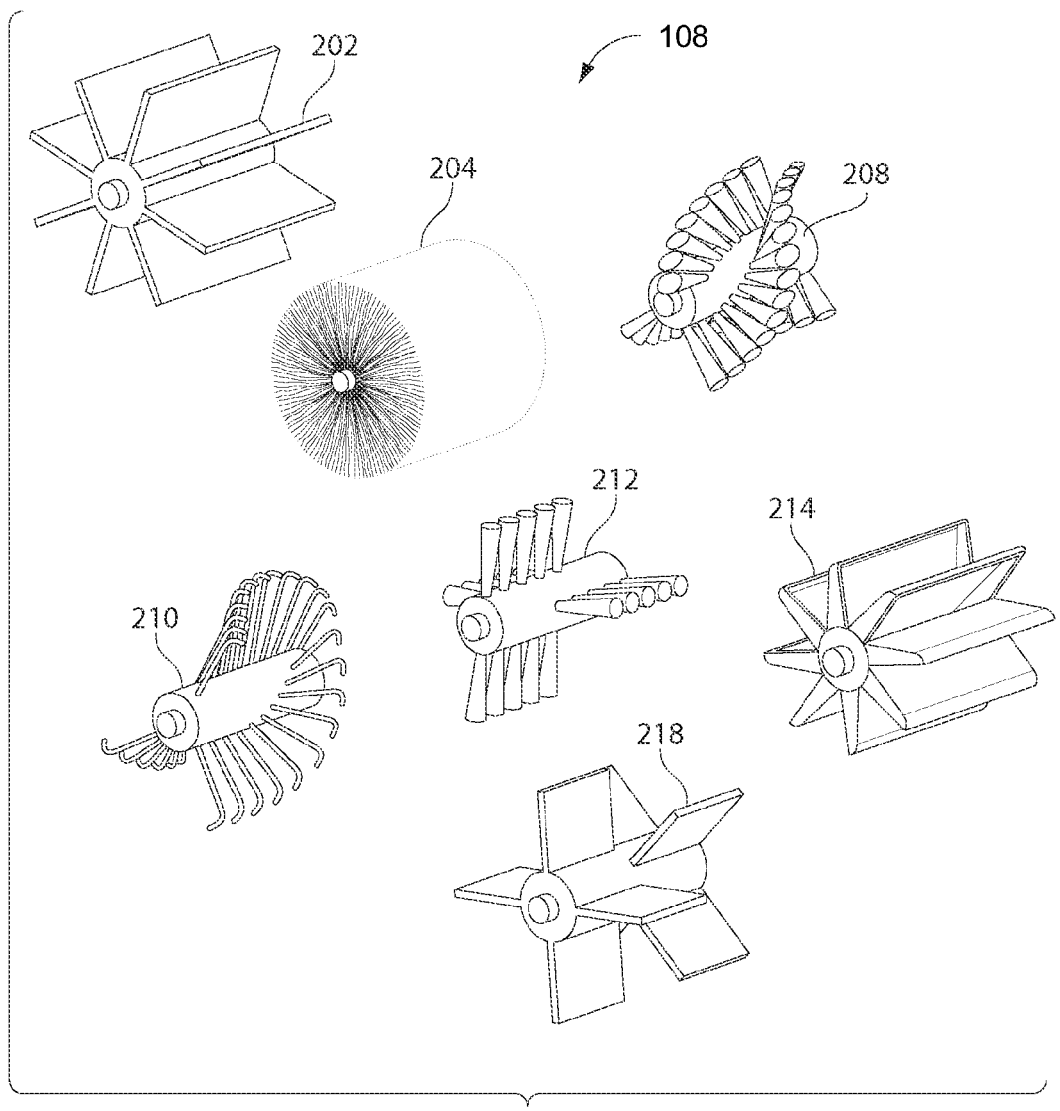
FIG. 2 depicts various impellers.

In an embodiment, the impellers 108 on one or both ends of the device 104 may be detachable and interchangeable with any impeller configuration. Detachability of the impellers 108 may facilitate cleaning, replacement, storage, shipping, disposal, various impeller functions, and the like. In an embodiment, the impellers 108 may comprise many different materials such as molded elastomer, neoprene, rubber, plastic, electrostatic cloth, and the like. Referring to FIG. 2, the impeller 108 may be at least one of a helical-bristled brush, a flexible paddle 202, a full stiff bristle brush 204, a spiral stiff bristle brush 208, a wire brush 210, a dethatching brush 210, an alternating paddle brush 212, a flexible bucket 214, a multiply-vaned impeller, an alternating flexible blade 218, counter-rotating brushes, and the like. In embodiments, a user may be able to swap any impeller 108 for another, such as for example, by disconnecting an impeller 108 from an impeller hub 118 or impeller drive shaft. In other embodiments, the impeller 108 is not removable, may be formed integrally with device 104, may be formed integrally with the impeller drive shaft, and the like.

The impeller 108 may have multiple impeller vanes disposed about a central attachment point. Each impeller vane may be flexible to facilitate deflection under gutter cross braces and movement against the chute 110, gutter walls, and gutter floor. In an embodiment, the impellers 108 may be sized to span the gutter, span portions of debris, or a combination thereof, such as four inches in diameter and three inches in length. In an embodiment, the impellers 108 may be compliant enough such that they deform under pressure, such as to 0.75" inward with one pound of force.

In an embodiment, the impeller 108 may comprise a vacuum facility 114 disposed within the gutter-cleaning device 104 or within the impeller 108, and a vacuum motor disposed within the housing 152, the power base 160, or a separate structure. The vacuum facility 114 may provide suction through the impellers 108, the impeller vane attachment point, the housing 152, and the like in order to loosen debris from the gutter. In an alternative embodiment, the impeller 108 may be replaced with a vacuum hose attachment. As the gutter-cleaning device 104 moves along the gutter, the vacuum 114 attachment may vacuum up debris and remove it from the gutter. Removal may be through a collection hose attached to a collection bag, a yard waste receptacle, a mulching or composting system, and the like.

In embodiment, the chute 110 may facilitate discharge of gutter debris. In an embodiment, the chute 110 may be a housing for at least a portion of the impeller 108. In embodiments, the chute 110 may not protrude above the top line of the gutter-cleaning device 104, may not interfere with gutter cross braces, may be deformable to permit passage under gutter cross braces, and the like. The shape and form factor of the impeller chute 110 may be one factor that may determine the average trajectory of the ejected debris. In an embodiment, as further described herein, the chute 110 may be disposed between two counter-rotating brushes such that counter rotation of the brushes draws gutter debris to the center of the device 104 at the base of a chute 110. The continued rotation of the counter-rotating brushes creates enough force to discharge the debris from the chute 110.

In an embodiment, debris tines 112 may be connected to one or both ends of the gutter-cleaning device 104. The debris tines 112 may be configured and disposed to loosen and lift matted debris from the bottom and sides of the gutter into the impeller 108. The debris tines 112 may be attached to a lower part of the housing 152 or the sides of the housing 152 at the ends of the gutter-cleaning device 104. The debris tines 112 may be formed from almost any material, including metal, wood, plastic, molded elastomer, and the like. To facilitate debris loosening, the debris tines 112 may be coated with a solid debris removal solvent. Before placement of the gutter-cleaning device 104 into the gutter, the solid debris removal solvent may be activated. Activation may be by placing water or some other activating solvent on the debris tines 112, removing a protective overlay, and the like. In an alternative embodiment, debris removal solvent may be disposed within the housing 152. When the impellers 108 may be activated, some solvent may be applied to the gutter surface using a spray, a simple gravity fed system, and the like.

In an embodiment, the impeller drive facility 138 may be configured and disposed to drive the impeller 108 with any necessary rotational speed and torque. The impeller drive facility 138 may be coupled to the impeller 108, impeller hub 118, or impeller drive shaft, and housed within the housing 152, within the impeller hub 118, within the impeller 108, within the power base 160, within the impeller drive shaft, and the like. In some embodiments, the impeller drive facility 138 may comprise a motor or engine and a speed/torque modifying transmission 130. The motor may be any one of a reversing gear motor, an electric motor, a gasoline-or biofuel-powered internal combustion engine, a solar-powered motor, and the like. In an embodiment, the motor may be a 12 Volt DC single speed motor with transfer gearing to an impeller drive shaft. In some embodiments, each impeller 108 may be driven by its own impeller drive facility 138. In any event, each impeller 108 may be independently controlled by a control facility 168, or more than one impeller 108 may be controlled simultaneously. Motor cooling may be on a top surface of the gutter-cleaning device 104 and may minimize fluid entry to the device. In some embodiments, the motor may be mechanically coupled to the impeller transmission 130 such that the rotational output of the drive facility 138 is a rotational input to the impeller transmission 130. The rotational output of the impeller transmission 130 may rotate the impeller 108 about its central axis. In an embodiment, the impeller drive facility 138 may comprise a motor or engine connected directly to an output without any intervening speed/torque modifying transmission 130. In an embodiment, the impeller drive facility 138 may operate at 400 rpm @ 300 in.lbs. of torque. In an embodiment, the impeller drive facility 138 may couple to and drive the support guide/wheel 172.

In an embodiment, the gutter-cleaning device 104 may have a perimeter internal gear disposed in the impeller 108, and a corresponding spur gear attached to a transfer/drive shaft and impeller gear box which may rotate one or more impellers 108. The impeller 108 may have a bearing which attaches to a stationary impeller axle, allowing the impeller 108 to freely rotate about a central axis. As the impeller 108 rotates, a vane on the impeller may enable the removal of debris from a gutter. An impeller drive facility 138 may drive the spur gear and may be powered by an energy storage facility 142.

In an embodiment, the impellers 108 may have a nosecap held on by a clip. The nosecap may be a transparent lens for a vision system 124, as further described herein. Wiring for the vision system 124 may be from the nosecap, through an impeller axle or impeller drive shaft, and to a motor control and communication circuit board.

In an embodiment, the impeller transmission 130 may comprise transfer gear driving. A gear may be coupled to a selector fork with a transfer shaft delivering power to the impeller 108 from the power base 160 with a power take-off coupling.

In an embodiment, a support/guide wheel 172 may be connected to the body of the device 104. In embodiments, the support/guide wheel 172 may be rotatably connected to the body of the device 104. The support/guide wheel 172 may be configured and disposed to ride on the gutter edge while the gutter-cleaning device 104 is inside a gutter, to provide support beneath the gutter-cleaning device 104, and the like. The support/guide wheel 172 may support a portion of the system weight such that the movement of the device 104 is eased along the gutter trough. In embodiments, the support/guide wheel 172 may be a wheel, a hook, a bracket, a track optionally sized to fit over a lip of a gutter, tractor/tread wheels and tracks, finned hemispherical wheels, rubber wheels, vulcanized wheels, and the like. In an embodiment, the support guide/wheel 172 facilitates moving the gutter-cleaning device 104 within the gutter in either direction, such as forwards and backwards. In an embodiment, the support guide/wheel 172 may be attached to an axle. The axles may be located fore and aft and may be transversely connected to one another. The axles may be connected through an impeller drive shaft. The axles may be connected to the device housing 152 and may allow the support guide/wheel 172 to freewheel. In some embodiments, the support guide/wheel 172 may be connected to a driven axle and may be driven by a transport motor 154 or an impeller drive facility 138.

In an embodiment, the transport drive 154 may be connected to at least one support guide/wheel 172, a snake drive, a worm drive, a crab or walking drive, a scoot-and-compress or accordion drive, a string of beads drive, some other translation mechanism, and the like. The transport drive 154 may be housed within the housing 152 of the gutter-cleaning device 104 or the power base 160. The transport motor 154 may be configured and disposed to provide rotational speed and torque to the support guide/wheel 172 or other translation mechanism in a sufficient amount to drive the gutter-cleaning device 104. The transport motor 154 may comprise a motor or engine and a transmission 158. The motor 154 may be any one of a reversing gear motor, an electric motor, a gasoline-or biofuel-powered internal combustion engine, a solar-powered motor, and the like. In an embodiment, the motor 154 may be a 12 Volt DC single speed motor with transfer gearing to an impeller drive shaft. Motor cooling may be on a top surface of the gutter-cleaning device 104 and may minimize fluid entry to the device. The transmission 174 may be a speed/torque modifying transmission. The transport motor 154 may have a static or variable speed setting. The speed setting may be set in the factory or by a user. For example, the speed may be set to 4 inches per second. In another example, a user may use a control facility 168, as further described herein, to modify the speed from a fast speed to a slow speed. The transport motor 154 may work with the support guide/wheel 172 or alternate translation mechanisms to move the gutter-cleaning device 104 within the gutter in either direction, such as forwards and backwards. In embodiments, the transport motor 154 may also operably connect to the impeller drive shaft to drive the impellers 108. In operation, a user may use the power base 160 or placement facility 174 to place the device 104 in a gutter and allow the transport motor 154 to facilitate movement of the device 104 along the gutter while the user guides the device 104 with the power base 160 or placement facility 174, such as for example, when a gutter cross brace is reached and the device may need to be repositioned on the other side of the cross brace.

In an embodiment, the housing 152 may be formed from any suitable material, such as metal, plastic, molded elastomer, and the like. In an embodiment, the housing 152 materials may be weather-resistant, water-resistant, solvent-resistant, temperature-resistant, shock-resistant, breakage-resistant, and the like. All of the components of the gutter-cleaning device 104, including at least the housing 152, impellers 108, debris tines 112, on-board tools/attachments 120, transport facility 150, placement facility 174, energy storage facility 142, control facility 168, power base 160, and the like may be easy to clean, may withstand all manners of environmental phenomena and exposure, may withstand falls from the gutter onto a surface, such as concrete, asphalt, stone, grass, roofing, and the like. The housing 152 may provide weight to the gutter-cleaning device 104 such that the device may exert any necessary force or torque on the impeller 108 to detach debris. In some embodiments, the gutter-cleaning device 104 may be light enough to be lifted the height of the gutter for placement within the gutter. The housing 152 may be sized to house the internal components of the gutter-cleaning device 104. The cross sectional dimensions of the housing 152 and gutter-cleaning device 104 may be limited by the size of a gutter, such as no more than 2.75" high and 3.0" wide.

In an embodiment, a moisture sensor 122 disposed on the housing 152 of the device 104 may sense when water levels may be prohibitive to operation of the gutter-cleaning device 104. The moisture sensor 122 may generate an audible alert, a visual alert, a vibratory alert, a power shut-down mode, or any combination thereof if the detected moisture levels are prohibitive to operation of the device 104.

In an embodiment, the housing 152, placement facility 174, or power base 160 may comprise additional functionality, such as any one of a timer, a digital clock, a thermometer, a radio, an MP3 player, a weather station, a light, a fan, a storage area, and the like. The additional functionality may be powered by an energy storage facility 142.

Continuing to refer to FIG. 1, an energy storage facility 142 may be disposed within the housing 152 or the power base 160 of the gutter-cleaning device 104 and electrically connected to the impeller drive facility 138 and/or transport facility 150. The energy storage facility 142 may be a battery. The battery may be rechargeable, disposable, lead-acid, gel, nickel cadmium, nickel metal hydride, lithium ion, zinc carbon, zinc chloride, alkaline, silver oxide, lithium ion disulphide, lithium thionyl chloride, mercury, zinc air, thermal, water activated, nickel oxyhydroxide, and the like. For example, a battery pack may supply 12 Volts DC at 2.2 Amp Hr. The rechargeable battery may comprise a recharging or docking station. The battery may be removable for docking or the entire device 104 may be docked. In an embodiment, the docking station may be disposed at the end of a gutter. In this example, the gutter-cleaning device 104 may dock once a cleaning cycle is complete, if the battery is low, if directed to dock by a user, and the like. In an embodiment, at least one of an audible, visual, or vibratory alert may indicate that the battery power or energy storage facility level is low. In an embodiment, the energy storage facility 142 may be a gasoline fuel or biofuel tank. The energy storage facility 142 may be a solar panel. In embodiments, the energy storage facility 142 may be a power cord to enable drawing power directly from a power outlet through a power cord. In any event, the energy storage facility 142 may be configured to be easily and quickly interchangeable for recharging, refilling, re-energizing and the like outside of the gutter cleaning system 100.

In an embodiment, the gutter-cleaning device 104 may comprise a control facility 168. In an embodiment, the control facility 168 may be disposed on the gutter-cleaning device 104, a power base 160, a placement facility 174, and the like. The control facility 168 may be a button, a lever, a switch, a dipswitch, a keypad switch, a rotary switch, a slide switch, a toggle, a rocker switch, a knife switch, a knob, a pull cord, a touch sensitive input, a remote control and remote control input, a key, a magnetic switch, a proximity sensor, a mercury tilt switch, and the like. The control facility 168 may be a device power switch, an additional functionality power or control switch, a speed control, a direction of travel control, a direction of rotation control, a module trigger, a module modulation switch, a module speed control, a telescoping control, a head pivot control, and the like. The control facility 168 may comprise a data input for device programming. The control facility 168 may be configured and disposed to control the impeller 108 actuation, wheel 172 actuation, and the like. The wireless control facility 168 may control power delivery from the energy storage facility 142 to the impeller drive facility 138 and transport motor 154. The control facility 168 may allow a user to change the direction of the device 104 in a gutter, change the speed of movement of the device 104, change the speed of the impellers 108, change the direction of rotation of the impellers 108, operate an on board tool/attachment 120, a vacuum 114, a moisture sensor 122, a vision system 124, and the like. The control facility 168 may have a low battery alert, such as an audible alert, a visible alert, a vibration alert, and the like.

In an embodiment, a gutter-cleaning device 104 may comprise a vision system 124. The vision system 124 may comprise a solid state camera, a camera lens, a video signal electronics module, and the like. The solid state camera may be mounted in the front of an impeller 108 or impeller hub 118, optionally on a center axis. A camera lens may be mounted directly in front of the solid state camera and may be configured and disposed to focus an image for the solid state camera. The camera lens may also protect the solid state camera from being damaged by debris. The solid state camera and the video signal electronics module may interact to enable wireless transmission of a video signal. Images may be transmitted to a signal reception device. Having seen the images, a user may modify, continue, or cease the operation of the device 104. For example, if the images indicate that the gutter still has debris to clear, the user may continue to operate the gutter-cleaning device 104 in at least those portions of the gutter that still retain debris. In an embodiment, the vision system 124 may comprise a mirror disposed on the device 104 or on the placement facility 174 or power base 160 and oriented in such a way as to provide a user of the system 102 an indication of the contents of the gutter on either side of the device 104.

In an embodiment, the gutter-cleaning device 104 may comprise on-board tools or attachments 120. The on-board tool 120 may be a downspout cleaning tool. When the device 104 reaches a downspout, it may deploy a cleaning tool, such as a weighted brush, into the downspout to clear it of debris. The cleaning tool 102 may run the length of the downspout and may be collected at the base of the downspout. In an embodiment, the tool 120 may be magnetic such that should the tool 120 get stuck in the downspout, it may be removed by dragging it down the spout using a magnetic force from the outside of the downspout. The device 104 may be directed to deploy the tool 120 by a control facility 168, through programming, through detection of the downspout using a vision system 142 or some other detection mechanism, and the like. In embodiments, the downspout cleaning tool may be an impeller 108 that may be oriented vertically to clean at least a top portion of the downspout. The impeller 108 may be present within the housing 152 and may emerge when directed to do so by a control facility 168, through programming, through detection of the downspout using a vision system 142 or some other detection mechanism, and the like. In an alternative embodiment, the impeller may re-orient itself from the usual horizontal position at the end of the device 104 to a vertical position in order to clean the top portion of the downspout.

In an embodiment, the on-board tool 120 may be an air hose attachment. The air hose attachment may attach on one end to an air compressor and on the other end to an impeller 108, an impeller hub 118, the housing 152, the debris tines 112, and the like. Air discharged through the air hose attachment may facilitate loosening and removal of debris.

In an embodiment, the on-board tool 120 may be a water hose attachment. The air hose attachment may attach on one end to a pressurized water supply and on the other end to an impeller 108, an impeller hub 118, the housing 152, the debris tines 112, and the like. Water discharged through the water hose attachment may facilitate loosening and removal of debris.

In an embodiment, the placement facility 174 may be a handle, a grip, a pole, a telescoping pole, a segmented pole, a collapsible pole, and the like. The device 104 may have a point of attachment that may be compatible with a placement facility 174. For example, the device may have a threaded connection and the placement facility 174 may have a threaded end. The point of attachment may include a fastener 178, which may permit the removable or permanent attachment of the placement facility 174 or power base 160 to the device 104 in multiple orientations. For example, the fastener 178 may attach the device 104 to the placement facility 174 or power base 160 in an orientation permitting downward operation, upward operation, horizontal operation, and the like. The fasteners 178 may be disposed on a top, bottom, or side surface of the device 104. In embodiments, the fastener 178 may be a nut and bolt, a screw, a nail, a rivet, a magnet, an adhesive, a hook-and-loop, an interference locking system, a threaded connection, a sliding attachment, a hinge, a clamp, a tab, a spring-loaded attachment, a sleeve attachment, a snap-fit connection, a ball closure, discrete interlocks, a clasp, a clip, a zipper, a snap, a gasket, an O-ring type closure, a hook-and-eye, a spring-locking hinge, and the like. A locking pivot 180 may be connected to the body of the device 104 and to the upper end of the placement facility 174 or power base 160. The pivot 180 may be configured and disposed to permit a varying angle of the device 104 with respect to the placement facility 174, power base 160, gutter, user, and the like. The upper end of the placement facility 174 or power base 160 may be connected to the pivot 180. The placement facility 174 may be configured to allow the user to adapt its length to a wide range of roof/gutter heights, such as by telescoping, adding additional segments, allowing greater reach, and the like.

In some embodiments, the placement facility 174 or power base 160 and the device 104 may be formed as a single unit. For example, the device 104 may be integral with the placement facility 174 or power base 160.

In an embodiment, the gutter-cleaning device 104 may be connected to a power base 160. The power base 160 may allow for at least one element of the gutter cleaning device 104, such as an impeller transmission 130, an impeller drive facility 138, an energy storage facility 142, a transport motor 154, a transport transmission 158, transfer gears, power take-off couplings, control facility 168, and the like to be disposed within the power base 160, as further described herein. In embodiments, a fastener 178 may permit the permanent or removable attachment of the device 104 to the power base 160, as previously described herein. For example, the power base 160 may include a control facility 168, an ergonomic grip area, and an energy storage facility 142. In embodiments, the control facility 168 may be the only element not disposed within a gutter-cleaning device 104.

In operation, a process for using the system 102 may comprise the stages described below. The process, however, is exemplary only and not limiting. The process may be altered, such as by having stages added, removed, rearranged, and the like. A user may deploy the gutter-cleaning system 102 by lifting the device 104 attached to one end of a placement facility or power base 160 to rest in a gutter with a support guide/wheel 172 resting on an outer edge, a floor, or a wall of a gutter. The user may turn the system 102 on with the control facility 168. The user may maneuver the device 104 up and down the length of the gutter while it disposes of accumulated gutter debris. When cross braces may be encountered in the gutter, the forward and aft protruding impellers may clean under the brace but the user may have to lift the device 104 to the other side of the brace to continue cleaning. The connection point of the placement facility 174 or power base 160 may comprise a mirror to provide the user with an indication of the contents of the gutter on either side of the device 104. Once the gutter cleaning is completed, the user may turn off the system 102 with the control facility 168 or the system 102 may power down automatically after a pre-determined length of time, if a prohibitive level of moisture is detected, if the impellers become disengaged or stuck, and the like. The user may then lift or lower the system 102 of the gutter.

Figure 3:
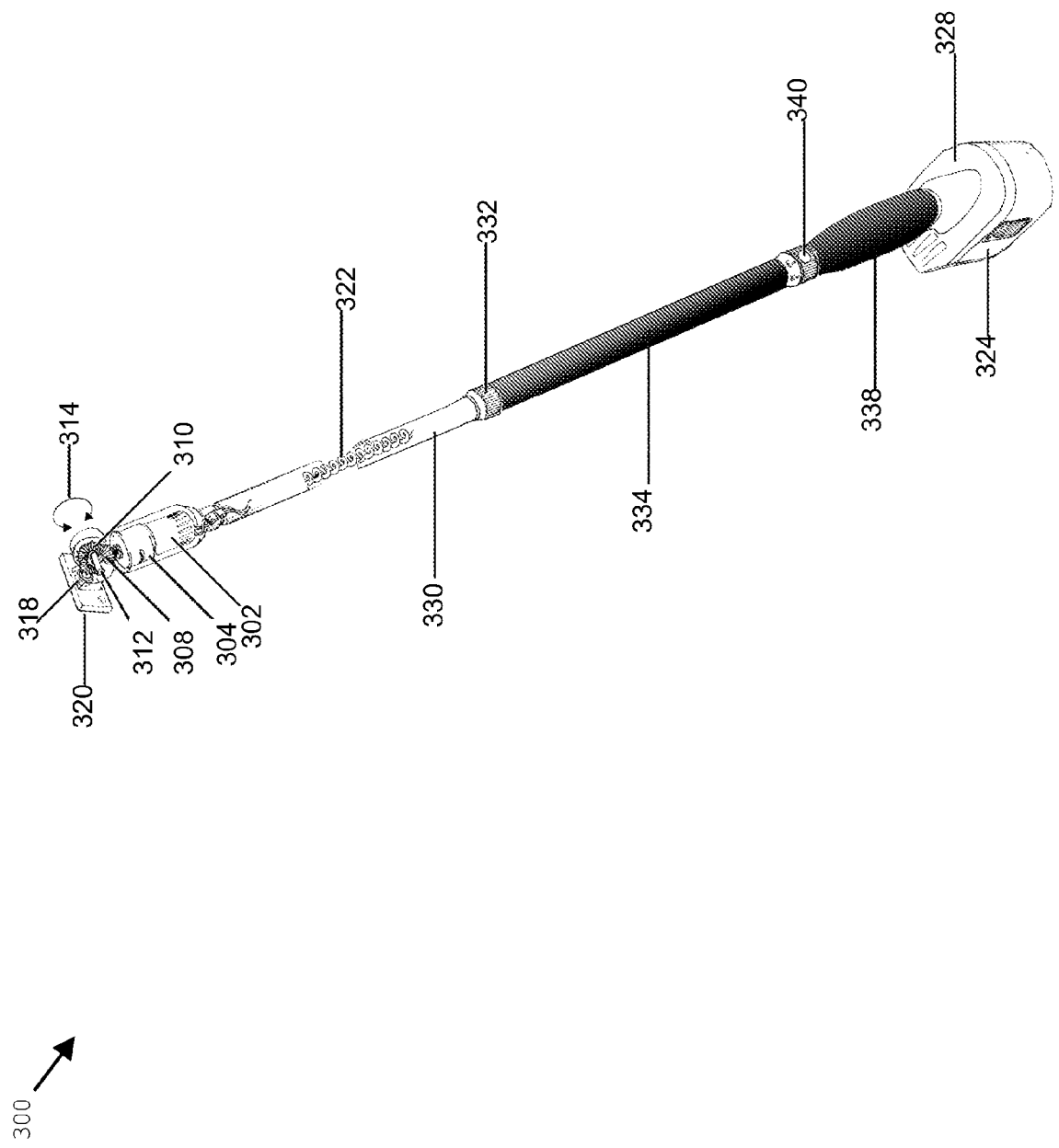
FIG. 3 depicts a power base with a telescoping pole.

Referring to FIG. 3, by positioning certain functional elements within the power base 300, the power base 300 may be operable with a wide range of functional modules, including a gutter cleaning device as described above. For example, the power base 300 may provide power to a module while the module retains all of the powertrain elements necessary for function. In another example, the power base 300 may comprise a motor that receives power through the power base 300. A power take-off coupling may then facilitate driving functional elements within a module using the motor disposed in the power base 300. For example, the power base 300 may have an integrated telescoping pole to facilitate handling, placing, operating, storing and the like of a functional module. In other embodiments, the pole may be static, non-telescoping, collapsible, segmented and the like. The power base 300 may comprise a head, containing a motor 302, gearbox 304, gearset 308, ring bevel gear 310, pivot axis 314, power take-off coupling 318, mounting plate 320, and the like, connected to a pole 330 of the power base 300.

Continuing to refer to FIG. 3, the power base 300 may comprise a motor 302 for powering an attached functional module, such as a gutter-cleaning device. For example, the motor 302 may be a high torque DC motor, a reversing gear motor, an electric motor, a gasoline-or biofuel-powered internal combustion engine, a solar-powered motor, and the like. The motor 302 may be operably connected to a gearbox 304. The gearbox 304 may be a speed reduction gearbox with speed selection. The gearbox 304 may be operably connected to a bevel gearset 308 with a head pivot at a rotational axis of the ring bevel gear 310. The pivot axis of the head 312 may rotate 314, permitting use of various modules at various shaft angles. The pivot 312 may be locked at any particular orientation. The gearset 308 may be operably connected to a power take-off coupling 318 for providing power from the power base 300 to the functional modules. A functional module may be mounted to the power base 300 through a mounting plate 320. The mounting plate 320 may have a quick release connection for various modules, thus facilitating interchangeability of the functional modules. Alternatively, the mounting plate 320 may allow a module to be affixed in a more permanent fashion, such as by screws. The functional module may be attached to the mounting plate 320 by any attachment means, such as by a screw, a nut and bolt, a nail, a rivet, an interference locking system, a threaded connection, a sliding attachment, a hinge, a clamp, a tab, a spring-loaded attachment, a sleeve attachment, and the like. The mounting plate 320 may be configured to provide support for the attached module while allowing the module to be electrically connected to the power base 300. Power for the power base 300 may be provided by an energy storage facility, such as a battery 324, a solar panel, a gasoline or biofuel tank, an electrical cord, and the like. For example, a battery 324 may be removably connected to the power base 300 through a battery connection base 328. The battery 324 may be rechargeable. The battery 324 is shown in FIG. 3 at an end of the power base 300 opposite from the head, however, the battery may be disposed anywhere along the pole 330. An electrical conductor 322 may connect the battery 324 to the motor 302 through, around, or alongside the pole 330. An electrical connector 342 of the power base 300 may be adapted to provide suitable electrical power and, optionally, control signals for driving the motor 302. The motor 302 may include a wire 344 with a first end and a second end, the first end being attached to the motor 302 and the second end 348 being adapted to connect to the electrical connector 342. The pole 330 may be a rigid telescoping pole with one or multiple segments. The pole 330 may include a quick release coupling 332 to adjust the telescoping pole segments. The pole 330 orientation may be modified to facilitate placement of the functional module at a desired location. The pole 330 may be housed within a lower pole segment 334 from which it may telescope outwards. The lower pole segment 334 may have a high friction hand grip surface. The lower pole segment 334 may comprise a handle 338. The handle 338 may be a separate component of the lower pole segment 334 or may be integral to it. The handle 338 may have a high friction hand grip surface, similar to or distinct from that of the lower pole segment 334. The handle 338 may be ergonomically shaped. A control switch 340 may be disposed on the lower pole segment 334. The control switch 340 may turn power on or off to the motor 302. The control switch 340 may be a power switch, a module trigger, a module modulation switch, a module speed control, a telescoping control, a head pivot control, and the like.

Figure 4:
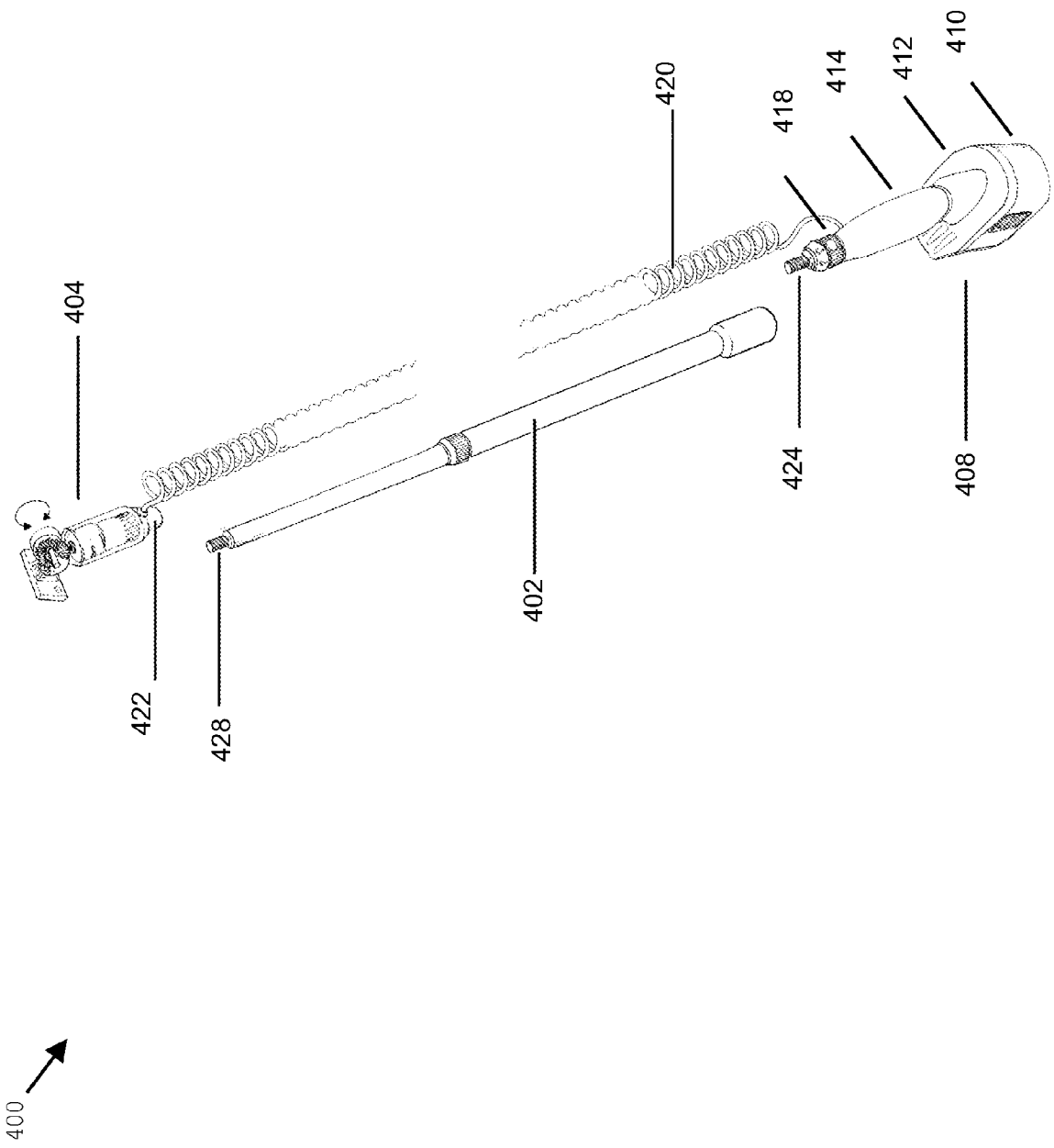
FIG. 4 depicts a power base with an off-the-shelf pole.

Referring to FIG. 4, a power base 400 for attachment of various functional modules, such as a gutter cleaning module, may be a power head 404 assembled with a separately purchased pole 402. The power head 404 may comprise a motor, gearbox, gearset, ring bevel gear, pivot axis, power take-off coupling, mounting plate, and the like. The power head 404 may be operably connected to a control module 408 by a wire 420 or some other electrical connection. The control module 408 may comprise a battery 410 which may provide power to the power base 400. Alternatively, the control module 408 may comprise other power means, such as a solar panel, an internal combustion engine, an electrical cord, and the like. The battery 410 may be removably connected to the power base 400 through a battery connection base 412. The control module 408 may comprise a handle 414. The handle 414 may have a high friction hand grip surface. A control switch 418 may be disposed on the control module 408. The control switch 418 may turn power on or off to the power head 404. The control switch 418 may be a power switch, module trigger, module modulation switch, speed control, a head pivot control, and the like. The power head may have a thread connection 422 for connecting to a complementary thread connection 424 on the control module 408. The thread connections 422, 424 may be either male or female. The thread connections 422, 424 may be industry standard connections, such as those used on a painting pole. Alternatively, the power head 404 may be attached to the control module 408 through any attachment means, such as a nut and bolt, a screw, a nail, a rivet, a magnet, an adhesive, a hook-and-loop, an interference locking system, a threaded connection, a sliding attachment, a hinge, a clamp, a tab, a spring-loaded attachment, a sleeve attachment, a snap-fit connection, a ball closure, discrete interlocks, a clasp, a clip, a zipper, a snap, a gasket, an O-ring type closure, a hook-and-eye, a spring-locking hinge, and the like. In an alternative to a direct attachment of the power head 404 to the control module 408, both the power head 404 and control module 408 may be attached to opposite ends of a pole 402, such as a painting pole, broom stick, some other off-the-shelf pole, and the like. For example, the power head 404 may have a female thread connection 422 to receive a male thread connection 428 from a pole 402. In the example, a control module 408 male thread connection 424 may connect with a female thread connection of the pole 402. The wire 420 connecting the power head 402 to the control module 408 may be disposed along the side of the pole, may coil around the pole, may thread through the center of the pole, and the like.

Figure 5:
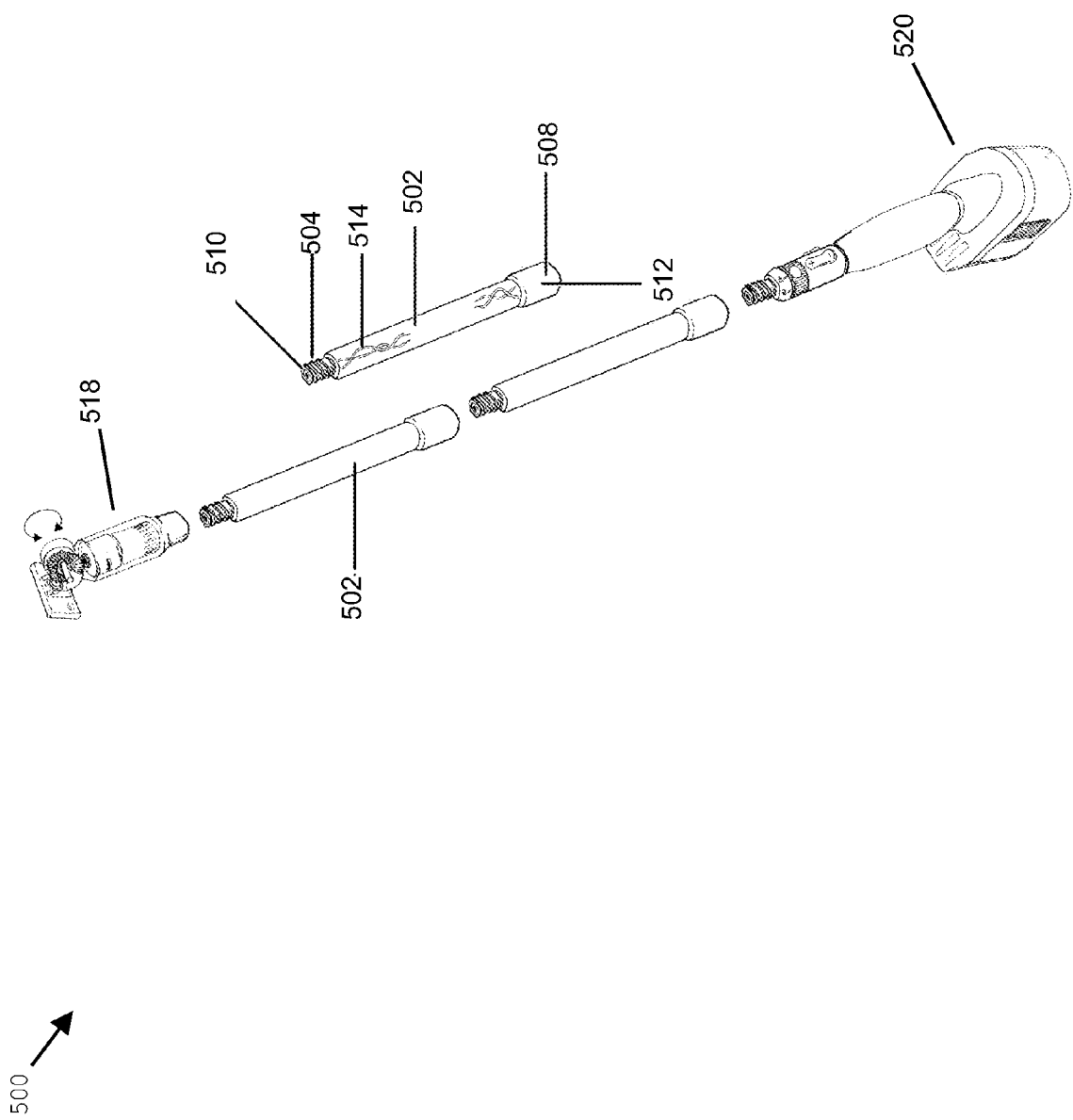
FIG. 5 depicts a power base composed of pole segments

Referring to FIG. 5, a power base 500 for attachment of various functional modules, such as a gutter cleaning module, may comprise a segmented pole 502 with integrated electrical conductors and end electrical connections. The pole segments 502 may facilitate packaging and storage of the power base 500. The pole segments 502 may have connections on either end such that one end of the pole segment may have a connection complementary to an end of another pole segment 502. For example, the pole segments 502 may have a male thread connection 504 and a female thread connection 508 on either end of the pole segment 502. The thread connections 504, 508 may have coaxial connectors 510, 512 disposed within the connections 504, 508 to provide a continuous electrical connection between pole segments 502. An electrical conductor 514 internal to the pole segment may provide an electrical connection between the coaxial connectors 510, 512. When a pole segment 502 is connected to another pole segment 502, they may form a continuous electrical connection through the coaxial connectors 510, 512. In an embodiment, the power head 404 may be connected directly to the control module 520 through the threaded connections 504, 508. Alternatively, one or more pole segments 502 may be connected in between the power head 404 and control module 520.

Figure 6A:
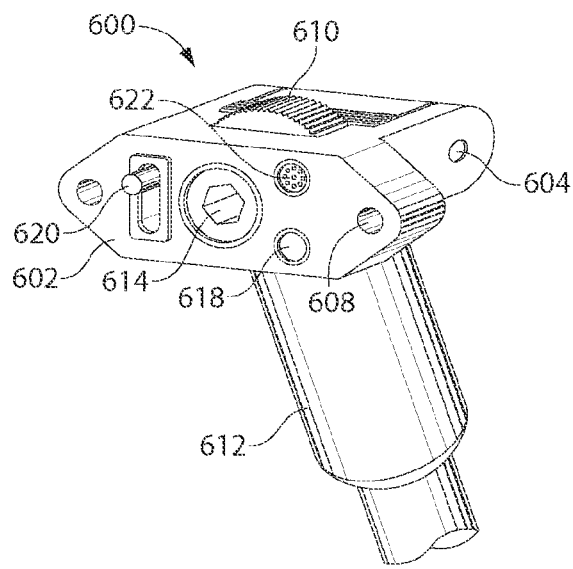
FIGS. 6A and B depict front and back views of the power head.

Referring to FIG. 6, two views of the power head 404 are depicted. Referring first to FIG. 6A, a view of the mounting side of the power head is depicted. A functional module, such as a gutter cleaning device, may attach to the power head 404 at a power head mounting plate 602 and the entire power head 404 may be repositioned through pivoting at a power head pivot axis 604. In an embodiment, pivoting may be controlled by a control facility. In an embodiment, the mount may be a pin mount. The functional module pin mount may attach to a connection point 608 for the pin mount. The connection point 608 may be detent released by a spring latch actuated by a quick release button 610. The power head may comprise a motor/gearbox pod 612 for operating a functional module. The motor/gearbox pod 612 may be operably connected to a power take-off coupling 614 to provide a power input from the motor 612 to a functional module. In this way, any functional module may be attached to the power head 404 as the motor 612 may not be specifically paired with a functional module, but rather, may be operable with many different functional modules. In an embodiment, the power head 404 may comprise an articulated extensible pin actuator 618 driven by an electrical solenoid to effect on/off selection of module functions. In an embodiment, the power head 404 may comprise an articulated sliding pin actuator 620 driven by an electrical slide solenoid to effect analog mechanical input for module functions. In an embodiment, the power head 404 may comprise an electrical connector for data inputs to module functions.

Figure 6B:
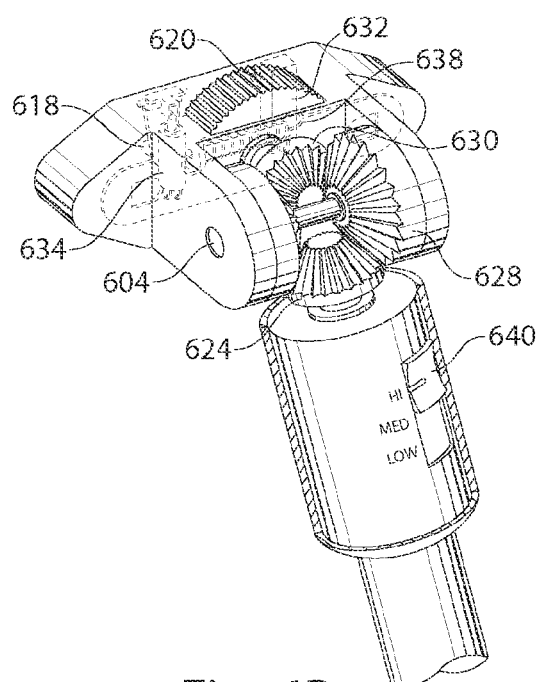

Referring now to FIG. 6B, the side of the power head 404 opposite from the mounting plate 602 is depicted. In an embodiment, the power head 404 may comprise a bevel gearset with head pivot functionality at a rotational axis of the ring bevel gear 628. A power take-off coupling 630 may allow for power input to modules. A slide solenoid body 632 may be electrically connected to and drive the articulated sliding pin actuator 620. An axial push/pull solenoid body 634 may be electrically connected to and drive the articulated extensible pin actuator 618. In an embodiment, a pin lock mechanism 638 may be disposed on the power head for engagement of the module connection. A manual speed change switch 640 on the gearbox 612 may be adaptable to different functional requirements of the various modules. For example, the switch 640 may control speed, direction, intensity, duration, timing, and the like.

Figure 7:
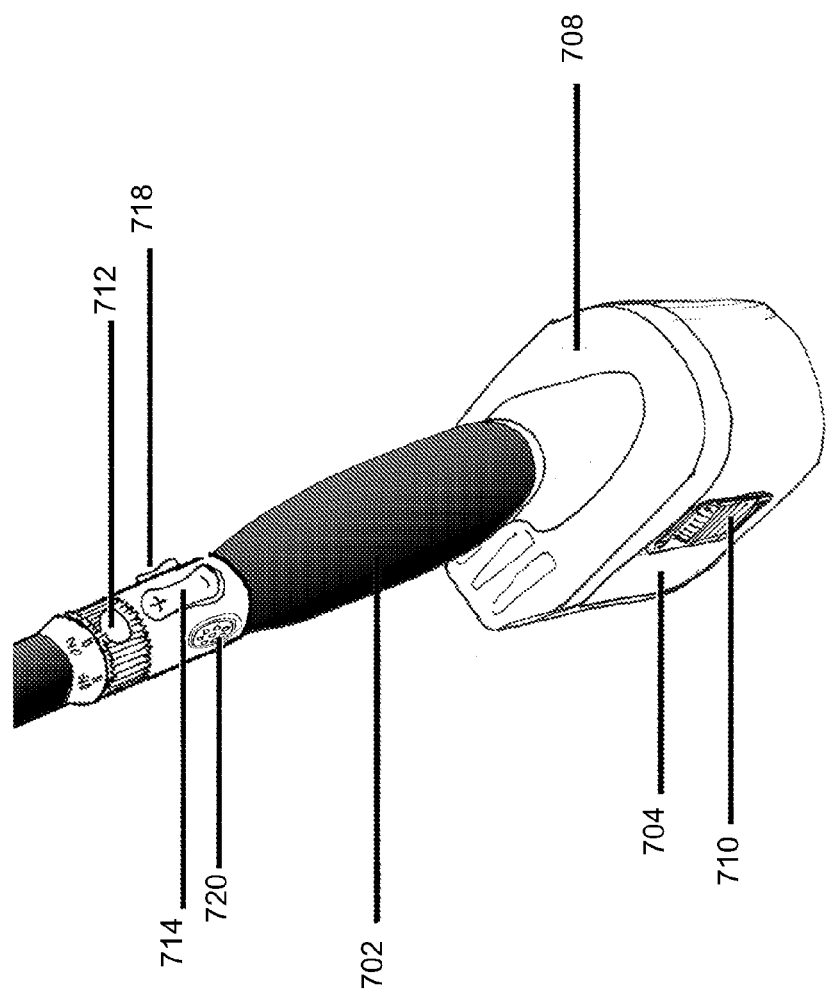
FIG. 7 depicts the control module.

Referring to FIG. 7, an enlarged view of the control module 700 is depicted. The control module 700 may have a handle 702. The handle 702 may have a high friction hand grip surface. The control module 700 may house a removable rechargeable battery 704 attachable to the control module 700 through a battery connection base 708. The battery 704 may be removable with a latch 710 for recharging. In other embodiments, the control module 700 may comprise any energy storage facility, such as a gasoline or biofuel tank, a solar panel, a power cord, and the like. In an embodiment, the control module 700 may comprise control switches 712 for Power ON/OFF of the power head motor. In an embodiment, the control module 700 may comprise a toggle switch 714 to control analog modulation of the link to the module. In an embodiment, the control module 700 may comprise an on/off actuation switch 718 to control digital functions in a module. In an embodiment, the control module 700 may comprise an I/O connector 720 to facilitate computer programming of onboard power base or module functions. In an embodiment, the control module 700 may comprise a timer, a digital clock, a thermometer, a radio, an MP3 player, a weather station, a light, a fan, a storage area, and the like. In an embodiment, the control module 700 may comprise a power meter. The power meter may indicate a level of power remaining in the energy storage facility. The power meter may indicate a low power alert. The alert may be an audible alert, a visual alert, a vibration, or any combination thereof.

Figure 8:
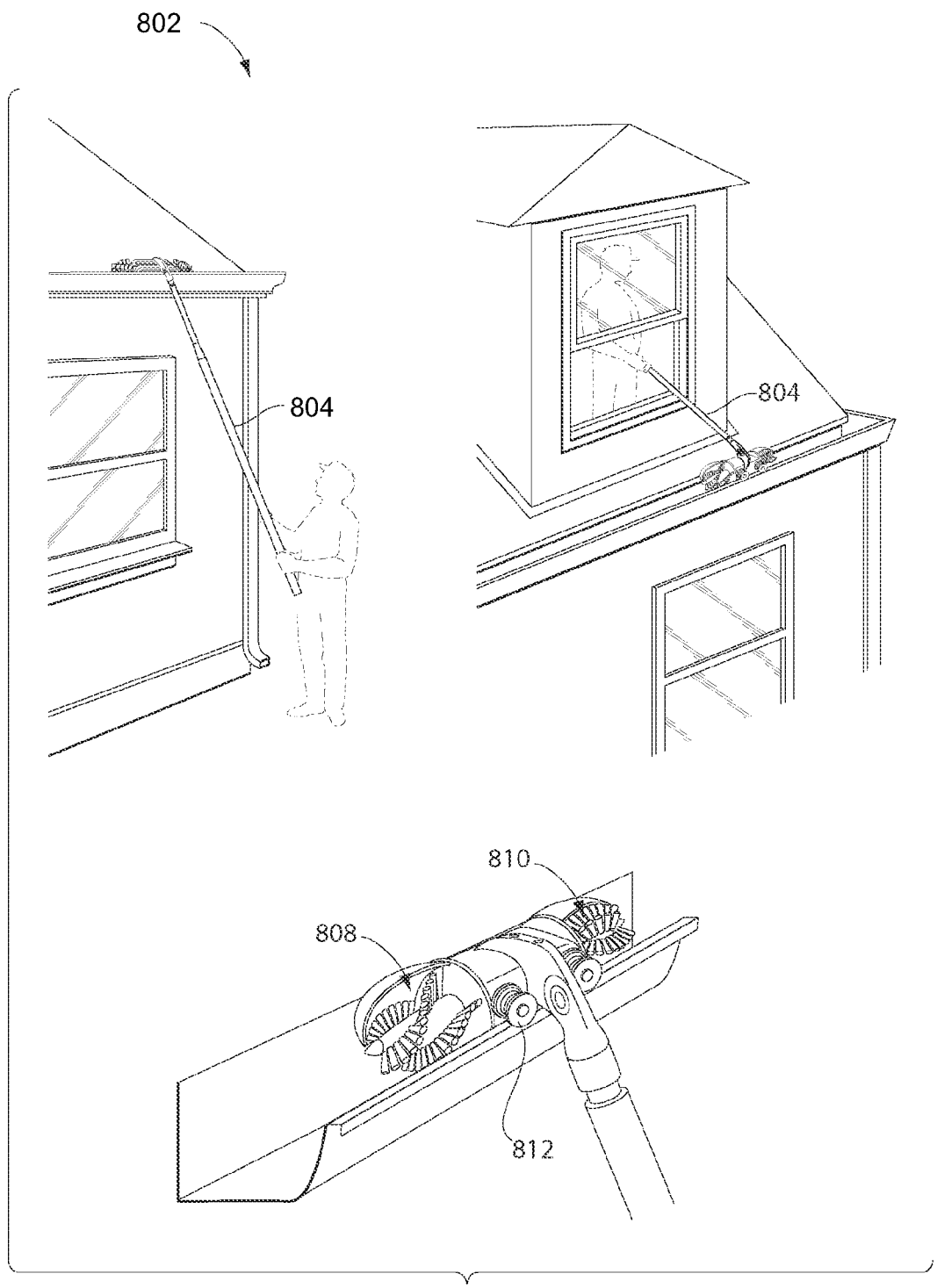
FIG. 8 depicts a gutter cleaning system in operation.

Referring to FIG. 8, an embodiment of a gutter cleaning system 802 is shown in use. The system 802 may comprise a guide pole 804, impellers 808, impeller chutes 810, and support/guide wheels 812. The system 802 may be configured to allow a user to deploy the system 802 into a gutter with the use of the guide pole 804. In some embodiments, the guide pole 804 may be a telescoping pole. In some embodiments, the user may lift the gutter-cleaning system to the gutter from below, place it in the gutter, and initiate operation of the gutter-cleaning system either before or after placing the system within the gutter. The user may move the gutter-cleaning system along the gutter floor, optionally with the aid of a support guide/wheel. In other embodiments, a user may lower a gutter-cleaning system into a gutter from above, such as from a window. The impellers 808 may dislodge and evict gutter debris from the gutter. The impeller chutes 810 may direct the high velocity gutter debris over the outer edge of the gutter. The support/guide wheels 812 may use the gutter edge to ease movement of the system through the gutter trough.

Figure 9:
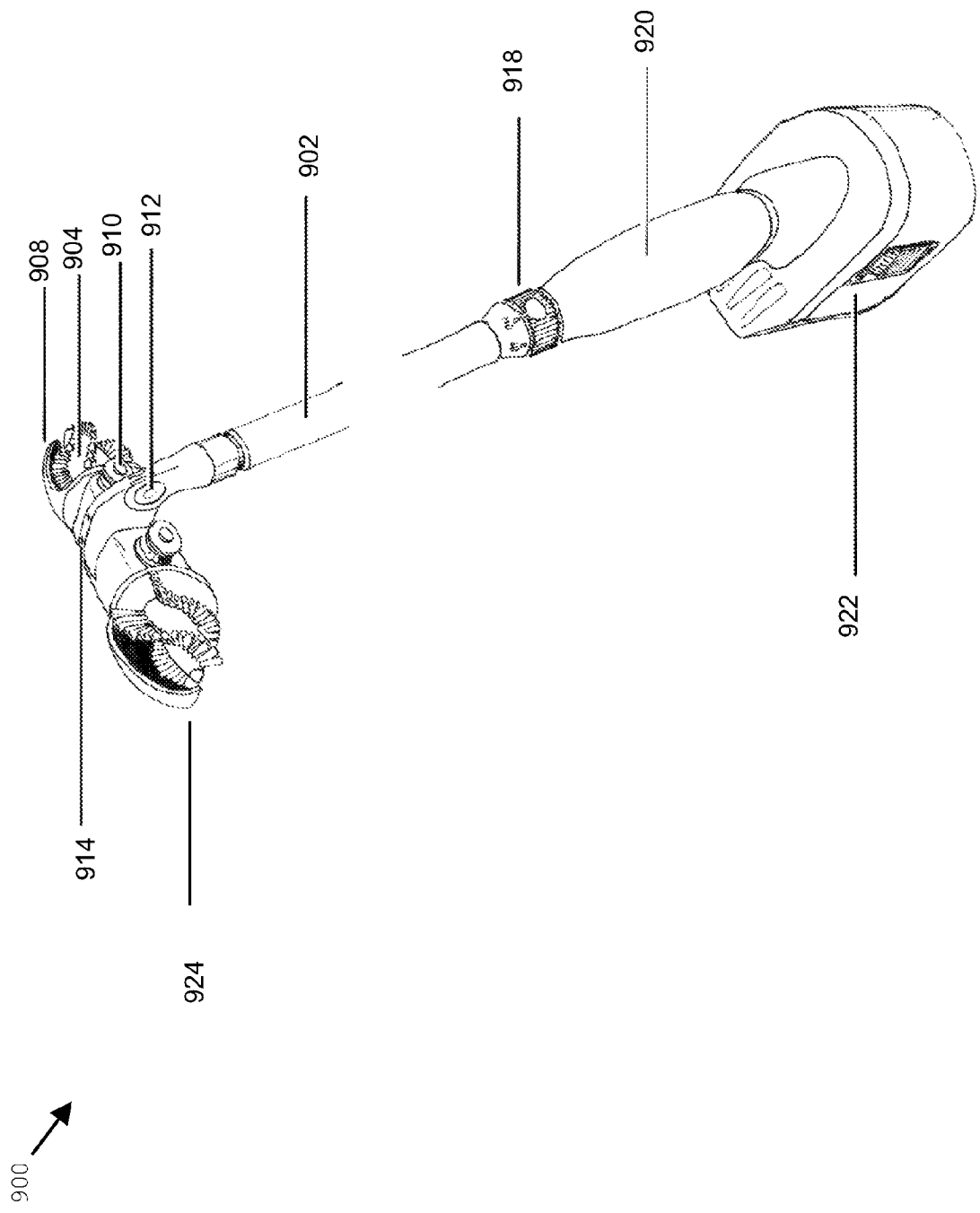
FIG. 9 depicts a gutter cleaning system.

Referring to FIG. 9, an embodiment of a gutter cleaning system 900 is depicted. The gutter cleaning system 900 may comprise a power base 902, impellers 904 on both ends of the gutter-cleaning device 924, a chute housing 908 for each impeller 904, support/guide wheels 910, fasteners 914, a locking pivot 912, a handle control 918, a grip area 920, a rechargeable battery 922, and the like. The system may be configured to allow a user to deploy the system into a gutter with the use of the power base 902. In some embodiments, the power base 902 may comprise a telescoping pole.

Figure 10:
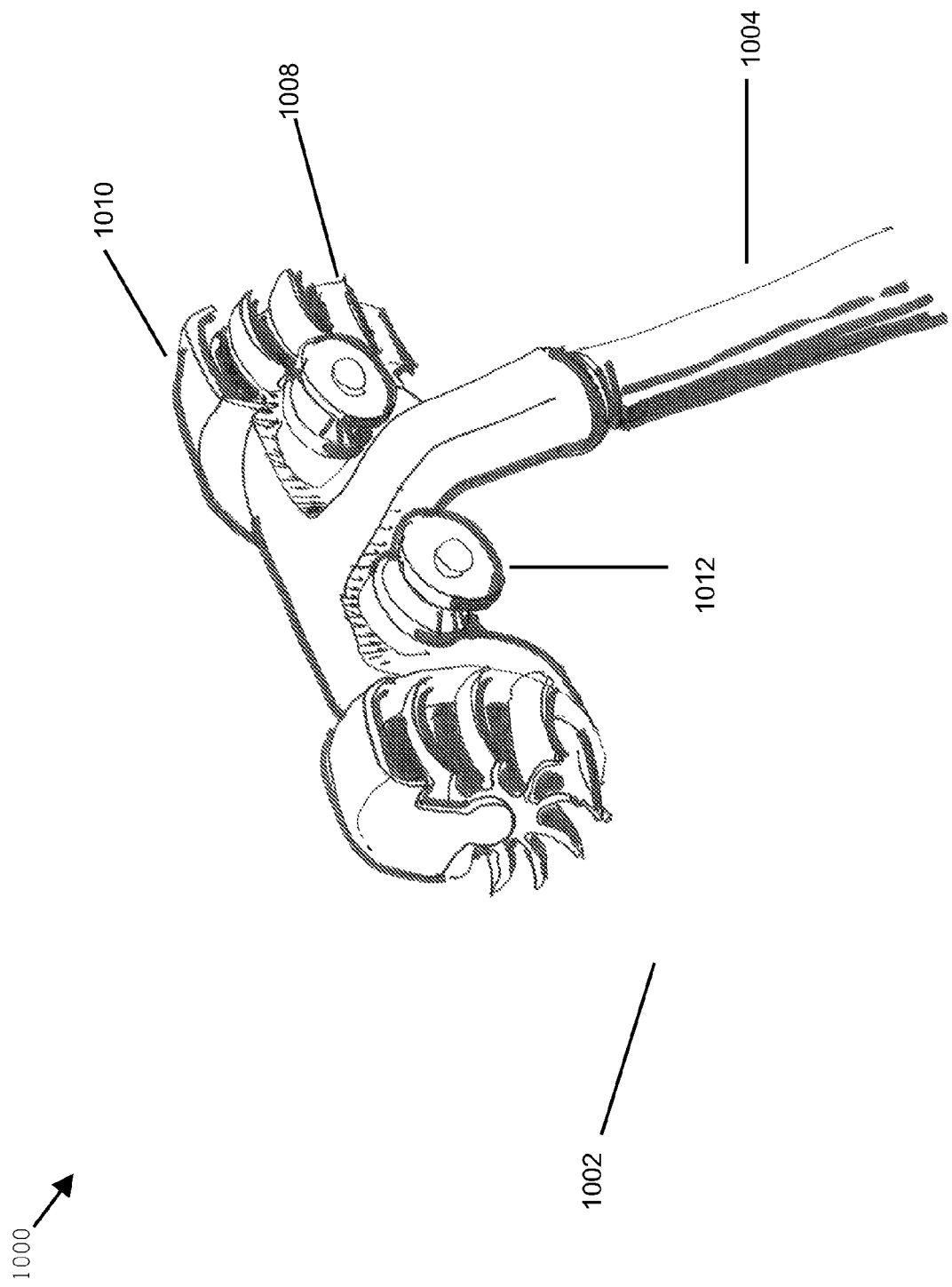
FIG. 10 depicts a gutter cleaning system.

Referring to FIG. 10, an embodiment of a gutter cleaning system 1002 is shown. The system 1002 may comprise a guide pole 1004, impellers 1008, impeller chutes 1010, and support/guide wheels 1012. The system 1002 may be configured to allow a user to deploy the system 1002 into a gutter with the use of the guide pole 1004. In some embodiments, the guide pole 1004 may be a telescoping pole. The impellers 1008 dislodge and evict gutter debris from the gutter. The impeller chutes 1010 direct the high velocity gutter debris over the outer edge of the gutter. The support/guide wheels 1012 use the gutter edge to ease movement of the system through the gutter trough.

Figure 11:
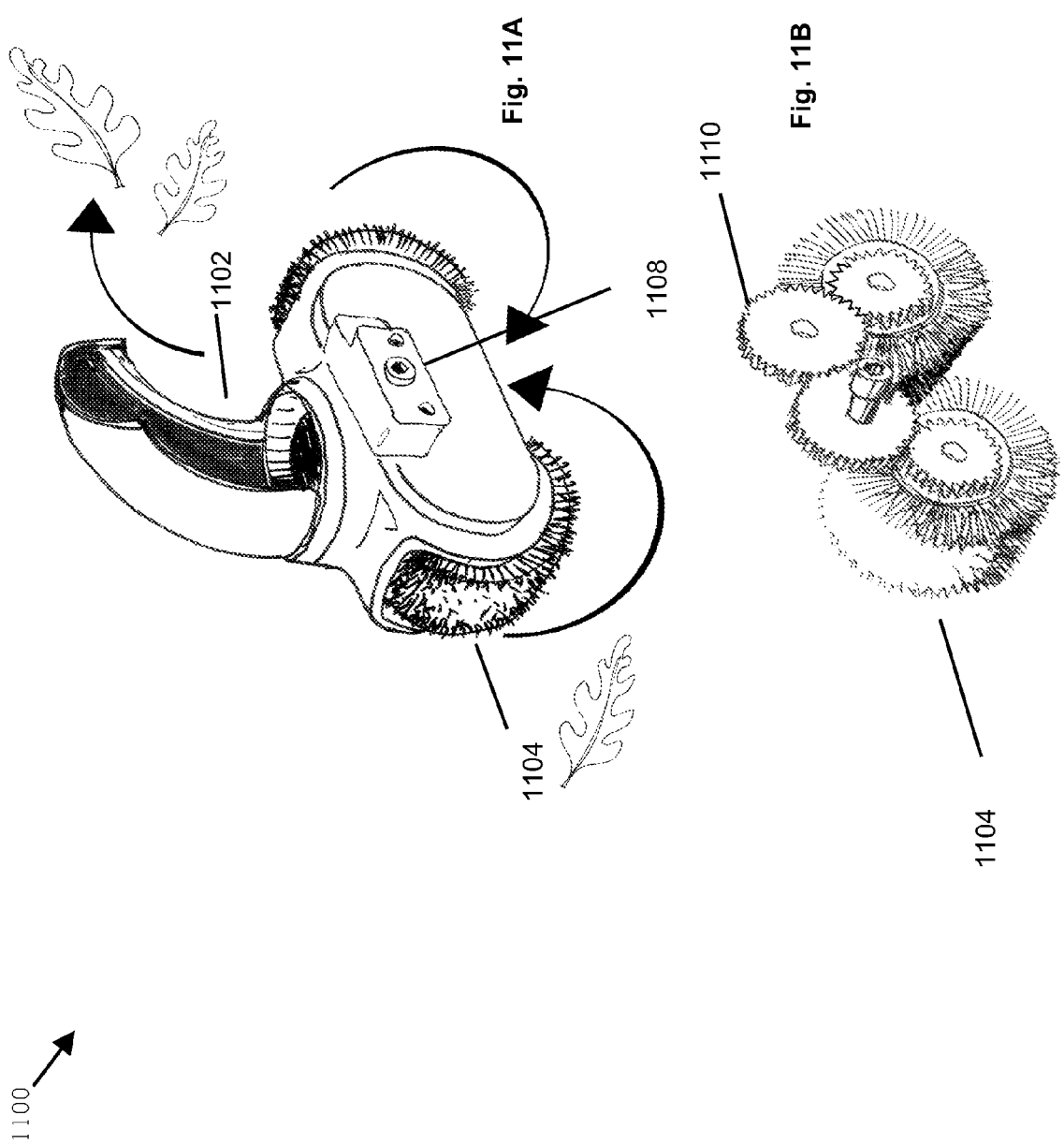
FIG. 11A depicts a counter-rotating brush gutter cleaner
FIG. 11B depicts a cutaway view of the gear mechanism for the counter-rotating brushes.

Referring to FIG. 11A, a counter-rotating brush gutter cleaner 1100 may capture gutter debris in the counter-rotating brushes 1104 and move the captured debris against the surface of the gutter into the cleaner 1100. Eventually, the debris may break free of the cleaner 1100 and get discharged from the chute 1102 disposed between the brushes 1104 at high enough velocity so it clears the outside wall of the gutter and falls to the ground or is otherwise ejected, captured, and the like. The cleaner 1100 may attach to a power base 160 at an attachment point 11108.

Referring to FIG. 11B, a cutaway view of the gear mechanism for the counter-rotating brushes 1104 is shown. A single gear 1110 or multiple gears 1110 may engage a gear 1110 disposed on a counter-rotating brush 1104 and cause the brush 1104 to rotate about a central axis. The primary gear driving the assembly may be driven by a power take-off coupling of a power base. In an alternative embodiment, the brushes 1104 may be directly rotated along a driven axle. The counter-rotating brushes 1104 may be flexible full-width paddles, full circumference flexible bristle cylindrical brushes, spiral flexible bristle brushes, spiral flexible straight or hooked-end wire brushes, flexible alternating brush paddles, flexible bucket paddles, alternating blade flexible paddles, and the like.

Figure 12:
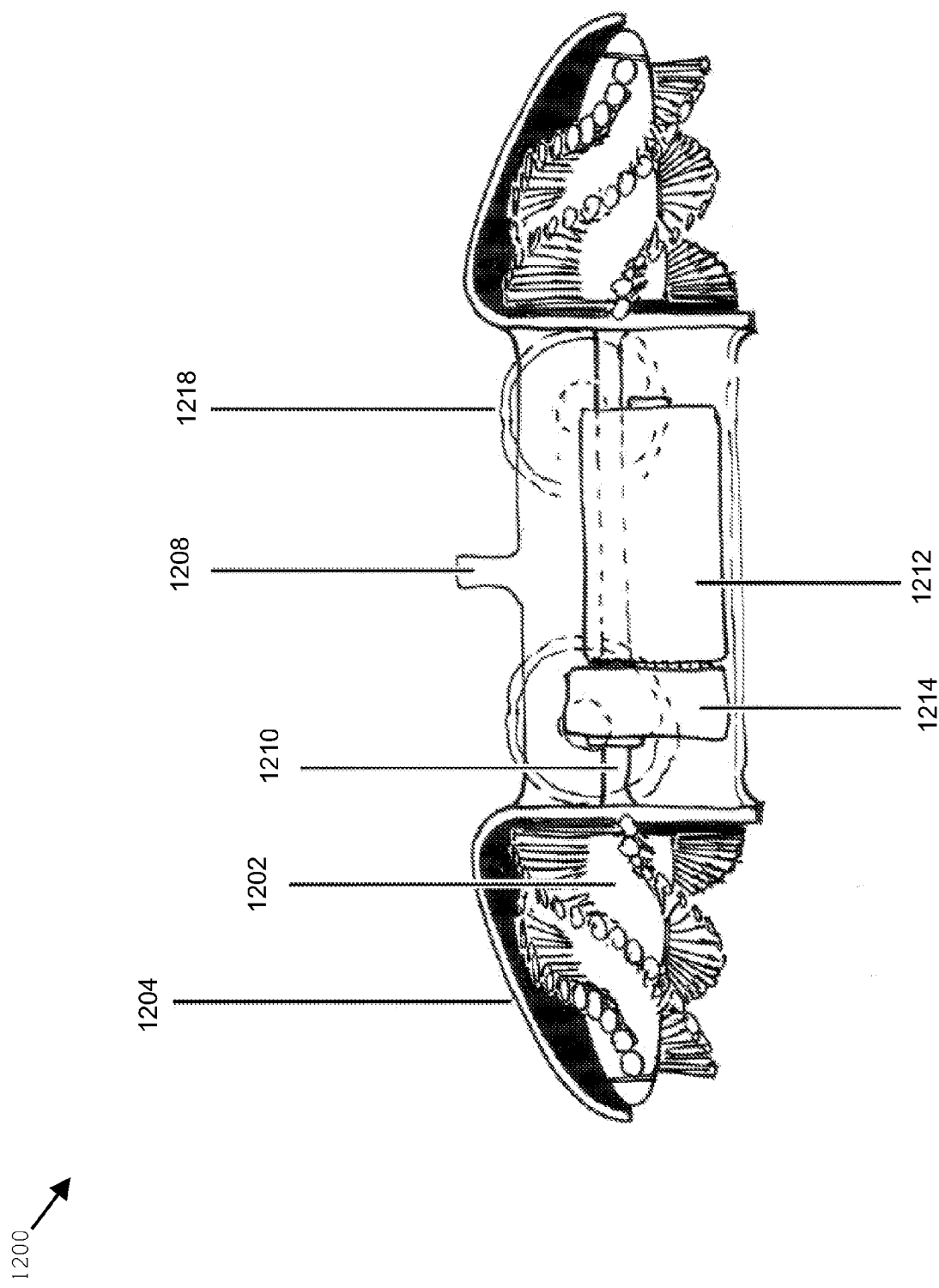
FIG. 12 depicts a gutter-cleaning device.

Referring to FIG. 12, the gutter-cleaning device 1200 may comprise an impeller 1202 on both ends of the device, a chute 1204 housing for each impeller, a top fastener 1208, an impeller drive shaft 1210, an impeller drive motor 1212, an impeller drive transmission 1214, support/guide wheels 1218, and the like. The impeller 1202 may be mounted to the impeller drive shaft 1210. The impeller drive shaft 1210 may be coupled to the impeller transmission 1214 and configured to extend out each end of the impeller transmission 1214 to connect to each impeller 1202 at each end of the gutter-cleaning device 1200. The impeller drive motor 1212 may be mechanically coupled to the impeller transmission 1214 such that the rotational output of the impeller drive motor 1212 is a rotational input to the impeller transmission 1214. In some embodiments of the gutter-cleaning device 1200, the device may comprise an impeller drive motor 1212 for each impeller 1202. In some embodiments, the impeller drive motor 1212 may be mounted within each impeller 1202. The combination of the impeller drive motor 1212 and impeller drive transmission 1214 may be configured and disposed to drive the impeller 1202 with the required rotational speed and torque. In some embodiments, the impeller drive motor 1212 may comprise a gasoline- or biofuel-powered internal combustion engine, a solar-powered engine, an electric motor, and the like. In embodiments, the gutter cleaning device 1200 may further comprise an energy storage facility disposed within the housing. In this embodiment, the gutter-cleaning device 1200 may not need power supplied to it exogenously. In embodiments, the gutter-cleaning device 1200 may not comprise an energy storage facility or other means to obtain power and must therefore be powered exogenously. In this embodiment, the gutter-cleaning device 1200 may be connected to a power base, as described herein, to obtain power. The energy storage facility may be housed within the power base or placement facility and electrically connected to the impeller drive motor 1212.

Figure 13:
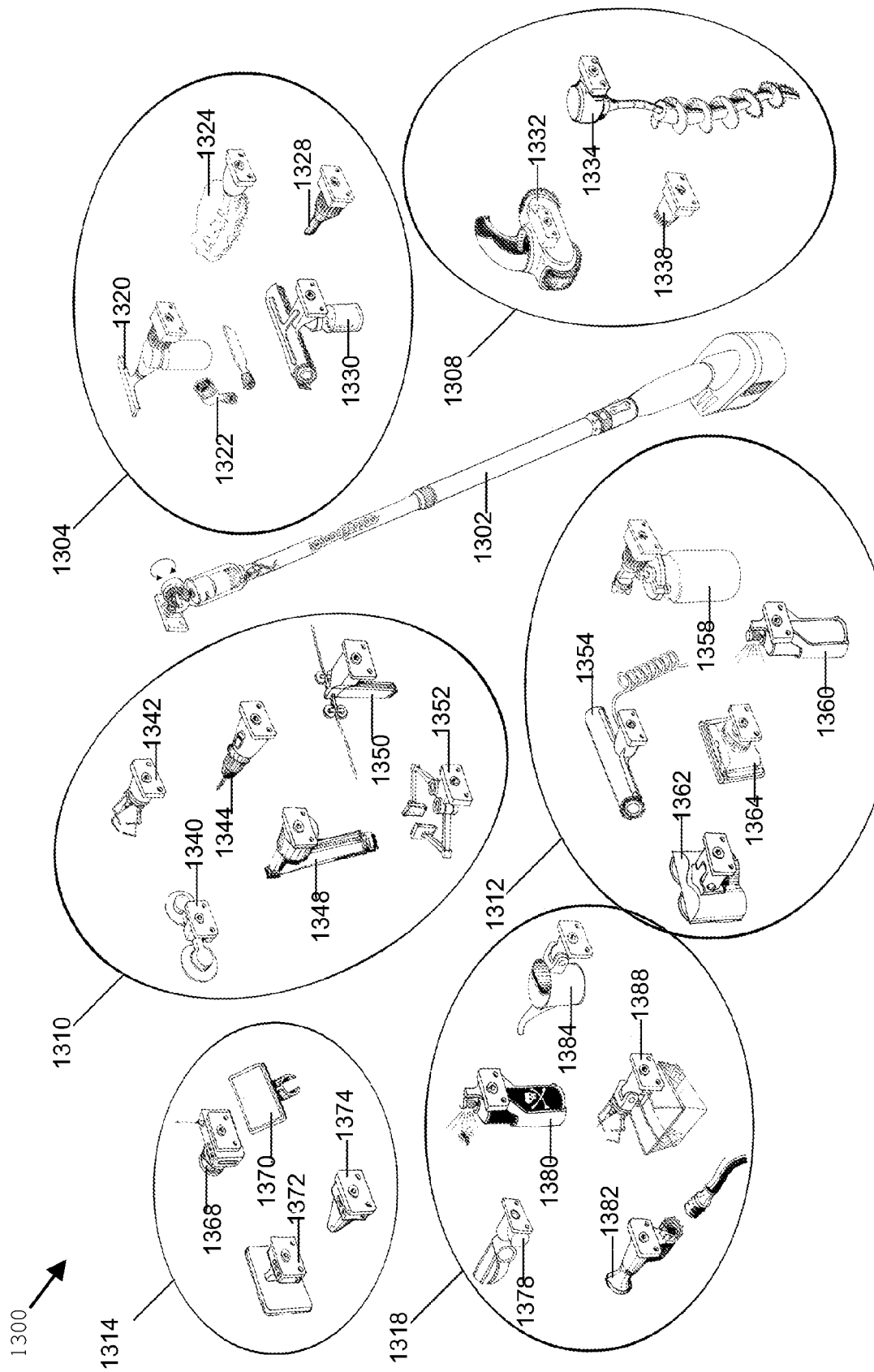
FIG. 13 depicts various families of functional modules.

Referring to FIG. 13, a multi-functional power tool system 1300 may comprise a power base 1302 with a head configured to attach interchangeable functional modules. In an embodiment, a single power base 1302 may be able to connect with a variety of different functional modules to provide power and/or control to the attached modules. For example, a user may have a need to perform various outdoor cleaning tasks, such as gutter cleaning and power window washing. The user may mount a gutter-cleaning device with counter-rotating brushes to a power base, lift the device into place in the gutter, and then guide the device along the gutter floor, optionally with the aid of a support guide/wheel, to remove debris in the gutter. Then, the user may dismount the gutter-cleaning device and attach the power window washing module to the power base. The power base may facilitate many such combinations of accomplishments with various functional modules. The multi-functional power tool system may require less storage, such as at an end-use location, a retail location, a warehouse, a distributor, and the like, for the single power base and multiple attachments than for dedicated equipment corresponding to each of the attachments. Manufacturing and distribution may be simplified since the power base may be an invariable, standard component of the system utilized with many different functional modules. The multi-functional power tool system may support future expansion by simply obtaining a functional module that is compatible with the power base. The multi-functional power tool system may be easy to repair and maintain since a single energy storage facility needs to be re-energized, a single component may comprise the majority of the powertrain, the functional modules may be easy to repair since they may lack a majority of the powertrain, and the like.

In an embodiment, the functional modules may attach to the power base 1302 at a mounting plate. The functional modules may be cleaning modules 1304, gutter cleaning modules 1308, holding and fastening modules 1310, finishing and painting modules 1312, inspection modules 1314, landscape/garden modules 1318, and the like. In an embodiment, the functional module may comprise some or all of the necessary elements to receive power from the power base 1302, optionally through a power head, and use it to drive operation of the module. In an embodiment, the functional module may comprise some or all of the necessary elements to receive control signals from the power base 1302 and to act on the received signals. In any event, any of the functional elements of the functional module may be disposed within the functional module or the power base 1302. The power base 1302 may comprise any elements necessary to provide power, control, motive force, and the like to a functional module.

In an embodiment, cleaning modules 1304 may be used with the power base 1302 to provide a cleaning power tool system. The cleaning modules 1304 may be a microvacuum module 1320, various vacuum heads 1322, such as a brush, a crevice nozzle, and the like, a rotating feather duster 1324, a turbine dusting blower 1328, a power window cleaner with fluid dispensing head powered roller with squeegee 1330, a sweeper, a scrub brush, a liquid pump, a degreaser pump, a shoe shiner, and the like. The functions and settings for each functional module may be modified by a user's manual adjustment, a control facility 168, and the like. For example, the rate of the liquid pump, the force of the dusting blower, the speed of the scrub brush, and the like may all be adjusted.

In an embodiment, gutter cleaning modules 1308 may be used with the power base 1302 to provide a gutter cleaning power tool system. The gutter cleaning modules 1308 may be a gutter-cleaning device with impellers, as previously described herein, a counter-rotating brush gutter cleaner 1332, a downspout cleaning brush 1334, a vibratory (ultrasonic, mechanical, etc.) micro-needle for ice removal 1338, any of the gutter-cleaning devices in FIGS. 9-12, and the like. The functions and settings for each functional module may be modified by a user's manual adjustment, a control facility 168, and the like. For example, the speed of the impellers, the intensity of the ultrasonic wave, and the like may all be adjusted.

In an embodiment, holding and fastening modules 1310 may be used with the power base 1302 to provide a holding and fastening power tool system. The holding and fastening modules 1310 may be a dual suction cup flat panel gripper with remote actuate and release 1340, such as for a glass, a picture, and the like, light bulb changer with rotary head 1342, drill/driver, optionally with remote interchangeable bits 1344, power nailer/stapler 1348, wire/cord stapler 1350, two-arm gripper 1352, and the like. The functions and settings for each functional module may be modified by a user setting, a control facility 168, and the like. For example, the power nailer may be adjusted for various size nails, the power stapler may be adjusted for various size staples, the cord stapler may be adjusted for various diameters of cords, and the like.

The holding and fastening modules 1310 may include a keyless chuck coupled to the power head 404.

Applications of the holding and fastening modules 1310 include, without limitation, providing a cordless drill with an extended reach. The chuck may accept drills, shanks, and the like.

The chuck may be fitted with an inspection video camera providing a user with a close-up view of a drilling site. The inspection video camera may be described in detail hereinafter with reference to FIGS. 23 and 24, and elsewhere.

Applications of the holding and fastening modules 1310 includes, without limitation, setting threaded fasteners. Without limitation, square drive fasteners and other self-capturing fasteners may be utilized in such applications.

Figure 25B:
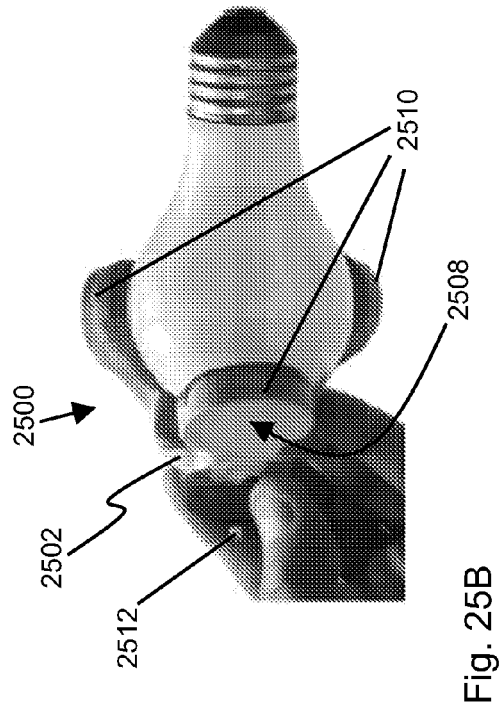
FIG. 25B depicts a side perspective view of a light bulb changing tool.
Figure 25C:
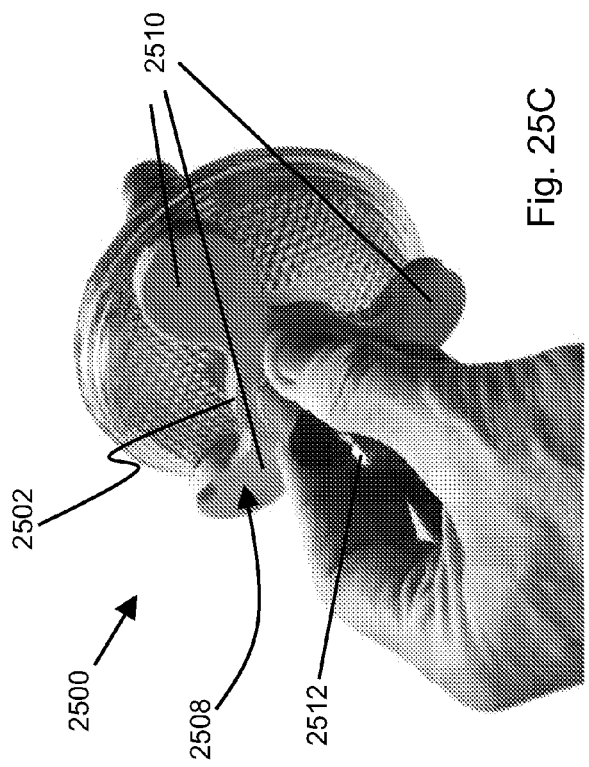
FIG. 25C depicts a back perspective view of a light bulb changing tool.
Figure 25A:
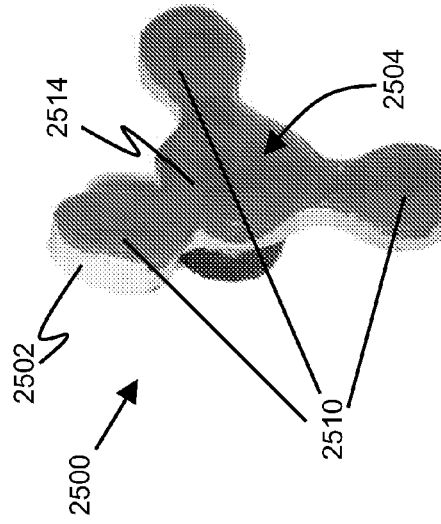
FIG. 25A depicts a front perspective view of a light bulb changing tool.

The light bulb changer with rotary head 1342 may include a light bulb changing tool that is described in greater detail herein with references to FIGS. 25A, 25B, and 25C and elsewhere.

In an embodiment, finishing and painting modules 1312 may be used with the power base 1302 to provide a finishing and painting power tool system. The finishing and painting modules 1312 may be a powered paint roller with remote paint supply 1354, paint sprayer, optionally with paint cup 1358, paint can sprayer 1360, two-drum wall sander 1362, orbital ¼ sheet sander 1364, floor sander, and the like. The functions and settings for each functional module may be modified by a user setting, a control facility 168, and the like. For example, the orbital sheet sander may be adjusted to accept any grit of sandpaper, the paint sprayer may be adjusted for different formulations of paint, and the like.

In an embodiment, inspection modules 1314 may be used with the power base 1302 to provide an inspection power tool system. The inspection modules 1314 may be a digital wireless video/still camera with remote viewing screen 1368, remote viewing screen 1370, infrared thermal imager 1372, moisture detector 1374, mold detector, radon detector, and the like. The functions and settings for each functional module may be modified by a user setting, a control facility 168, and the like. For example, the camera may be adjusted for any kind of lighting, the mold detector may be adjusted to any sensitivity range, and the like.

In an embodiment, landscape/garden modules 1318 may be used with the power base 1302 to provide a landscape/garden power tool system. The landscape/garden modules 1318 may be a pruning shear 1378, aerosol spray can actuator 1380, remote actuated hose nozzle 1382, remote actuated watering can 1384, fruit picker 1388, a weed whacker, an edger, a broadcast spreader, a leaf blower, a snow remover, a mulcher, a composter, a trimmer, an aerator, a reel mower, a reciprocating scythe, a rake, a rotary blade mower, and the like. The functions and settings for each functional module may be modified by a user setting, a control facility 168, and the like. For example, the fruit picker may be adjusted to pick any kind of fruit, the hose nozzle may be adjusted for any pattern of spray, the rotary blade mower may be adjusted to any cutting height, the broadcast spreader may be adjusted to any rate of feed, and the like.

The aerosol spray can actuator 1380 may operate to discharge an aerosol spray can. The aerosol spray can actuator 1380 may be adapted to receive input power in the form of an the input torque from a power head and to convert the input power into a pressure that is applied to the pressure valve of the aerosol spray can. Generally, the aerosol spray can actuator 1380 may be adapted to receive any and all input power, such as and without limitation electrical power, and to convert the input power into pressure that is applied to the pressure valve of the aerosol spray can. Embodiments of the aerosol spray can actuator 1380 may include an adjustable friction clutch for converting the input torque into pressure, a solenoid for converting electrical input power into pressure, or any and all other devices for converting the input power into the pressure. In any case, the pressure may actuate the pressure valve of the aerosol spray can, causing the aerosol spray can to discharge. It will be understood that various embodiments of the aerosol spray can actuator 1380 are possible.

Figure 14:
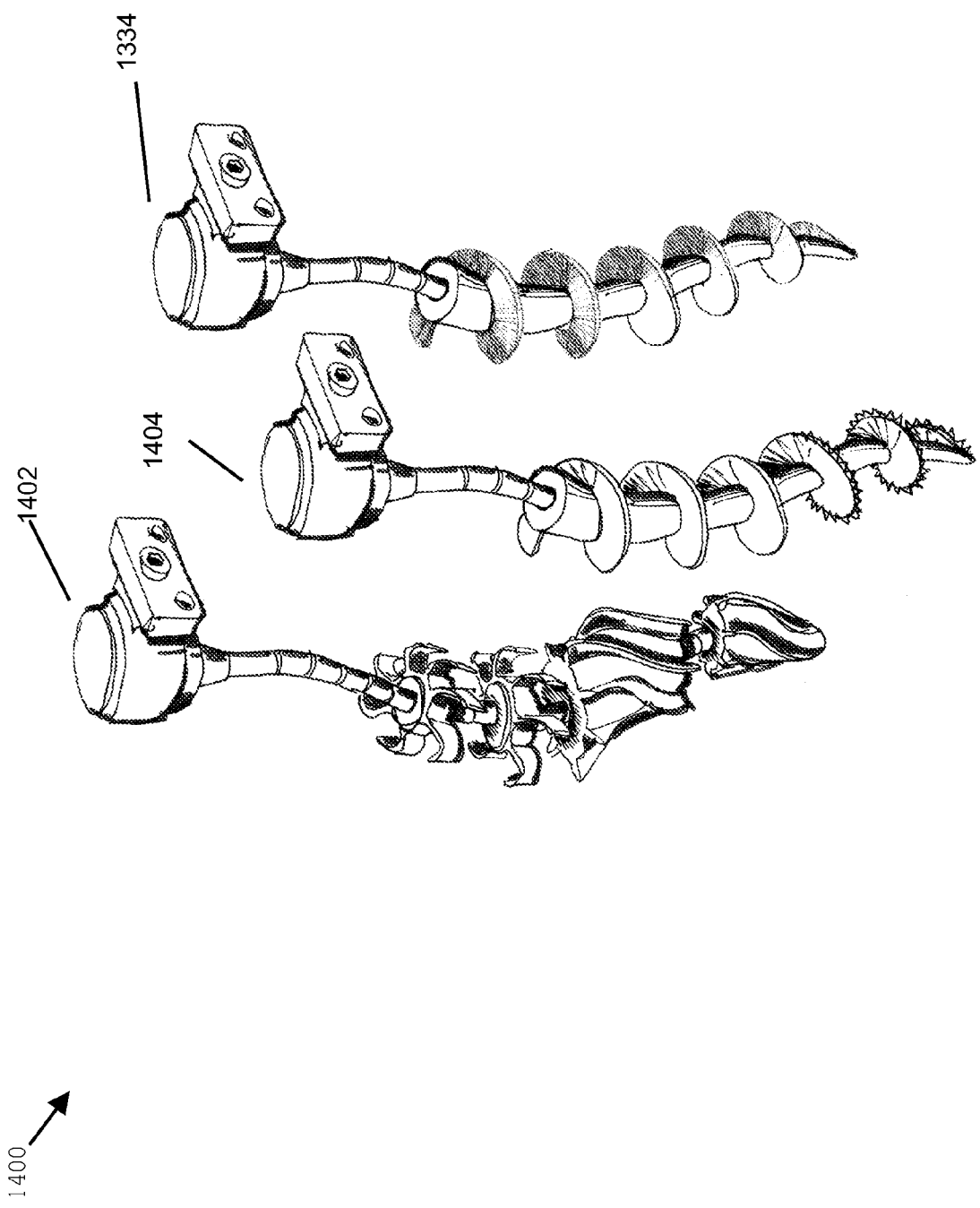
FIG. 14 depicts downspout cleaning tools.

A user may deploy the multi-functional power tool system by mounting a device/functional module at a head of a power base. The power base may comprise a telescoping pole, a static pole, a control module, a handle, and the like. In embodiments, in order to operate the functional module at or near a desired location, a user may lift the functional module at an end of the power base to a desired location and initiate control of the module either before or after placing the module near the desired location. For example, referring to FIG. 14, downspout cleaning tools 1400 may be used with the power base 1302 to clear a downspout. In an embodiment, the downspout cleaning tool 1400 may be an auger brush 1334. The auger brush 1334 may be placed in a downspout and actuated to rotate and clean the downspout with the action of the rotating bristles. In an embodiment, the downspout cleaning tool 1400 may be an auger tool with impellers 1402. The impellers may be disposed along the auger for facilitating removal of debris from a gutter downspout. In an embodiment, the downspout cleaning tool 1400 may be an auger tool with teeth 1404 for chopping material in a downspout, such as large debris or ice. In any case, an auger element of the downspout cleaning tools 1400 may include a gear transfer coupling that provides gravity plumb orientation for the auger element. The gravity plumb orientation may enable the auger element to find its way into an opening of a downspout. In another example, referring to FIGS. 15A & 15B, a pruning shear 1378 may be used with a power base 1302 to prune foliage. In an embodiment, the drive from the power base may engage a worm screw 1502 to drive a worm gear 1504. The worm gear 1504 may connect to the pivoting pruning blade 1508 via a connecting rod 1510 to create a reciprocating motion of the pruning blade 1508 against the fixed blade 1512 and shear items disposed between the pruning blade 1508 and the fixed blade 1512. In embodiments, there may be a friction clutch 1514 between the worm gear 1504 and the plate to which the connecting rod 1510 attaches so that if an attempt is made to cut an oversized object, such as an oversized branch, the friction disc would spin so as to not burn out the motor or overload the geartrain.

Figure 17:
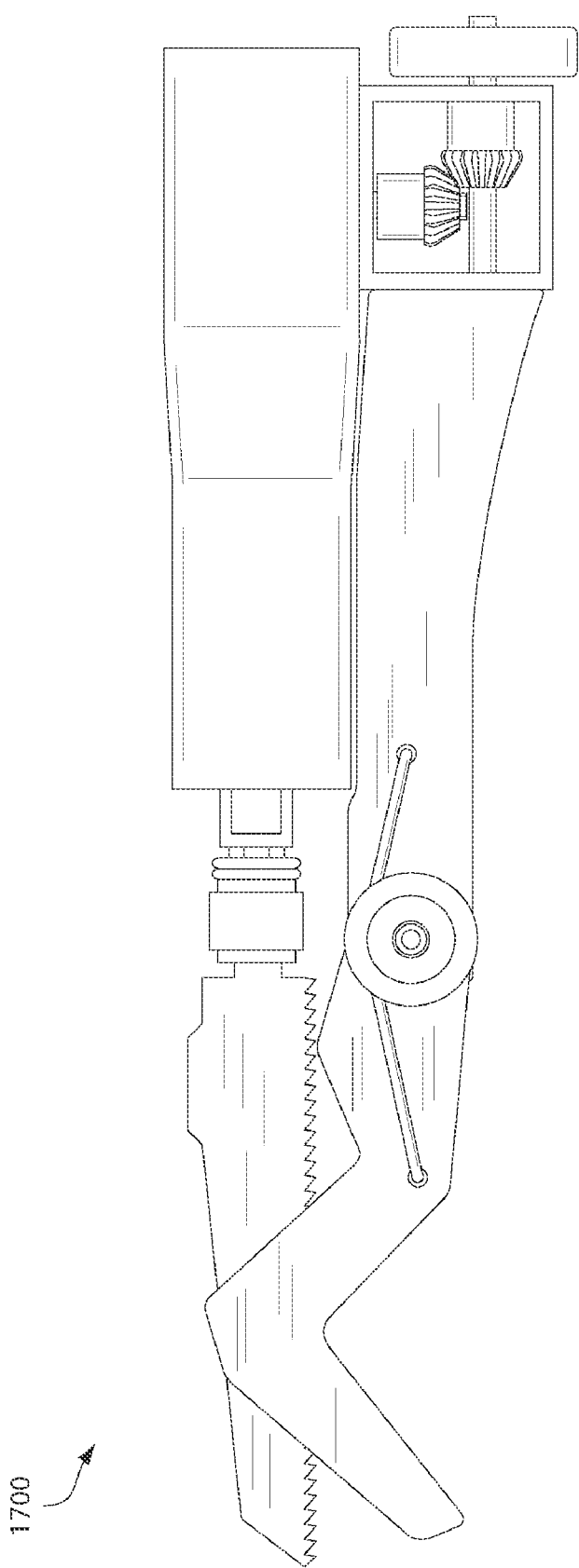
FIG. 17 depicts a reciprocating tree saw attachment with the grip guard closed.

Referring to FIGS. 16 through 18, embodiments of a reciprocating tree saw attachment for use with the power base are depicted with a gripping guard. The gripping guard may be spring loaded. The reciprocating tree saw may use a right angle drive and a reciprocating engine comprising a crankshaft and connecting rod driving a piston back and forth to provide reciprocating action to an attached blade. The blade may be attached with a quick release. In an alternative embodiment, the reciprocating saw may comprise a flywheel and pin with a cross slot in the piston to create the reciprocating motion in less space than with the connecting rod. The reciprocating saw may comprise a blade guard that may help position the saw when it is mounted to the power base. Referring to FIGS. 17 and 18, the spring loaded guard may clamp onto the branch and then the saw motion may be activated. In an alternative embodiment, referring to FIG. 16, the reciprocating saw may be spring loaded downward to provide a locating grip over the top of the branch and the user may work against the spring to saw through the branch.

Figure 19B:
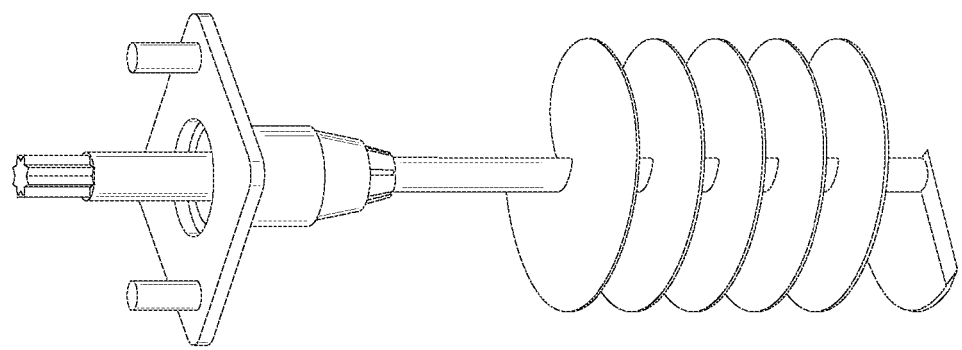
FIGS. 19A and 19B depicts an auger attachment.
Figure 19A:
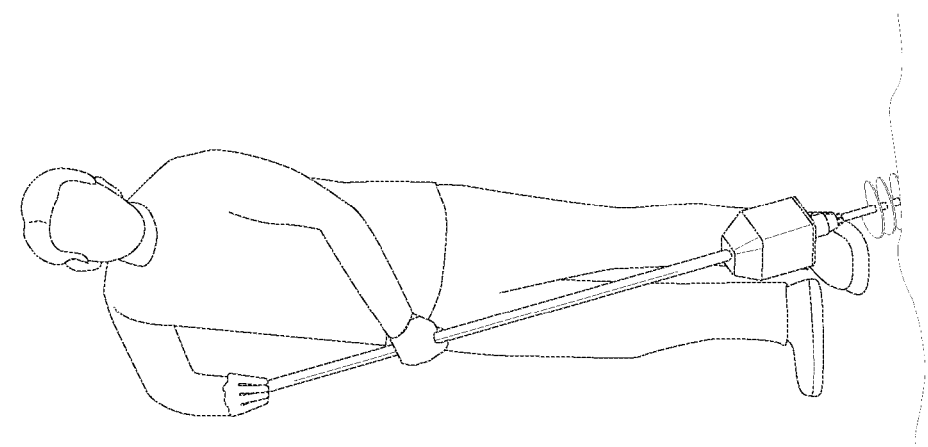

Referring to FIGS. 19A and 19B, an auger attachment for use with the power base is depicted. The auger attachment may be either a stand along auger attachment or an interchangeable auger bit for a drill attachment. The auger attachment may comprise a high torque gear head. The gear head may be geared to a very slow rpm. The auger attachment may be used for making holes in the earth, such as for bulb planting. Using the power base, the user may control the speed of rotation of the auger head.

Referring to FIG. 20, a clamping nailer/stapler attachment for use with the power base is depicted. The clamping nailer/stapler attachment may utilize a spring loaded clamp system. The spring loaded clamp system may enable positioning of the item to be fastened in front of the nail/staple gate. The fastening engine may be pushed up and fired into a hole of the item. The clamp arms may be adjustable. The springs in the adjustable clamp arms may allow the nail head to move in and away from the work piece. The clamp arms may be attached to a workpiece or mounting plate of some sort.

Figure 21:
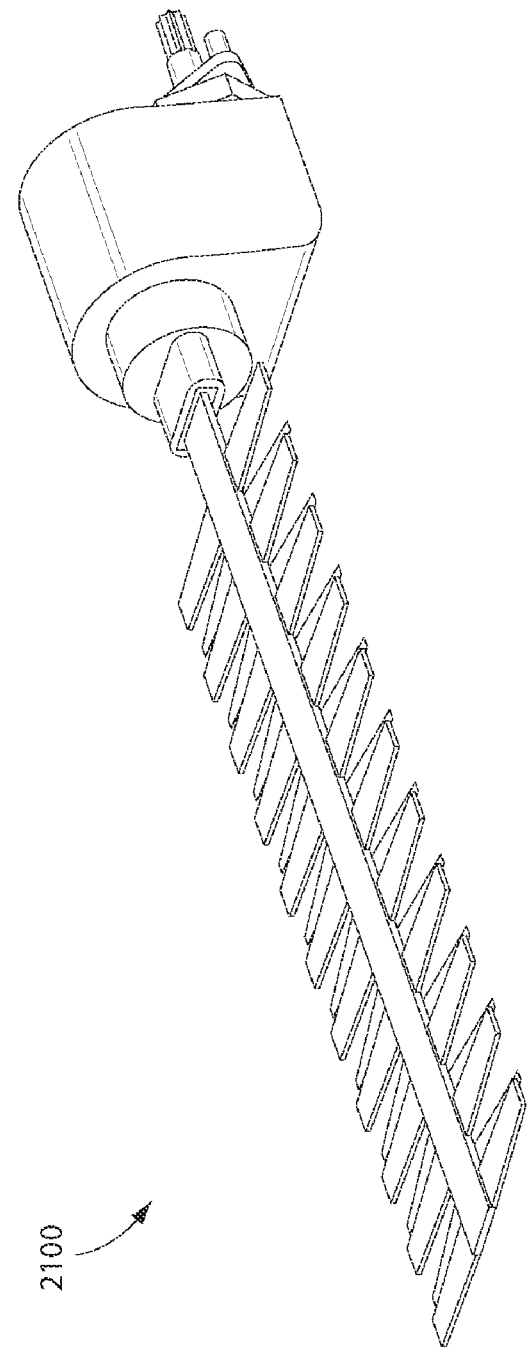
FIG. 21 depicts a sickle bar hedge trimmer attachment.

Referring to FIG. 21, a sickle bar hedge trimmer attachment for use with the power base is depicted. The hedge trimmer attachment uses a similar reciprocating engine to that of the tree saw attachment but it drives a sickle bar trimmer at the end of the power base or an extension pole for trimming high hedges or deep into the hedge that may normally be very hard to reach. In embodiments of the hedge trimmer attachment, the hedge trimmer may comprise a reciprocating gearbox, a speed reduction gearbox, a right angle drive, a reciprocating engine, and the like.

Figure 22B:
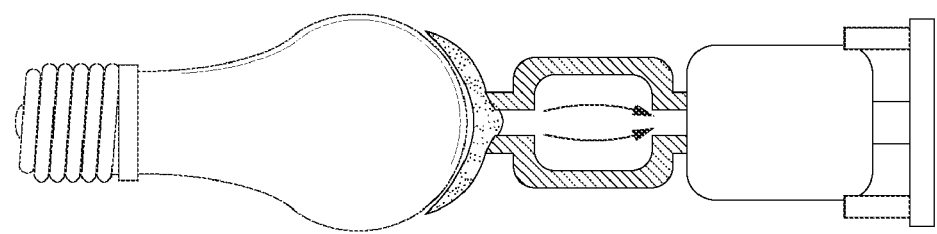
FIGS. 22A and 22B depicts a suction clamp bulb changer attachment.
Figure 22A:
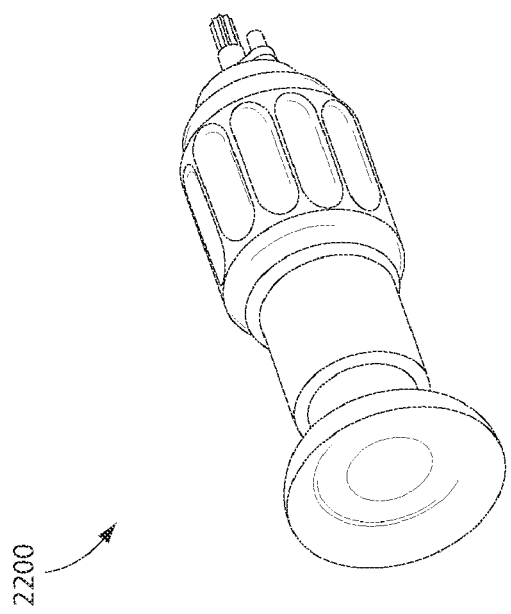

Referring to FIGS. 22A and 22B, a suction clamp bulb changer attachment is depicted. The suction clamp bulb changer may utilize a turbine or microturbine to create suction and a rotary head to turn bulb in and out. An adjustable friction clutch may inhibit over driving the bulb. Varied stepped or staged size cups may accommodate a range of bulb sizes. The stepped cups may also be useful for positioning other, non-bulb items as well. Using the power base, a user may control the speed of rotation of the bulb changer. The vacuum cup may be associated with a vacuum chamber, which may in turn be associated with a rotary head. The assembly of vacuum cup, vacuum chamber, and rotary head may interface to a vacuum connection associated with the power base or provided from a separate source.

Figure 23:
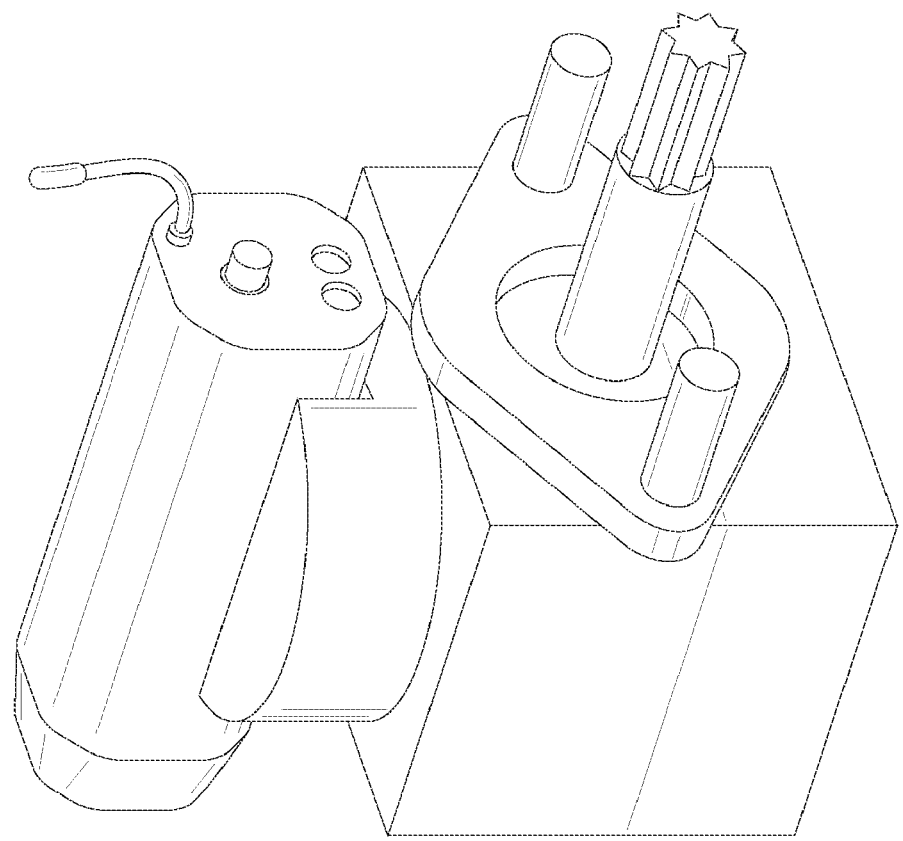
FIG. 23 depicts a rear view of an inspection camera.

Referring to FIGS. 23 and 24, back and front views, respectively, of an inspection video camera mounted on a turning turntable are depicted. The inspection video camera may be an inspection module 1314 and, in particular, a digital wireless video/still camera 1368. The turntable may move at a speed set by a user. The turntable may utilize a worm/worm gear combination to permit panning of the camera at the end of the power base. Vertical adjustment may be accomplished at a power head angle adjustment. A wireless link may provide an image at an attachable monitor or at a separate remote viewing monitor. The camera may be a video camera, still camera, infrared camera, night vision camera, digital camera, and the like.

FIG. 25A depicts a front perspective view of a light bulb changing tool 2500. The light bulb changing tool 2500 includes a gripper 2502, a gripping side 2504 of the gripper 2502, fingers 2510 of the gripper 2502, and a polymer 2514 disposed on the gripping side 2504.

The light bulb changing tool 2500 may be a functional module that can grab a variety of light bulbs. Applications of the light bulb changing tool 2500 may include grabbing a light bulb, twisting the light bulb to install and/or remove the light bulb from a socket, and releasing the light bulb. This twisting may result from a torque that is applied to or generated by the light bulb changing tool 2500.

The gripper 2502 may be a device that has two opposed sides, one of which is the gripping side 2504. The gripper 2502 may include the fingers 2510. The gripper 2502 may include the viscoelastic polymer 2514.

The gripping side 2504 may be that side of the gripper 2502 that is used to engage a light bulb or other object. The gripping side 2504 may be substantially coated with the polymer 2514. In the present depiction, for the purpose of illustration and not limitation, the gripping side 2504 is entirely coated with the polymer 2514.

The fingers 2510 may be compliant elements of the gripper 2502. In applications, a user may bend and/or twist the fingers into a desirable position and the fingers may substantially maintain that position until the user later bends and/or twists the fingers again. The desirable position may allow the fingers 2510 to receive the light bulb in a way that generates greater contact between the light bulb and the gripping side 2504 than would be possible if the fingers 2510 were not compliant. It will be understood that various materials and techniques may be employed to provide the fingers 2510. In embodiments, the fingers may be substantially fixed in a position and not compliant, the position corresponding to one or more light bulb sizes.

The polymer 2514 may be a material that is sticky. Additionally, the polymer 2514 may be non-oily. The polymer 2514 may be a viscoelastic polymer. The polymer 2514 may be a low viscosity viscoelastic polymer. The polymer 2514 may adhere to a variety of objects, such as and without limitation the light bulb. After the polymer 2514 adheres to an object, a slight tug may pull the object free from the polymer 2514. In applications, a user may place a light bulb into contact with the polymer 2514. Then, the user may use the light bulb changing tool 2500 to insert the light bulb into a socket and twist the light bulb into place. With the light bulb now secured in the socket, the user may slight tug the light bulb changing tool 2500 away from the light bulb, causing the polymer 2514 to release the light bulb. It will be understood that the polymer 2514 enables various applications. Furthermore, it will be understood that various materials may be employed as the polymer 2514.

FIG. 25B depicts a side perspective view of the light bulb changing tool 2500. The light bulb changing tool 2500 may include an attaching side 2508 of the gripper 2502, the fingers 2510, and an attachment point 2512 disposed on the attaching side 2508.

The fingers 2510 are shown in a desirable position, which is described hereinabove with reference to FIG. 25A and elsewhere.

The attachment point 2512 may be a facility that is adapted to attach to a gear head. In embodiments, the attachment point 2512 may include at least one of a shank, a threaded connector, a clasp, a magnet, a pin, or the like. The attachment point 2512 may be complementary to or compatible with the connection point 608. For example and without limitation, the attachment point 2512 may include a male component and the connection point 608 may include a matching female component. It will be understood that various embodiments of the attachment point 2512 are possible.

The gear head may be adapted to receive an input torque at a first speed and to rotate the gripper 2502 with an output torque at a second speed. The gear head may be adapted to attach to a motor providing the input torque. The first speed may be greater than the second speed. The gear head may include a torque-limiting clutch that is adapted to limit the output torque more or less to a preset torque. The gear head may, without limitation, include the power takeoff coupling 318 and the gearbox 304. The power takeoff coupling 318 may be the element of the gear head to which the attachment point 2512 attaches. Optionally, the gear head may further include the gear set 308 and pivot 312. It will be understood that various embodiments of the gear head and torque-limiting clutch are possible.

The torque-limiting clutch may be adjustable, allowing the preset torque to be adjusted by a user. In embodiments, the torque-limiting clutch may be an adjustable friction clutch. It will be appreciated that various embodiments of the torque-limiting clutch are possible.

Alternatively, the attachment point 2512 may be a facility that is adapted to attach to the motor or a power head 404 or 600. Here, embodiments of the attachment point 2512 may include the gear head plus at least one of a shank, a threaded connector, a clasp, a magnet, or the like. It will be appreciated that various embodiments of such an attachment point 2512 are possible.

Alternatively, the attachment point 2512 may be a facility that is adapted to attach to a power base. The attachment point 2512 may include an electric motor gear head; a pole having a first end and a second end; and a wire having a first end and a second end.

The electric motor gear head may be a combination of an electric motor and the gear head. It will be understood that the electric motor gear head may be a single, integrated device or may include an individual electric motor that is operatively coupled to an individual gear head. In any case, the electric motor gear head may be adapted to produce a torque that rotates the gripper 2502. It will be appreciated that various embodiments of the electric motor gear head are possible.

The pole may be a segmented pole, a telescoping pole, a segmented and telescoping pole, or the like as described herein and elsewhere. The electric motor gear head may be disposed on the first end of the pole. The second end of the pole may be adapted to attach to a remote power base, such as and without limitation the power base 160, the power base 300, the power base 400, the power base 500, the power base 902, the power base 1302, or the like. It will be understood that various embodiments of the pole are possible.

The first end of the wire may be connected to the electric motor gear head. The second end of the wire may be adapted to connect to an electrical connector of the power base. For example and without limitation, the electrical connector of the power base may include a socket and the second end of the wire may include a plug that fits into the socket. It will be understood that various embodiments of the second end of the wire are possible.

The electrical connector of the power base may be adapted to provide suitable electrical power and, optionally, control signals for driving the electric motor gear head. It will be understood that various embodiments of the electrical connector of the power base are possible.

FIG. 25C depicts a back perspective view of a light bulb changing tool. The light bulb changing tool 2500 may include the gripper 2502, the attaching side 2508, the fingers 2510, and the attachment point 2512.

The fingers 2510 are shown in a desirable position, which is described hereinabove with reference to FIG. 25A and elsewhere. It will be understood that various desirable positions are possible.

Figure 26C:
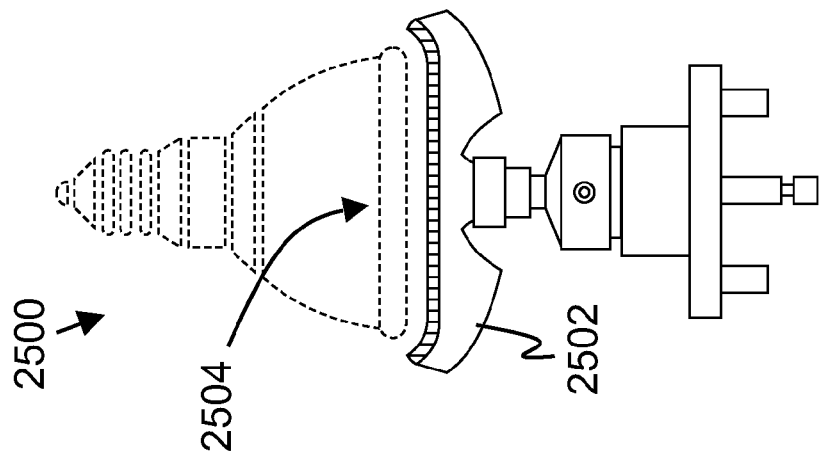
FIG. 26C depicts a cut-away view of a light bulb changing tool.
Figure 26B:
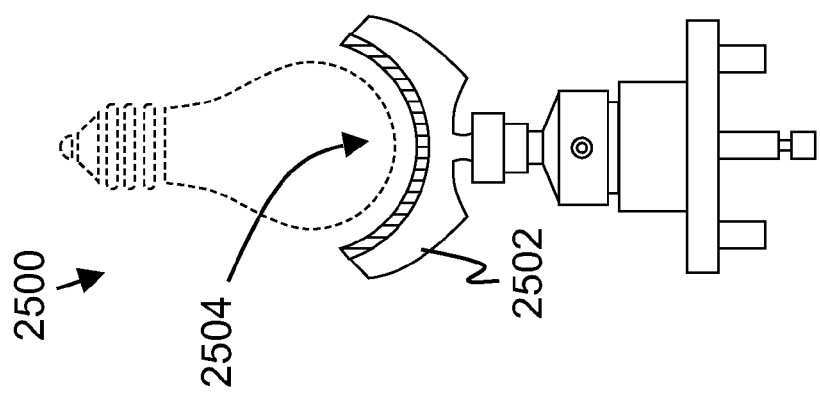
FIG. 26B depicts a cut-away view of a light bulb changing tool.
Figure 26A:
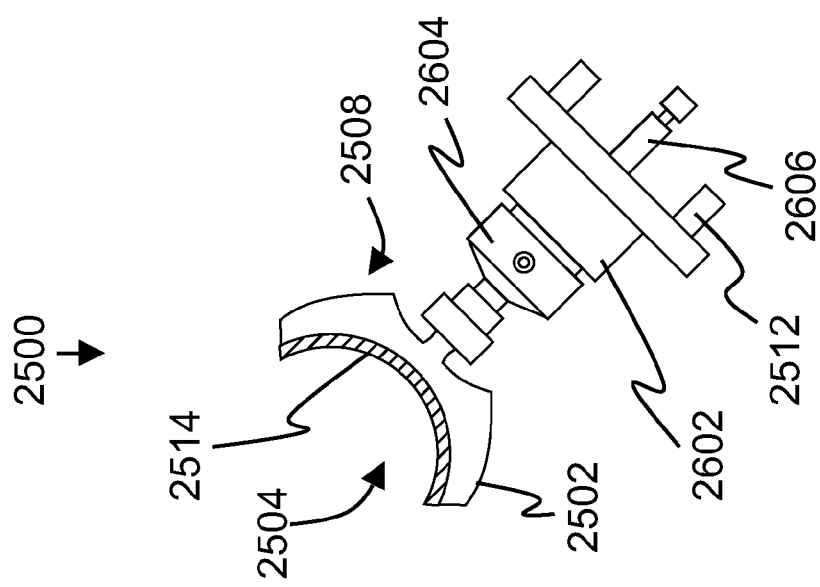
FIG. 26A depicts a cut-away view a light bulb changing tool.

FIG. 26A depicts a cut-away view the light bulb changing tool 2500. The light bulb changing tool 2500 may include the gripper 2502, the gripping side 2504, the attaching side 2508, the attachment point 2512, the polymer 2514, a gear head 2602, a torque-limiting clutch 2604, and a shank 2606.

The cut-away view may depict a sectional view of the gripper 2502, including the gripping side 2504, the attaching side 2508, and the polymer 2514. The cit-away view may depict a side perspective view of the gear head 2602, the torque-limiting clutch 2604, the shank 2606, and other elements.

The gripper 2502 may be a flexible disc or other flexible shape. As depicted, the gripper 2502 may or may not have the fingers 2510.

The gear head 2602 may be described hereinabove with references to FIGS. 25A, 25B, and 25C and elsewhere.

The torque-limiting clutch 2604 may be described hereinabove with references to FIGS. 25A, 25B, and 25C and elsewhere.

The shank 2606, as described hereinabove with references to FIGS. 25A, 25B, and 25C and elsewhere, may be part of the attachment point 2512.

FIG. 26B depicts a cut-away view of a light bulb changing tool. The light bulb changing tool 2500 may include the gripper 2502 and the gripping side 2504.

The cut-away view may depict a sectional view of the gripper 2502, including the gripping side 2504 and associated elements. The cut-away view may depict a side perspective view of other elements.

The gripper 2502 may be in a desirable position vis-à-vis a round light bulb. It will be understood that the desirable position allows greater contact between the gripping side 2504 and the light bulb than may otherwise be possible.

The gripper 2502 may be flexible and may assume the desirable position. The gripper's flexibility may or may not, wholly or partially, be due to one or more compliant elements of the gripper 2502. For example and without limitation, the one or more compliant elements may be the fingers 2510. As depicted, the gripper 2502 may or may not have the fingers 2510.

Alternatively, The gripper 2502 may be more or less permanently fixed in the desirable position.

It will be understood that many embodiments of the gripper 2502 are possible.

FIG. 26C depicts a cut-away view of a light bulb changing tool. The light bulb changing tool 2500 may include the gripper 2502 and the gripping side 2504.

The cut-away view may depict a sectional view of the gripper 2502, including the gripping side 2504 and associated elements. The cut-away view may depict a side perspective view of other elements.

The gripper 2502 may be in a desirable position vis-à-vis a flat-faced light bulb.

Figure 27:
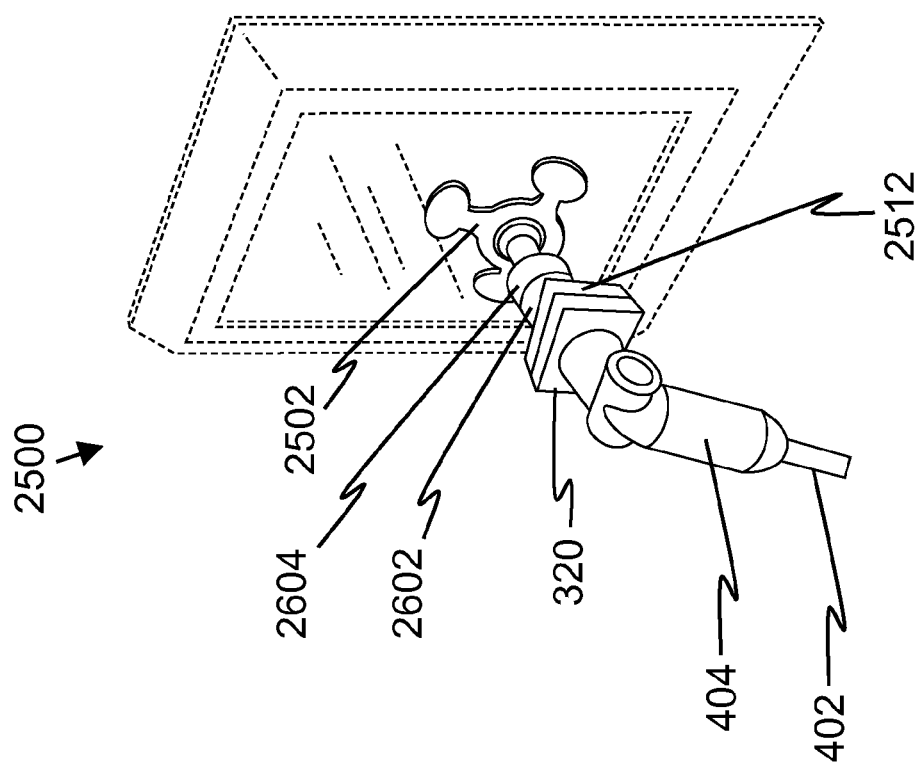
FIG. 27 depicts a perspective view of a light bulb changing tool.

FIG. 27 depicts a perspective view of a light bulb changing tool. The light bulb changing tool 2500 may include the gripper 2502, the attachment point 2512, the gear head 2602, the torque-limiting clutch 2604, the mounting plate 320, the pole 402, and the power head 404.

The gripper 2502 may be in a desirable position vis-à-vis a flat surface. For example and without limitation, the flat surface may be a glass surface mounted in a picture frame.

Here, the light bulb changing tool 2500 may be employed to position a wall-mounted picture in a frame. It will be appreciated that various applications of the light bulb changing tool 2500 are possible. It will be appreciated that such applications may or may not involve a light bulb.

Figure 28:
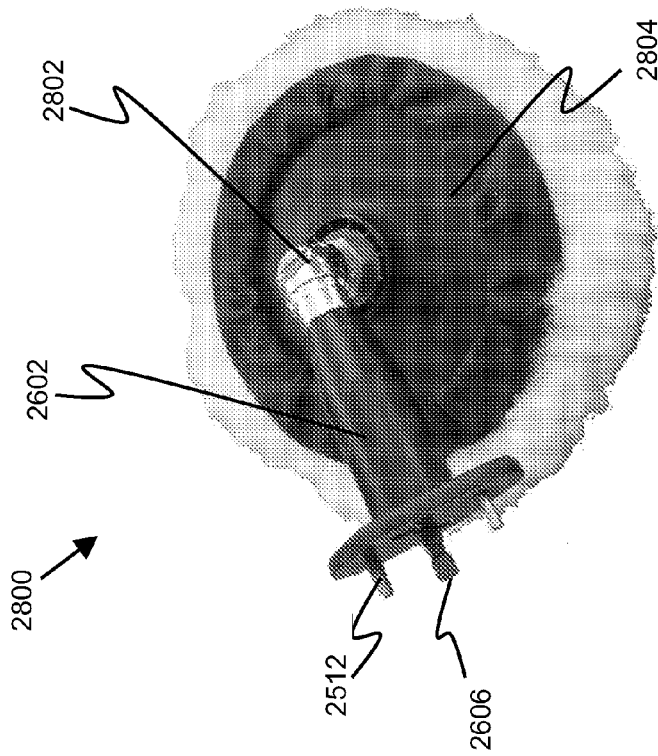
FIG. 28 depicts a perspective view of a vehicle cleaning tool.

FIG. 28 depicts a perspective view of a vehicle cleaning tool. The vehicle cleaning tool 2800 may include the shank 2606, the attachment point 1512, the gear head 2602, an arbor 2802, and a functional module 2804 for cleaning or detailing a vehicle.

The shank 2606 or an analogous element may be coupled to or integral to the gear head 2602. In applications, a motor may rotate the shank 2606 and thusly provide an input rotation to the gear head 2602.

The attachment point 1512 may be coupled to or integral to the gear head 2602. In applications, the attachment point 1512 may be adapted to couple to the connection point 608, which is described hereinabove with reference to FIG. 6 and elsewhere.

The connection point 608 may be a quick-release connection point that is an element of the power head 404. For example and without limitation, the connection point 608 that includes a detent released by a spring latch actuated by a button integral to the power head 404 may be a quick-release connection point. Generally, any and all embodiments of the connection point 608 may be the quick-release connection point. It will be understood that various embodiments of a quick-release connection point as part of a power head are possible.

The gear head 2602 may be operatively coupled to the arbor 2802. The gear head 2602 may rotate the arbor 2802 in response to the input rotation. The gear head 2602 may reduce the input rotation's velocity and then rotate the arbor 2802 at this reduced velocity. The gear head 2602 may include a torque-limiting clutch that is adapted to limit the reduced velocity's torque.

The gear head 2602 may be adapted to couple to a power head having a quick-release connection point. Such an adaptation may include the attachment point 2512, the shank 2606, and the like. For example and without limitation, The torque-limiting clutch may be an adjustable friction clutch. It will be understood that various embodiments of the torque-limiting clutch are possible.

The arbor 2802 may be adapted to connect to a functional module 2804 for cleaning or detailing a vehicle. The arbor 2802 may transfer a rotation from the gear head 2602 to the functional module 2804. The arbor 2802 may have two sides, one of which is oriented toward the gear head 2602 and the other of which is oriented toward the functional module 2804. In embodiments these two sides may be oriented in any and all ways with respect to one another. For the purpose of illustration and not limitation, the present illustration shows the two sides oriented at a right angle with respect to one another.

The functional module 2804 for cleaning or detailing a vehicle may include bristles, cloth, pad material, sponge material, a combination of the foregoing, or the like. The functional module 2804 for cleaning or detailing a vehicle may be designed to clean or detail a vehicle. Rotation of this functional module 2804 by the arbor 2802 may improve or substantially provide a cleaning or detailing action of the functional module 2804. Various embodiments of the functional module 2804 for cleaning or detailing a vehicle are described hereinafter and elsewhere. It will be understood that a variety of functional modules 2804 for cleaning or detailing a vehicle are possible.

Figure 29A:
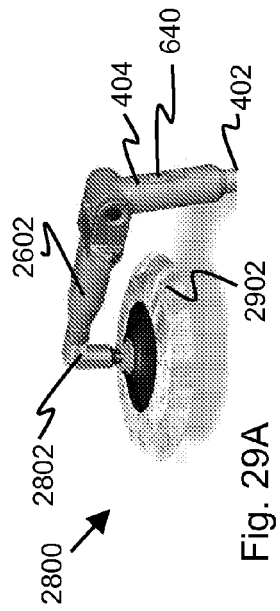
FIG. 29A depicts a perspective view of a vehicle cleaning tool.

FIG. 29A depicts a perspective view of a vehicle cleaning tool. The vehicle cleaning tool 2800 may include the pole 402, the power head 404, the arbor 2802, the gear head 2602, the manual speed change switch 640, and a cloth cleaning disc 2902.

The pole and the power head may be described hereinabove with reference to FIG. 4, to FIG. 6, and elsewhere.

The manual speed change switch 640 may be described hereinabove with reference to FIG. 6 and elsewhere.

The cloth cleaning disk 2902 may be a functional module 2804 for cleaning or detailing a vehicle. The cloth cleaning disk 2902 may include cloth material for cleaning or detailing a vehicle. When rotated by the arbor 2802, the cloth cleaning disc 2902 may provide a cleaning or detailing action for cleaning or detailing a vehicle. It will be understood that various embodiments of the cloth cleaning disk 2902 are possible.

Figure 29B:
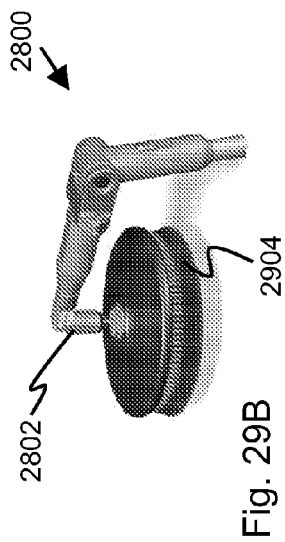
FIG. 29B depicts a perspective view of a vehicle cleaning tool.

FIG. 29B depicts a perspective view of a vehicle cleaning tool. The vehicle cleaning tool 2800 may include the arbor 2802 and a bristle cleaning disk 2904.

The bristle cleaning disk 2904 may be a functional module 2804 for cleaning or detailing a vehicle. The bristle cleaning disk 2904 may include a bristle material for cleaning or detailing a vehicle. When rotated by the arbor 2802, the bristle cleaning disk 2904 may provide a cleaning or detailing action for cleaning or detailing a vehicle. It will be understood that various embodiments of the bristle cleaning disk 2904 are possible.

Figure 29C:
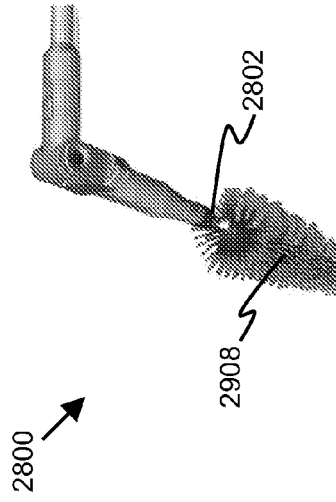
FIG. 29C depicts a perspective view of a vehicle cleaning tool.

FIG. 29C depicts a perspective view of a vehicle cleaning tool. The vehicle cleaning tool 2900 may include the arbor 2802 and a bristle cleaning brush 2908.

For the purpose of illustration and not limitation, the two sides of the arbor 2802 are oriented along a horizontal axis with respect to one another.

The bristle cleaning brush 2908 may be a functional module 2804 for cleaning or detailing a vehicle. The bristle cleaning brush 2908 may include a bristle material arranged in a spiral or other shape for cleaning or detailing a vehicle. When rotated by the arbor 2802, the bristle cleaning brush 2908 may provide a cleaning or detailing action for cleaning or detailing a vehicle. It will be understood that various embodiments of the bristle cleaning brush 2908 are possible.

Figure 30B:
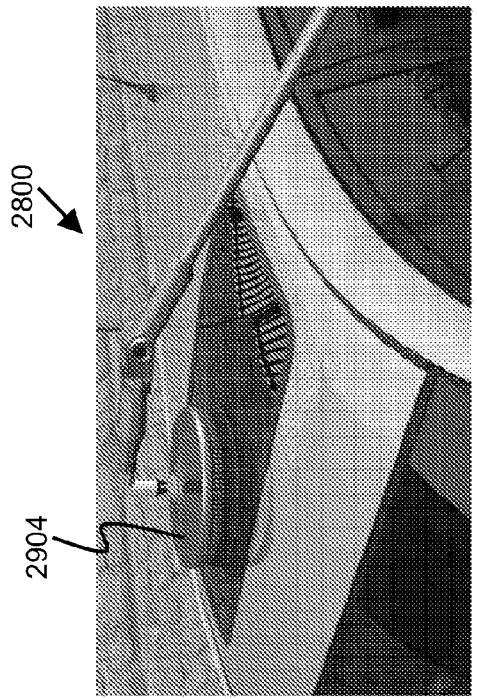
FIG. 30B depicts a perspective view of an application of a vehicle cleaning tool.
Figure 30A:
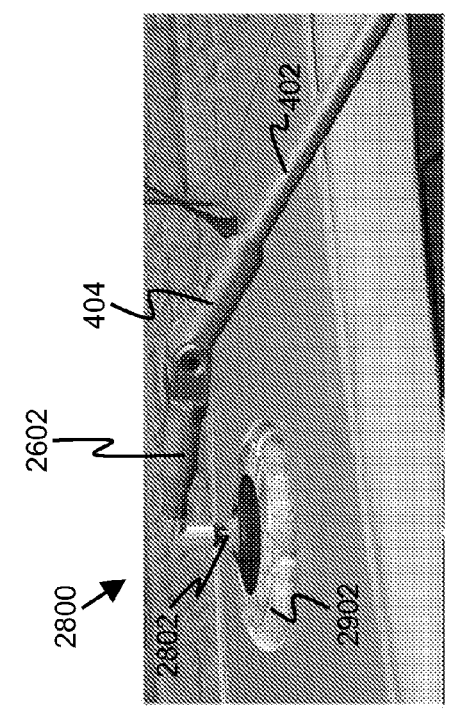
FIG. 30A depicts a perspective view of an application of a vehicle cleaning tool.

FIG. 30A depicts a perspective view of an application of a vehicle cleaning tool. The vehicle cleaning tool 2800 may include the cloth cleaning disk 2902.

FIG. 30B depicts a perspective view of an application of a vehicle cleaning tool. The vehicle cleaning tool 2800 may include the bristle cleaning disk 2904.

Figure 30C:
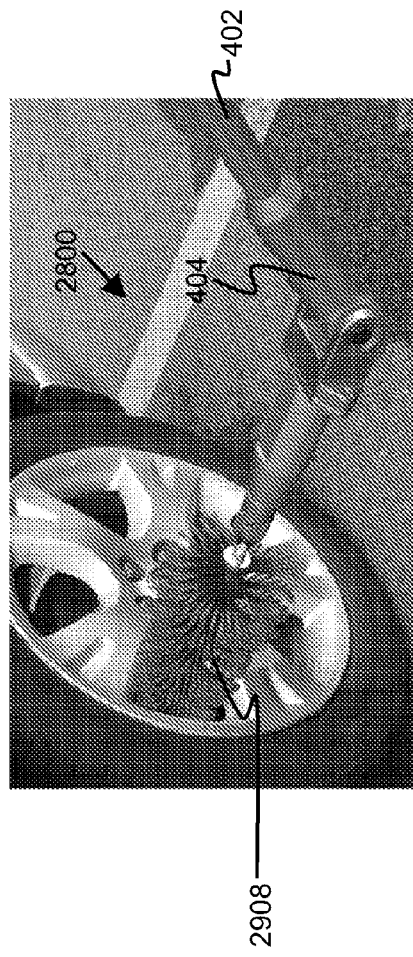
FIG. 30C depicts a perspective view of an application of a vehicle cleaning tool.

FIG. 30C depicts a perspective view of an application of a vehicle cleaning tool. The vehicle cleaning tool 2800 may include the bristle cleaning brush 2908.

It will be understood that many applications of the vehicle cleaning tool 2800 are possible. Such applications may or may not relate to cleaning a vehicle.

Generally speaking, in an embodiment, a user may obtain the power base and functional modules separately. For example, a retailer may sell the power base separately from the functional modules. In another example, a tool rental center may rent the power base and functional modules separately, if for example, a user may already have a power base and have need only for a particular functional module. In another example, the functional modules may be purchased as needed enabling a user to lower the cost of ownership. In an embodiment, the multi-functional power tool system may be useful residentially, industrially, commercially, may be rented, may be leased, and the like.

In an embodiment, the power base and one or more functional modules may be obtained as a kit. For example, a power base may be packaged for sale with a module, such as a power base with a pruning shear, a power base with a gutter cleaning device comprising impellers, a power base and a powered paint roller, and the like. In an embodiment, a power base may be packaged for sale with more than one functional module. The functional modules in the kit may be related. For example, a landscape/gardening kit may comprise a power base and functional modules such as a pruning shear, fruit picker, broadcast spreader, and the like. The functional modules in the kit may be unrelated. For example, a kit may comprise a power base and functional modules such as a gutter cleaning device comprising impellers, drill/driver with remote interchangeable bits, a weed whacker, and the like.

Any and all of the functional modules may be attached to a power head via a quick-release coupling. Any and all of the functional modules may be augmented with, attached to, and/or used in conjunction with a digital wireless video/still camera or any other kind of electronic camera. Such a camera may provide a user with a view of an operational site at which a functional module is being employed. Many examples of this may be described herein and elsewhere, and various other examples of this will be understood.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A vehicle power tool cleaning system, comprising:
    at least two different functional cleaning modules each including a rotational arbor and a gear head adapted to rotate the rotational arbor;
    a power base comprising a power head including a drive member at one end thereof and a power supply member at the other end thereof for providing electrical power to the power head and further including a pole disposed between the power head and the power supply member, the power head having a quick-release connection point comprising a detent released by a spring latch actuated by a button which is part of the power head whereby a selected one of the cleaning modules is detachably coupled to the power head;
    the drive member of the power head driving the respective cleaning module when coupled to the power head; and
    the power base further including a control for controlling the operation of the cleaning system.

2. The vehicle power tool cleaning system of claim 1, wherein the pole is a segmented pole.

3. The vehicle power tool cleaning system of claim 1, wherein the pole is a telescoping pole.

4. The vehicle power tool cleaning system of claim 1, wherein the gear head comprises a torque-limiting clutch.

5. The vehicle power tool cleaning system of claim 4, wherein the torque-limiting clutch is an adjustable friction clutch.

* * * * *